US008229716B2

(12) United States Patent
Kaplan et al.

(10) Patent No.: US 8,229,716 B2
(45) Date of Patent: Jul. 24, 2012

(54) FAST TRACKING METHODS AND SYSTEMS FOR AIR TRAFFIC MODELING USING A MONOTONIC LAGRANGIAN GRID

(75) Inventors: Carolyn R. Kaplan, Fairfax Station, VA (US); Elaine S. Oran, Falls Church, VA (US); Natalia Alexandrov, Hampton, VA (US); Jay P. Boris, Falls Church, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 12/981,432

(22) Filed: Dec. 29, 2010

(65) Prior Publication Data

US 2011/0166836 A1 Jul. 7, 2011

Related U.S. Application Data

(60) Provisional application No. 61/292,452, filed on Jan. 5, 2010.

(51) Int. Cl.
*G06F 7/60* (2006.01)
*G06G 7/48* (2006.01)

(52) U.S. Cl. ................................................ 703/2; 703/8

(58) Field of Classification Search ................... 703/2, 8
See application file for complete search history.

(56) References Cited

U.S. PATENT DOCUMENTS 6,490,532 B1 * 12/2002 Hogue et al. .................... 702/27
6,691,034 B1 * 2/2004 Patera et al. .................. 701/301
6,941,315 B2 * 9/2005 Goldstein et al. ............. 707/741
7,702,427 B1 4/2010 Sridhar et al.
2004/0024528 A1 * 2/2004 Patera et al. .................. 701/301

OTHER PUBLICATIONS

Bayen et al., Lagrangian Delay Predictive Model for Sector-Based Air Traffic Flow; 2004; Journal of Guidance, Control, and Dynamics; pp. 1015-1026.*

Kaplan et al., The Monotonic Lagrangian Grid for Fast Air-Traffic Evaluation, Publication or Presentation Release Request, Dec. 17, 2010, pp. 1-9, Naval Research Laboratory, Washington, DC, USA.

(Continued)

*Primary Examiner* — Kamini S Shah
*Assistant Examiner* — Juan Ochoa
(74) *Attorney, Agent, or Firm* — Amy L. Ressing; Leonard Young

(57) ABSTRACT

Computer implemented methods and systems using a multi-dimensional Monotonic Lagrangian Grid (MLG) to sort and order locations of aircraft, are used for simulating, controlling, and optimizing aircraft traffic systems. The MLG is combined with algorithms for collision detection and resolution, separation assurance, and updating aircraft trajectories, and applied to test cases of the air transportation system. Physical locations describing aircraft traffic moving in complex paths are stored into a data structure of the multidimensional MLG algorithm. The moving aircraft traffic platforms are sorted and ordered on a grid structure in real space and in an indexing space, causing a monotonic mapping between indices of the grid structure and locations describing the plurality of moving aircraft. Computer operations using data stored in the multidimensional MLG determine control strategies for aircraft separation assurance and optimum routes to circumvent blockages in transport paths.

15 Claims, 32 Drawing Sheets

OTHER PUBLICATIONS

Kaplan, et al., The Monotonic Lagrangian Particle Grid: A Fast Tracking Methodology for Air-Traffic Modeling, American Institute of Aeronautics and Astronautics (AIAA), 2009, pp. 1-10, Naval Research Laboratory, Washington, DC, USA.

Enhanced Traffic Management System (ETMS), Federal Aviation Administration, 2009, p. 1, US Department of Transportation, Washington, DC, USA.

Alexandrov, et al., Toward Optimal Transport Networks, AIAA, Sep. 10-12, 2008, pp. 1-11, Victoria, British Columbia, Canada.

Kopardekar, et al., Initial Concepts for Dynamic Airspace Configuration, AIAA, Sep. 18-20, 2007, pp. 1-12, Belfast, Ireland.

NASA Air Traffic Management Tool Wins Software of the Year Award, Space Ref, Aug. 18, 2006. pp. 1-4, NASA Ames Research Center, Moffett Field, CA, USA.

Bilimoria and Sridhar, FACET: Future ATM Concepts Evaluation Tool, Jun. 13-16, 2000, pp. 1-10, 3rd USA/Europe Air Traffic Management R&D Seminar, Napoli, Italy.

Nguyen et al., Simulations of Hypersonic Rarefied Gas Flows Using DSMC-MLG, NRL/MR/6404-97-7917, May 16, 1997, pp. 1-65, Naval Research Laboratory, Washington, DC, USA.

Sinkovits et al., The Stability and Multiplicity of the Monotonic Lagrangian Grid, NRL/MR/6410-97/7937, May 28, 1997, pp. 1-28, Naval Research Laboratory, Washington, DC, USA.

Cybyk et al., Combining the Monotonic Lagrangian Grid with a Direct Simulation Monte Carlo Model, Journal of Computational Physics, Apr. 10, 1995, pp. 323-334, vol. 122, Academic Press, Inc., USA.

Sinkovits et al., A Technique for Regularizing the Structure of a Monotonic Lagrangian Grid, Journal of Computational Physics, 1993, pp. 368-372, vol. 108, Academic Press, Inc. USA.

Kolbe et al., Battle Engagement Area Simulator/Tracker, NRL Memorandum Report 6705, Oct. 8, 1990, pp. 1-49, Naval Research Laboratory, Washington, DC, USA.

Picone et al., Near-Neighbor Algorithms for Processing Bearing Data, NRL Memorandum Report 6456, May 10, 1989, pp. 1-49, Naval Research Laboratory, Washington, DC, USA.

Lambrakos et al., Molecular Dynamics of a Lipid Bilayer Using Novel Monotonic Logical Grid (MLG) and Multiple Constraint Relaxation (MCR) Algorithms, (Abstract only), 1987, p. 1, vol. 51, Biophysical Journal, USA.

Boris et al., Beast: A High-Performance Battle Engagement Area Simulator/Tracker, NRL Memorandum Report 5908, Dec. 31, 1986, pp. 1-60, Naval Research Laboratory, Washington, DC, USA.

Lambrakos et al., Geometric Properties of the Monotonic Lagrangian Grid Algorithm for Near Neighbor Calculations, Journal of Computational Physics, 1987, pp. 183-202, vol. 73, Academic Press, Inc., USA.

Jay Boris, A Vectorized "Near Neighbors" Algorithm of Order N Using a Monotonic Logical Grid, Journal of Computational Physics, 1986, pp. 1-20, vol. 66, Academic Press, Inc., USA.

Picone et al., Initial Comparison of Monotonic Logical Grid and Alternative Data base Structures, NRL Memorandum Report 5860, Sep. 30, 1986, pp. 1-49, Naval Research Laboratory, Washington, DC, USA.

Lambrakos et al., A Vectorized Near-Neighbors Algorithm of Order N Molecular Dynamic Simulations, Journal of Computational Physics, 1986, pp. 85-88, Annals New York Academy of Sciences, USA.

Boris and Lambrakos A Vectorized "Near Neighbors" Algorithm of Order N Using a Monotonic Logical Grid, Lecture Notes in Physics, vol. 238, pp. 158-181, 1985, (updated IDS Apr. 3, 2012).

* cited by examiner

| | | | | | |
|---|---|---|---|---|---|
| 5 | 9 | 8 | 17 | 3 | 1 |
| 4 | 16 | 10 | 12 | 18 | 21 |
| 3 | 13 | 11 | 2 | 25 | 14 |
| 2 | 23 | 19 | 5 | 7 | 4 |
| 1 | 15 | 6 | 22 | 24 | 20 |
| **J/I** | 1 | 2 | 3 | 4 | 5 |

FIG. 1B (a)

FIG. 4A
(a) t = 0
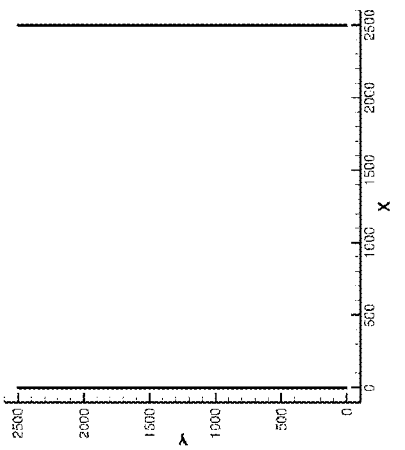
FIG. 4B
(b) t = 1 hr
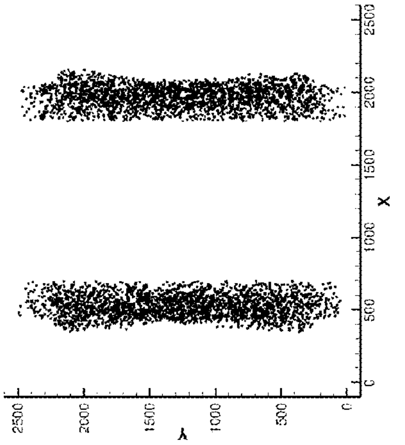
FIG. 4C
(c) t = 2 hr
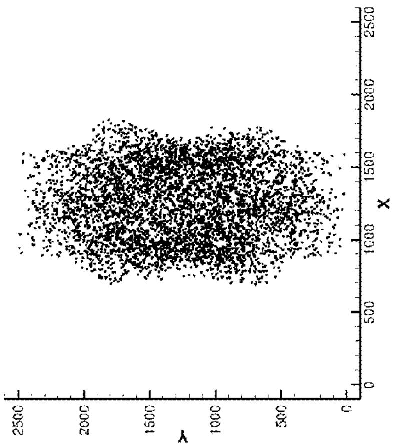
(d) t = 3 hr
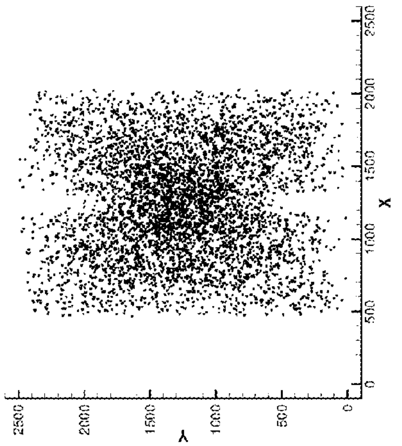
FIG. 4D
(e) t = 4 hr
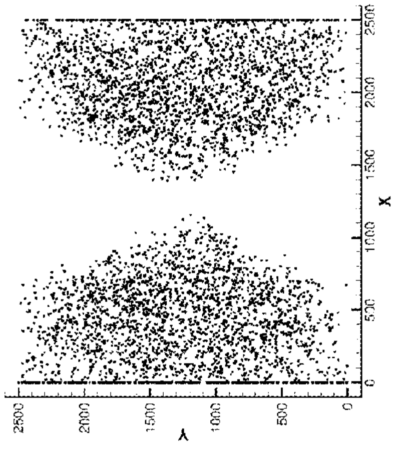
FIG. 4E
(f) t = 5 hr
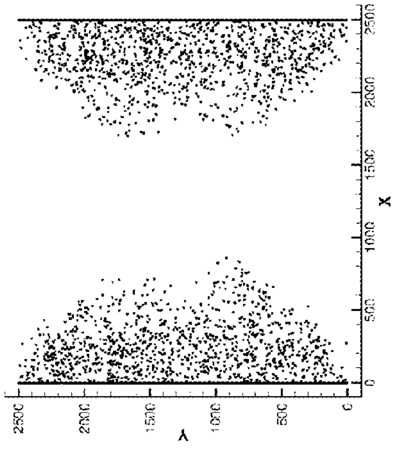
FIG. 4F FIG. 5A
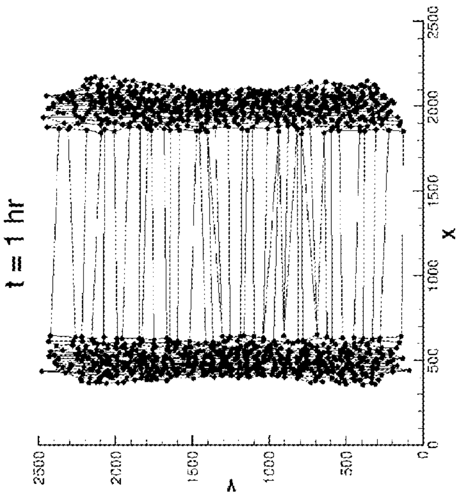
FIG. 5B
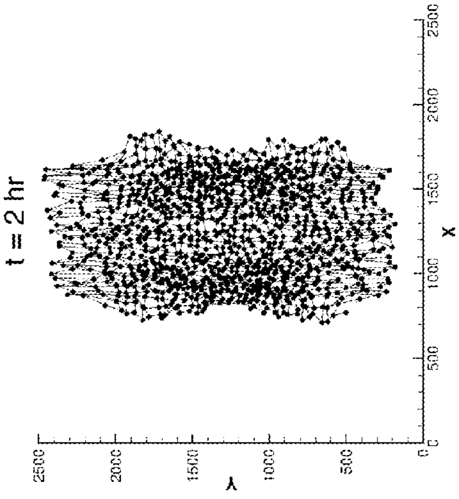
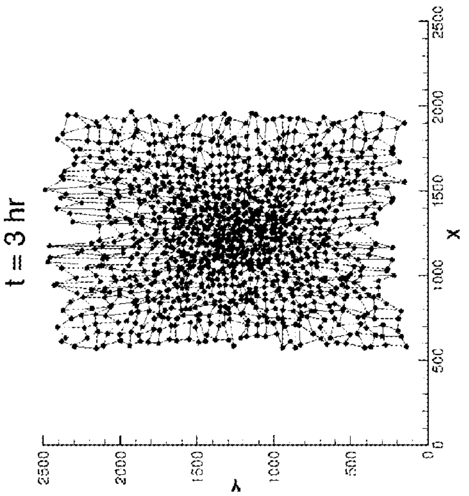
FIG. 5C
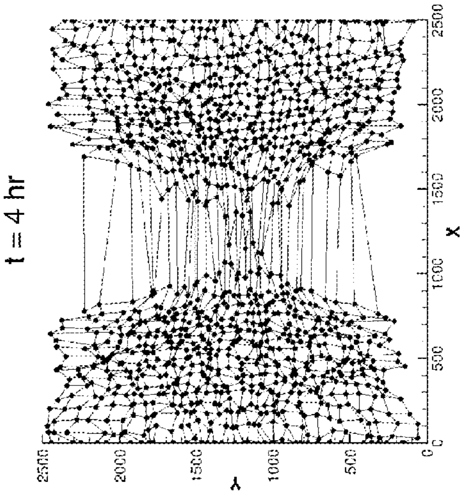
FIG. 5D Case (a) and case (b) track each other, for the most part, in this scenario.

FAST TRACKING METHODS AND SYSTEMS FOR AIR TRAFFIC MODELING USING A MONOTONIC LAGRANGIAN GRID

FIELD OF THE INVENTION

In general, the present invention relates to optimization and control of systems simulation of physical and mathematical systems. More particularly, the present invention uses a Monotonic Lagrangian Grid (MLG), which is multidimensional, as a platform for air traffic modeling and air traffic control.

BACKGROUND OF THE INVENTION

The MLG was originally developed in the mid 1980s. It has since been used for two decades as the underpinning for various particle dynamics simulations, including molecular dynamics and according to Cybyk, B., Oran, E. S., Boris, J. P., and Anderson, J. D., "Combining the Monotonic Lagrangian Grid with a direct simulation Monte Carlo Model," J. of Computational Physics, 122, 323 (1995), it has been used in direct simulation Monte Carlo methods of simulating rarefied gas dynamics. The subject matter described herein represents a new application of the MLG, as a tool for air traffic modeling, and new capabilities have been added to the MLG for this purpose. Air traffic systems are vital to economic growth and stability; furthermore, safe and properly controlled air traffic systems are crucial to homeland security. In order to develop strategies for effective design and control of complex aspects of air transportation, a fast platform for modeling and predicting various layers of air traffic systems is needed.

A description of the multidimensional MLG is provided herein, involving the use of the multidimensional MLG in particle dynamics simulations. The MLG is a free-Lagrangian data structure for storing the positions and other data needed to describe N moving objects, where N can be very large. Here, the meaning of "object" or "node" depends on the particular application. That is, for molecular dynamics simulations, a node may correspond to an atom, while for direct simulation Monte Carlo applications, a node can describe a group of molecules. According to Sinkovits, R. S., Oran, E. S. and Boris, J. P., "A Technique for Regularizing the Structure of a Monotonic Lagrangian Grid," J. of Computational Physics, 108, 368 (1993), and further according to Sinkovits, R. S., Boris, J. P. and Oran, E. S., "The Stability and Multiplicity of the Monotonic Lagrangian Grid," NRL Memorandum Report 6410-97-7937, 1997, the MLG is not unique, and some MLGs are of higher quality than others.

In the extension of the multidimensional MLG technology disclosed here, a node or object corresponds to an aircraft and/or to other moving platforms. This work is applicable to both military and civil aviation, and to other systems where numerous entities are moving in complex paths relative to each other, such as swarms of mobile sensors and space debris.

The MLG is used as a tool for rapid prediction and modeling that enables active design of air transportation systems. There are other currently available air traffic simulation environments, such as NASA's Future Air Traffic Management Concepts Evaluation Tool (FACET) simulator. FACET is used to evaluate air traffic concepts, and is sometimes deployed in Federal Aviation Administration (FAA) operational tests. It uses the FAA's Enhanced Traffic Management System (ETMS) data along with wind and weather data from the National Oceanic and Atmospheric Administration (NOAA). These advanced capabilities can significantly slow-down the simulations.

Therefore, the need exists for advanced capabilities of rapid prediction and modeling algorithms to be added to the MLG for development of new modeling methodologies, relevant to air traffic systems. The new air traffic related algorithms include algorithms for collision avoidance between aircraft, for computing and updating aircraft trajectories, and for modifying trajectories to circumvent restricted zones (e.g., to avoid areas of bad weather or areas designated as government installations).

Further, the need exists for a very fast simulator that can be easily incorporated into the overall computational framework of modeling complex transport systems. The MLG model can quickly sort, track, and update positions of more than 10,000 aircraft, both on the ground (at airports) and in the air. It can be used to evaluate new system concepts; for instance, as an aid in testing various control strategies, such as collision avoidance, separation assurance, and traffic flow management, as well as in evaluating the reaction of the system to local and global perturbations, including atmospheric and/or weather events, such as lightning strikes, solar wind disruptions and/or volcanic eruptions. The MLG can be used to determine the most efficient way to reroute air traffic after local weather conditions, such as thunderstorms, have propagated a local disturbance throughout the entire system.

SUMMARY OF THE INVENTION

Computer implemented methods and systems work cooperatively to combine algorithms for collision avoidance (conflict detection and resolution), separation assurance and updating aircraft trajectories with a multidimensional Monotonic Lagrangian Grid (MLG) to sort and order locations of aircraft, by simulating, controlling, and optimizing dynamic global models of aircraft traffic systems, by running various test case scenarios of a plurality of transport systems. Physical locations describing aircraft traffic moving in complex paths in various transport systems are stored into a structure of the multidimensional MLG algorithm. The locations of the moving aircraft traffic (nodes and/or platforms) are sorted and ordered on a grid structure in real space and in an indexing space, causing a monotonic mapping between indices of the grid structure and locations describing the plurality of moving aircraft. Computer implemented operations use data stored in the multidimensional MLG to determine, in real time, separation assurance between all aircraft of the plurality of moving aircraft in dynamic global models of transport systems, resulting in avoidance of blockages in transport paths, and avoidance of collisions of the plurality of aircraft moving in complex paths, in the various transport systems.

BRIEF DESCRIPTION OF THE DRAWINGS

FIG. 1B illustrates a table showing the regularly-spaced grid indices (in i-j space) of the nodes shown on the FIG. 1A. That is, node 15 is indexed at i=1, j=1; node 6 is indexed at i=2, j=1.

FIG. 4A illustrates a time sequence of a scenario in which aircraft travel in a straight path from one side to the other.

FIG. 4B illustrates t=2, which is a time sequence at an interval of one hour of physical time, after time zero (t=0) described in FIG. 4A.

FIG. 4C illustrates t=3, which is a time sequence at an interval of one hour of physical time from t=2.

FIG. 4D illustrates t=4, which is a time sequence at an interval of one hour of physical time from t=3.

FIG. 4E illustrates t=5, which is a time sequence at an interval of one hour of physical time from t=4.

FIG. 4F illustrates t=6, which is a time sequence at an interval of one hour of physical time from t=5.

FIG. 5A illustrates the structure of the MLG at 1 hour of physical time. Although the simulation tracks 4,900 aircraft, FIG. 5A through FIG. 5D show every other node in x and y (1,225 nodes) for visual clarity.

FIG. 5B illustrates structure of the MLG at 2, hours of physical time.

FIG. 5C illustrates structure of the MLG at 3, hours of physical time.

FIG. 5D illustrates structure of the MLG at 4, hours of physical time.

DETAILED DESCRIPTION OF THE INVENTION

Figure 1A:
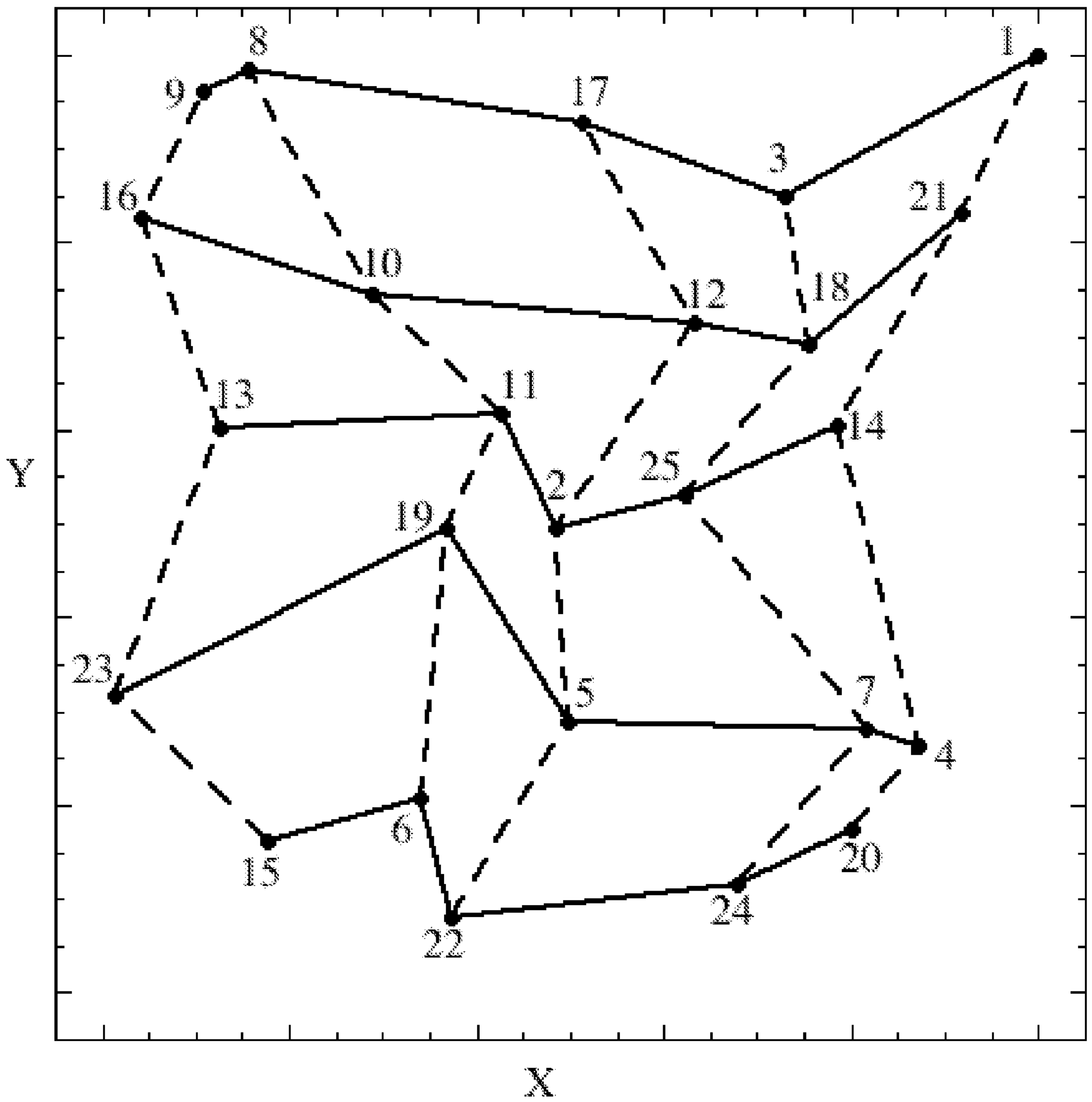
FIG. 1A illustrates an example of a two-dimensional (5×5) MLG; and shows the physical x- and y-locations of 25 labeled nodes.

Preferred exemplary embodiments of the present invention are now described with reference to the figures, in which like reference numerals are generally used to indicate identical or functionally similar elements. While specific details of the preferred exemplary embodiments are discussed, it should be understood that this is done for illustrative purposes only. A person skilled in the relevant art will recognize that other configurations and arrangements can be used without departing from the spirit and scope of the preferred exemplary embodiments. It will also be apparent to a person skilled in the relevant art that this invention can also be employed in other applications. Further, the terms "a", "an", "first", "second" and "third" etc. used herein do not denote limitations of quantity, but rather denote the presence of one or more of the referenced items(s).

A multidimensional Monotonic Lagrangian Grid (MLG) is used as a tool for rapid prediction and modeling that enables active design of air transportation systems. A multidimensional MLG can maintain safe separation between many aircraft in a complex airspace, such as the Next Generation Air Transportation System (NGATS), in which the use of high altitude airspace will increase and aircraft will use automated separation assurance methods. According to Kopardekar, P. Bilimoria, K. and Sridhar, B., "Initial Concepts for Dynamic Airspace Configuration." AIAA Paper 2007-7763, American Institute of Aeronautics and Astronautics, Reston, Va., 2007, in an automated operation, airspace management will include managing complexity operations, where the complexity threshold is considered to be manageable if an additional aircraft can enter the airspace without causing a safety critical situation. An aircraft entering the airspace should be able to choose its flight path through the airspace, and in a conflict situation, it should have at least one degree of freedom available to resolve any conflict. If that one degree of freedom is not available, then that airspace must be considered full. The automated operation of NGATS is vastly different form the current air-transport system, in which the amount of air traffic in a given sector is limited by the workload of the controller. The multidimensional MGL disclosed herein simulates air traffic flow in at least 3-D volume to gain a better understanding of when a volume of airspace is controllable.

When using the MLG for sorting and ordering aircraft locations, air traffic models can run very much faster than real time, and therefore can be used for rapid evaluation of rules and methods to control and optimize complex transport systems. In addition, new capabilities described herein are added to the MLG and include the insertion of self-adapting "holes," which serve as blank placeholders within the MLG structure to force the grid to be well structured everywhere.

The MLG is a free-Lagrangian data structure for storing the positions and other data needed to describe N moving bodies. A node (point in space) with three spatial coordinates has three indices in the MLG data arrays. Data relating to each node are stored in computer memory locations defined by these indices. Thus, nodes which are close to each other in physical space are always near neighbors in the MLG data arrays. A computer program based on the MLG data structure does not need to check N−1 possible distances to find which nodes are close to a particular node. The indices of the neighboring nodes are automatically known, because the MLG node indices vary monotonically in all directions with the Lagrangian node coordinates. For example, as shown in FIG. 1A, it is automatically known that near neighbors of aircraft 11 are aircraft 16, 10, 12, 13, 2, 23, 19, 5, without having to check the distances of all 24 remaining aircraft. The cost of the tracking algorithm is dominated by the calculation of the interactions of nodes with their near neighbors, and the timing therefore scales as N.

In accordance with exemplary embodiments, a dynamic global particle model is developed to be used in a test-bed framework for evaluating approaches to global air systems control and optimization, in reaction to local and global perturbations. The underlying algorithm is the multidimensional MLG algorithm, which is a data structure for storing and ordering particle positions and other data needed to describe N moving bodies. Particles that are close to each other in physical space are always near neighbors in the MLG data arrays, resulting in a fast nearest-neighbor interaction algorithm that scales, according to the number of particles. Results are presented from a series of test problems in which 4,900 aircraft traverse a 2,500 mi×2,500 mi area. In some scenarios, the aircraft travel a straight path to their final destination; in other scenarios, the aircraft must circumvent a restricted area. Various empirical rules for the aircraft are tested using the MLG, in regard to avoid no-fly zones and quantify the delay time for each test case. Results indicate that delays due to collision avoidance only are relatively insignificant. However, when aircraft are rerouted to avoid a restricted area, the rules which govern the detour significantly affect the time in which the aircraft arrive at their final destination.

The multidimensional MLG algorithm sorts and orders objects on a grid structure, such that each grid line in each spatial direction is forced to be a monotone index mapping. FIG. 1A illustrates a small two-dimensional (5×5) MLG having 25 MLG nodes (points in space) at their irregular spatial physical locations, while in FIG. 1B, the table shows the grid indices (in i-j space) of each node. Although the nodes are irregularly spaced (left figure), they are indexed regularly in the MLG by a monotonic mapping between the grid indices and the node locations. Nodes that are close in physical space are always near neighbors in the MLG data arrays. A computer program based on the MLG data structure does not need to check N−1 possible distances to find which nodes are close to a particular node. Rather, the indices of the neighboring nodes are automatically known because the MLG node indices vary monotonically in all directions with the Lagrangian node coordinates. This is the major advantage of the extended MLG data structure for air traffic modeling. Extensive searches to find nearby aircraft are eliminated, allowing many more aircraft to be safely tracked on modest computers in real time.

When putting nodes in MLG order, the MLG algorithm sorts each axis individually. That is, for a 5×5 MLG, it sorts the first five points in the x-direction, then the next five points in the x-direction, etc. After all 25 points have been sorted in the x-direction, it then sorts all 25 points in the y-direction. As each axis becomes sorted, the sorting process may destroy monotonicity in the other axes. So, the sorting process is repeated until all axes are monotonic. The MLG uses two sorting algorithms to put nodes in order. One algorithm is a bubble-sort, in which each node is compared with the one following it, and if they are not in monotonic order, they are switched. This bubble-sorting algorithm is best used when the nodes are already partially pre-sorted. The other algorithm is a shell-sort, in which each node is compared with one that is a half-axis length away, and if the two nodes are not in monotonic order, they are switched. This shell-sorting algorithm is best for completely random data.

When using the MLG algorithm, the user can specify the sort direction (sort from left to right, or from right to left), the axis order (sort x-axis first, then y-axis, or the reverse), and the sorting algorithm (bubble or shell sort). All of these factors affect the MLG that is obtained. Table 1 shows the number of possible MLGs that can be obtained for a given number of nodes. As shown in the table, even for a small number of nodes, such as 16, there can be up to 405 possible MLGs.

TABLE 1

| No. of Nodes | MLG Shape | No. of possible MLGs |
|---|---|---|
| 4 | 2x2 | 1-2 |
| 9 | 3x3 | 3-12 |
| 16 | 4x4 | 91-405 |
| 25 | 5x5 | 10130-97799 |

Nomenclature:

N=the number of particles in the system;

x, y, z=coordinates of the particles in 3D;

i, j, k=indices of the particles in the data structure; and

Nx, Ny, Nz=the number of particles in directions x, y, z, respectively.

Development of strategies for effective design and control of complex aspects of air transportation systems requires having a fast research tool for modeling various layers of air traffic systems.

According to exemplary embodiments, a dynamic global model is developed to be used for simulating the air traffic flow in a test-bed framework for evaluating approaches to global air systems control and optimization. The model can quickly track and sort positions of more than 10,000 aircraft, both on the ground (at airports) and in the air. The dynamic global model is used as an aid for testing various control strategies, such as conflict detection and resolution, as well as evaluating the performance of the system (e.g., system's reaction to local and global perturbations) in the context of new system concepts under evaluation. According to exemplary embodiments, the dynamic global model is to determine the most efficient way to reroute air traffic after local conditions, such as thunderstorms, have greatly perturbed an entire transport system.

The underlying algorithm and data structure are embodied in the MLG. The MLG has been used for two decades as the underpinning for other particle dynamics simulations, including molecular dynamics, direct simulation Monte Carlo and missile defense applications. A three-dimensional (3D) MLG data structure is defined by the following constraints:

$$x(i,j,k) \leqq x(i+1,j,k)\ i=1, \ldots, Nx-1;\ j=1, \ldots, Ny;\ k=1, \ldots, Nz,$$

$$y(i,j,k) \leqq y(i,j,+1,k)\ i=1, \ldots, Nx;\ j=1, \ldots, Ny-1;\ k=1, \ldots, Nz$$

$$z(i,j,k) \leqq z(i,j,k+1)\ i=1, \ldots, Nx;\ j=1, \ldots, Ny;\ k=1, \ldots, Nz-1, \quad (1),$$

These constraints mean that each grid line in each spatial direction is forced to be a monotone index mapping.

FIG. 1A illustrates a two-dimensional MLG. FIG. 1A shows a 2D MLG (5×5) containing the x- and y-locations of 25 labeled aircraft. The solid black (horizontal) lines show the x-links and the dashed (vertical) lines show the y-links. Although the nodes are irregularly spaced, they are indexed regularly in the MLG by a monotonic mapping between the grid indices and the physical locations. FIG. 1B shows a table with regular grid indices of the nodes shown in FIG. 1A, where aircraft-15 is indexed at i=1, j=1; aircraft-6 is indexed at i=2, j=1, etc.

According to exemplary embodiments, as shown in FIG. 1A and FIG. 1B, the near neighbors of node 11 are nodes 16, 10, 12, 13, 2, 23, 19, 5, and are known without having to check the distances of all 24 remaining nodes. The cost of most tracking algorithms using the MLG is dominated by the calculation of the interactions of nodes with their near neighbors, and thus the timing scales as N. For applications involving a large number of nodes, such as this air-traffic problem, knowing each node's nearest neighbors automatically, without having to check all possible distances (a calculation of order $N^2$), results in significant computational savings.

Figure 2A:
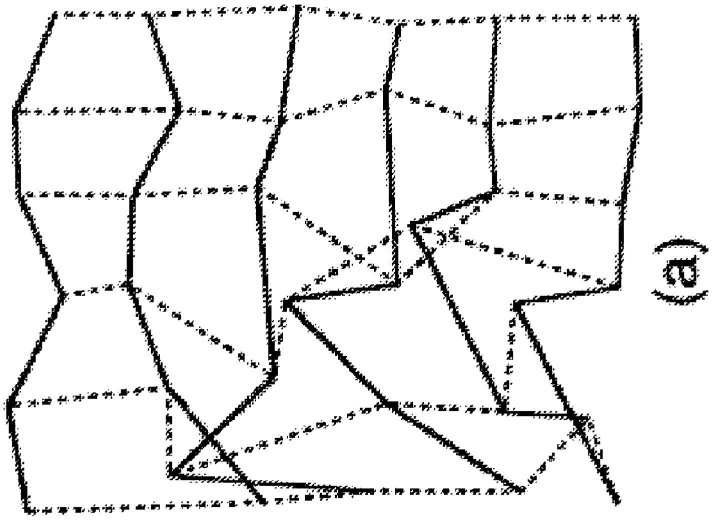
FIG. 2A illustrates an MLG obtained when sorting nodes from a random order, which is a valid MLG, as it satisfies the constraints in equation 1.
Figure 2B:
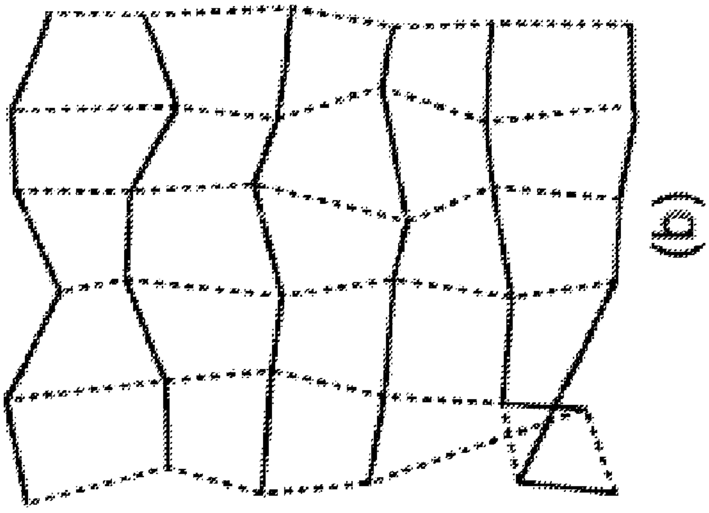
FIG. 2B illustrates how the Stochastic Grid Regularization technique restructures the tangled grid after one iteration of the Stochastic Grid Regularization technique is completed.
Figure 2C:
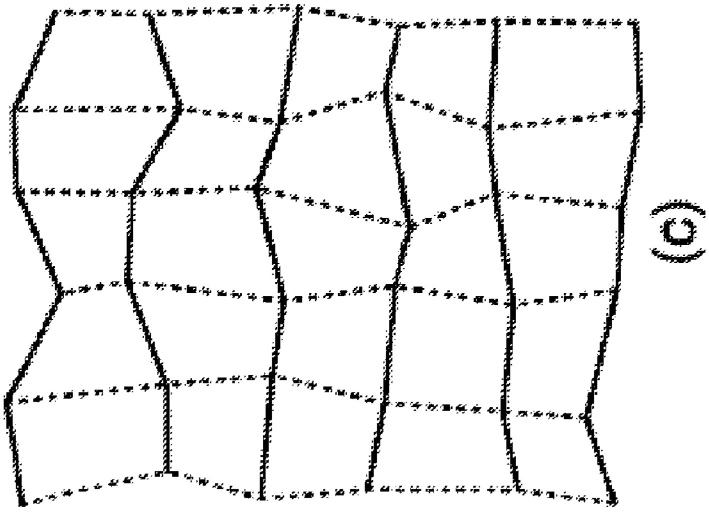
FIG. 2C illustrates how the Stochastic Grid Regularization technique restructures the tangled grid after two iterations of Stochastic Grid Regularization technique are completed.

FIG. 2A, FIG. 2B and FIG. 2C illustrate, respectively, three different MLGs based on the same set of node locations. The image in FIG. 2A (i.e., image (a)) shows an MLG obtained when sorting nodes from a random order. This is a valid MLG, as it satisfies the constraints in equation 1. However, this is a poor quality MLG, because it is tangled, and therefore nodes which are nearest-neighbors in i-j space may actually be far apart in physical space. The image in FIG. 2B (i.e., image (b)) is the same MLG after one iteration of the Stochastic Grid Regularization technique is completed, while FIG. 2C (i.e., image (c)) is the same MLG after two iterations of the Stochastic Grid Regularization technique are completed. These figure are taken, with permission, from Sinkovits et al., 1993. A set of diagnostics used during simulations, gauges the quality of an MLG. The diagnostics are based on a dot product which indicates how close an x-link is to the horizontal axis, and how close a y-link is to the vertical axis. A perfectly orthogonal MLG would have a dot product equal to unity for all x-links and y-links. An MLG based on real data (such as positions of aircraft in the air) would never form a perfectly orthogonal MLG. Further, according to Sinkovits, R. S., Oran, E. S. and Boris, J. P., "A Technique for Regularizing the Structure of a Monotonic Lagrangian Grid," J. of Computational Physics, 108, 368 (1993), and yet further according to Sinkovits, R. S., Boris, J. P. and Oran, E. S., "The Stability and Multiplicity of the Monotonic Lagrangian Grid," NRL Memorandum Report 6410-97-7937, 1997, the MLG algorithm uses a grid restructuring technique, called Stochastic Grid Regularization (SGR) to choose an MLG with the highest quality. The SGR technique is a simulated annealing process, in which the nodes are randomly perturbed, and an MLG of the perturbed nodes is used as a starting point for creating an MLG of the original (unperturbed) nodes. This technique can be applied locally to the parts of the MLG which are tangled, and it does not significantly increase the cost of the overall calculation. The image in FIG. 2B and the image in FIG. 2C illustrate how the SGR technique restructures the tangled grid after one and two SGR iterations are completed. Therefore, three different MLGs can be based on the same set of node locations. FIG. 2A illustrates an MLG obtained when sorting nodes from a random order. FIG. 2B illustrates the same MLG after one iteration of SGR, while FIG. 2C illustrates the same MLG after two iterations of SGR.

Methodology: The MLG in the global particle model is used as a method for ordering and tracking locations of many aircraft for various test case scenarios. Although the model is 3D, 2D case results are presented, to facilitate visualization. The overall methodology of the global particle model tracking consists of the following operations:

1. Read the flight plan and assign each aircraft: an ID, an initial x-, y-, z-location, a final x-, y-, z-location, and an average speed;

2. Calculate an initial velocity vector for each aircraft, assuming a straight path between its initial and final destinations;

3. Put data (aircraft ID and current (x, y, z) locations) into the MLG data structure: The MLG can be at least a two-dimensional array or more, where the first dimension corresponds to the number of sort variables, and the second dimension corresponds to the number of aircraft in the MLG. For this air traffic application, the number of sort variables is four (x-, y-, z-locations and an ID number for each aircraft) and the number of aircraft is N. Therefore, the MLG data structure is:

$$\text{MLG}(i,N),\ \text{where } i=1, \ldots, 4 \quad (2)$$

$$i=1: x\text{-location} \quad (3)$$

$$i=2: y\text{-location} \quad (4)$$

$$i=3: z\text{-location} \quad (5)$$

$$i=4: \text{aircraft ID} \quad (6)$$

4. Sort aircraft, using the MLG algorithm. Although the aircraft are sorted based only on physical location (so that nearest neighbors are automatically and/or intuitively known), the aircraft IDs are included in the MLG data structure, so that other information (i.e., velocity, flight time, and final destination) can be cross-referenced for each aircraft, as defined in the flight plan. This additional information in the flight plan is not carried within the MLG, as it would increase memory requirements and slow down the sorting computation.

5. Execute diagnostics to check the quality of the MLG;

6. Avoid restricted area (e.g., bad weather in a no-fly zone) as follows:

Project forward in time for each aircraft. If the projected flight path is expected to enter the restricted zone, calculate a new velocity vector. The amount of time projected forward and the direction of the new velocity vector depend on the particular test scenario.

Figure 2D:
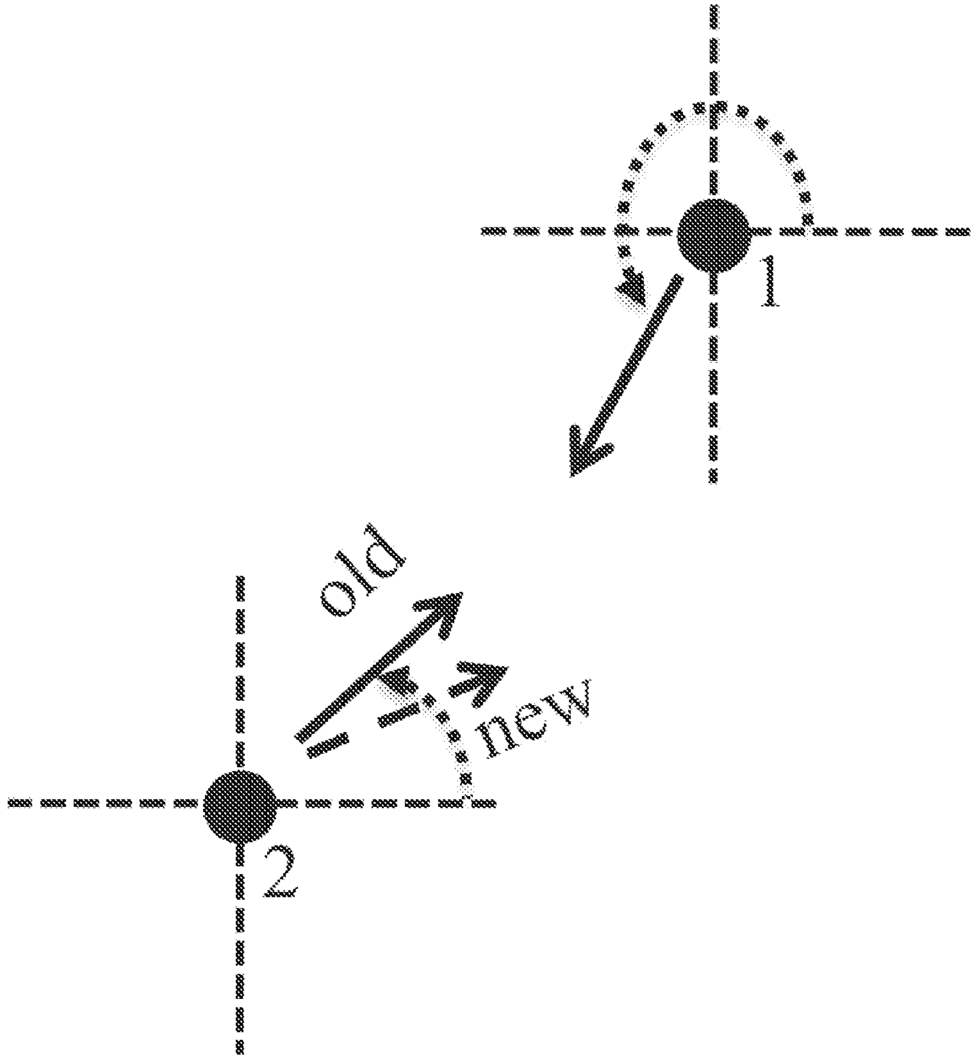
FIG. 2D illustrates a schematic of a conflict detection and resolution maneuver between two aircraft, that are within five miles of each other after projecting forward in time for 10 seconds.

7. Avoid collisions: Check nearest neighbors for potential collisions. If aircraft are within five miles of each other (approximately 30 seconds apart), then project forward in time for 10 seconds. Then, if the aircraft are still within five miles of each other, modify the velocity vector, as necessary, to avoid collision. The amount that the velocity vector is modified depends on the relative velocities and positions of the aircraft. FIG. 2D illustrates a schematic of a collision avoidance maneuver between two aircraft, that are within five miles of each other after projecting forward in time for 10 seconds. The direction of the velocity vector for each aircraft (before the collision avoidance move) is shown by the solid black arrow representing aircraft 1 and the solid black arrow representing aircraft 2, and the angle between the velocity vector for each aircraft and the positive x-axis of each aircraft is shown by the curved dotted arrow(s). The collision avoidance algorithm (i.e., the conflict detection and resolution algorithm) modifies the direction of one aircraft by 30 degrees (in this illustration the direction of aircraft 2 is modified), while maintaining the same velocity magnitude for that aircraft (i.e., for aircraft 2). To avoid collision with aircraft 1, the angle of the velocity vector of aircraft 2 is adjusted by 30 degrees, as shown by the arrow having longer black dashes, labeled "new", which is offset 30 degrees from the solid black arrow labeled "old".

8. Move aircraft, based on velocity vector computed above thereby moving aircraft, based on each aircraft's computed velocity vector. This is either the velocity vector derived from the flight plan or the velocity vector that has been calculated in operation 7 for conflict detection and resolution. The aircraft are advanced forward 10 seconds in time.

9. At one minute intervals, recalculate the velocity vector for each aircraft, so that there is a straight path to final x-, y-, z-locations. This operation is periodically necessary because the aircraft have been detoured in operations #6 and #7, to avoid restricted areas and/or to avoid collisions.

10. Increment time, and go back to operation #4.

When checking nearest-neighbors for potential collisions, in operation 5, a buffer zone of three nodes (i.e., three aircraft) are checked in each direction from the node of interest, such that three nodes to the right are checked, three notes to the left are checked, three nodes up are checked, three nodes down are checked, three nodes forward are checked, and three nodes backward are checked. Because it is possible, although unlikely, that a node outside of this buffer zone is still a close neighbor to the node of interest, all nodes for potential collisions are checked, at one minute intervals. In order to avoid having to check all nodes periodically, new capabilities are added to the MLG, including the insertion of self-adapting "holes," which serve as blank placeholders within the MLG structure. These placeholders will force the grid to be well structured everywhere, and may ensure that all near-neighbors are within the checked buffer zone.

The operations outlined above represent a tracking strategy used for testing a fast air-traffic simulator using the MLG. Different algorithms for conflict detection and resolution or aircraft separation maintenance, for example, will replace specific operations listed above, as appropriate, to improve the overall performance of the air traffic system.

Figure 3:
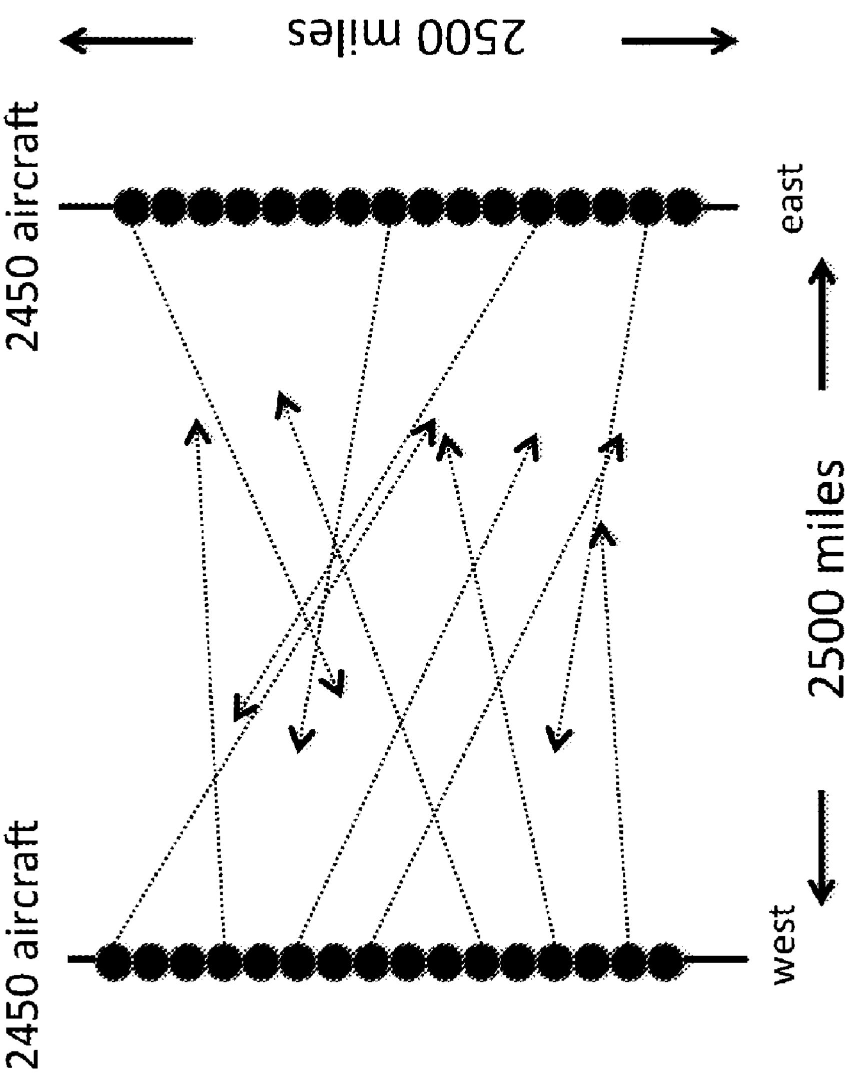
FIG. 3 illustrates a simplified schematic diagram of a test problem.

Exemplary scenarios developed from computing a series of test problems provide the following results: According to the series of test scenarios, 4,900 (i.e., approximately 5,000) aircraft travel over a 2,500 mile×2,500 mile area; this is a scenario which is analogous to having 4,900 aircraft traveling over an area equivalent to the area of the United States. In some scenarios, the aircraft travel a straight path to their final destination; in other scenarios, the aircraft must circumvent a restricted area. Initially, half of the aircraft are randomly placed on the east side of the domain and are randomly assigned a final destination on the west side of the domain; the other half are randomly placed on the west side of the domain and are randomly assigned a final destination on the east side of the domain. A schematic of this test problem is illustrated in FIG. 3, which shows a simplified schematic diagram of the test problem, where the full scenario includes 4,900 aircraft, of which half are randomly placed along the east border (i.e., the east side of the domain), and the other half are randomly placed along the west border (i.e., the west side of the domain). Each aircraft is randomly assigned a final destination on the other side of the domain, and each aircraft is also randomly assigned an average speed ranging from 400 to 500 miles/hr.

A. Scenario 1—straight path to final destination: According to exemplary embodiments, the aircraft travel along a straight path to the other side of the domain, and the only detours allowed are to avoid collisions between aircraft. The aircraft are represented by point coordinates. An average speed for each aircraft is randomly assigned, ranging from 400 to 500 miles per hour. Various empirical rules are tested for the aircraft to avoid restricted zones and quantify the delay time for each case. These simulations are significantly faster than real time. Test problems involving approximately 5,000 aircraft for 10 hours of physical time, require only 10 minutes of CPU time on a single processor workstation.

FIG. 4A through FIG. 4F illustrate a time sequence of a scenario in which aircraft travel in a straight path from one side to the other, in a given domain. Furthermore, FIG. 4A through FIG. 4F are shown at incremented intervals of one hour of physical time (i.e., FIG. 4A through FIG. 4F show a time sequence from zero to five hours of physical time). In FIG. 4B through FIG. 4F, each little dot corresponds to one aircraft. In this scenario, the only detours are for collision avoidance between aircraft.

FIG. 4A corresponds to time zero (i.e., t=0), where half of the aircraft are on the east side of the domain, and half the aircraft are on the west side of the domain. Furthermore, FIG. 4A illustrates a time sequence of a scenario, in which aircraft travel in a straight path from one side of a domain to the other side of the domain.

FIG. 4B illustrates a time sequence at an interval of one hour of physical time.

FIG. 4C illustrates a time sequence at another interval of an additional one hour of physical time.

FIG. 4D illustrates a time sequence at another interval of an additional one hour of physical time.

FIG. 4E illustrates a time sequence at another interval of one hour of physical time; and FIG. 4F illustrates a time sequence at another interval of an additional one hour of physical time. After one hour of physical time, as shown in FIG. 4B (i.e., image (b)), the two groups of aircraft are moving towards each other, and the spread within each group is due to the difference in average speed and velocity vectors among the aircraft. After two hours, the two groups have merged at the center of the computational domain (where the computational domain can be considered a country or nation), and the number of collision-avoidance moves is at its peak. By three hours, the groups have begun to separate, as the aircraft move to opposite sides of the domain, but there is still a cluster of aircraft from both groups at the center of the domain. After four hours (FIG. 4E) (i.e., image (e)), the groups have completely separated, and by six hours (not shown), most aircraft have reached their final destination on the other side of the domain.

Figure 5E:
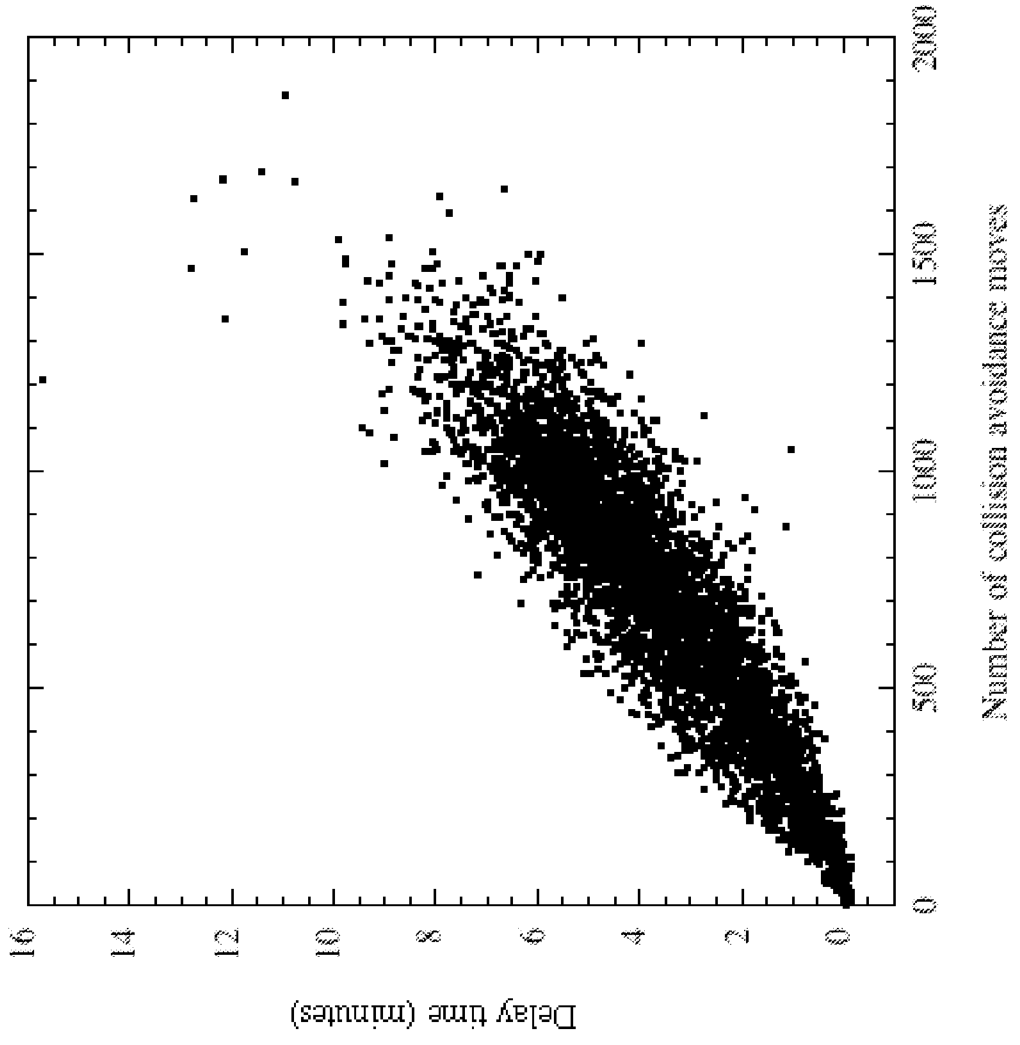
FIG. 5E illustrates delay times, defined as the actual arrival time minus the ideal arrival time, as a function of the number of collision-avoidance moves for each aircraft.
Figure 6A:
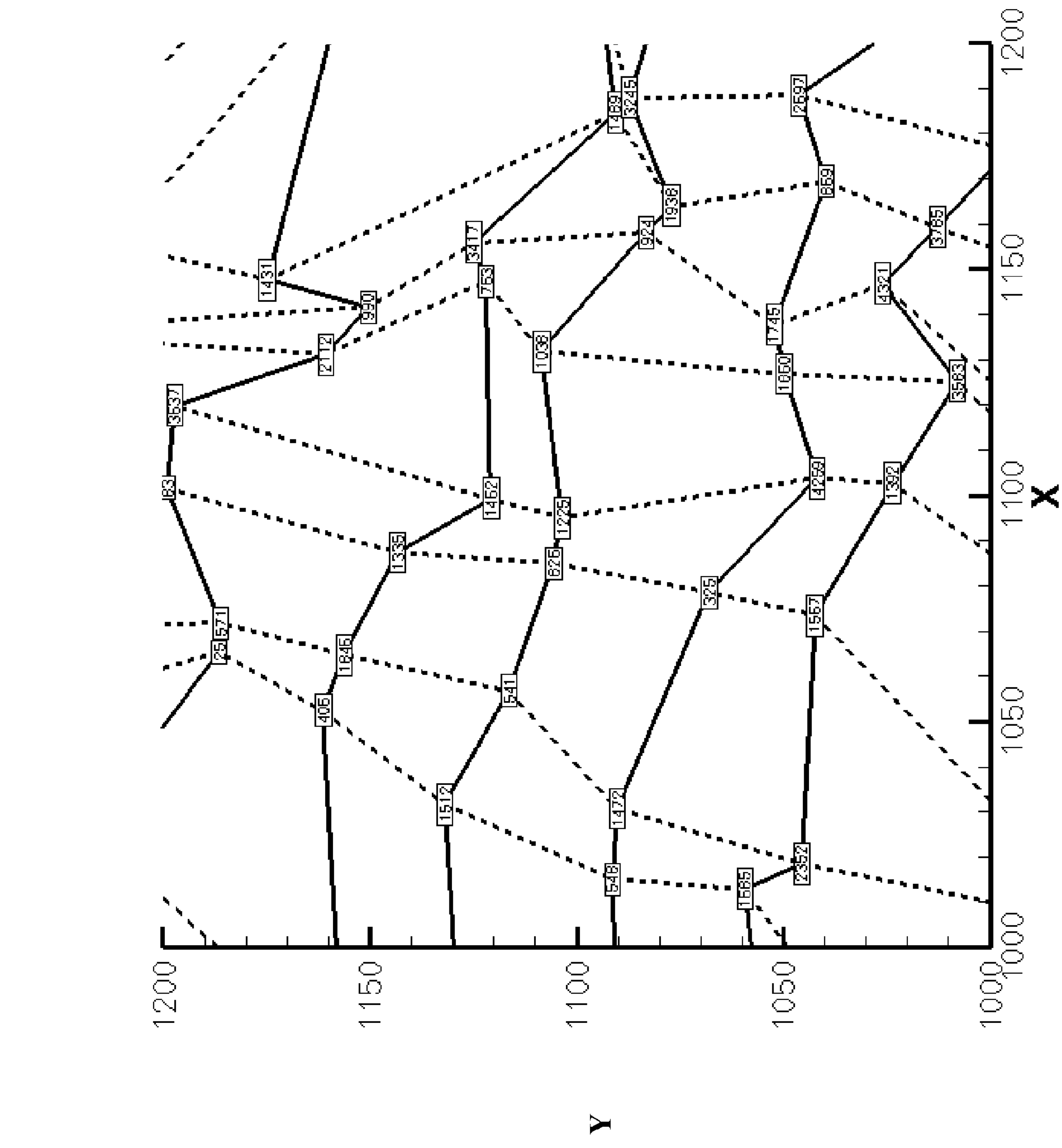
FIG. 6A illustrates a zoomed-in image of the instantaneous MLG structure and shows the physical locations and ID number for each aircraft in the MLG. The solid black lines represent the x-links, while the dotted red lines represent the y-links.

FIG. 5 through FIG. 5D illustrate the MLG structure corresponding to 1, 2, 3 and 4 hours of physical time. Although the simulation contains 4,900 nodes (aircraft), the MLGs in FIG. 5A through FIG. 5D plot every other node in each direction for visual clarity. The structure of the MLG changes with every time operation (see operation 4 above) and, as shown in FIG. 5A through FIG. 5D, it changes dramatically during the course of the simulation. An enlarged portion of the MLG in FIG. 6A shows the physical location (x,y) and also the ID number of each aircraft.

According to exemplary embodiments, during the simulation, the number of the collision-avoidance maneuvers were tracked for each aircraft, and each aircraft's arrival time at its final destination. An ideal arrival time was calculated, which is the time the aircraft takes to travel in a straight path to final destination, without making detours to avoid collisions. FIG. 5E shows the delay time (actual minus ideal arrival time) in minutes for each aircraft, as a function of the number of collision avoidance moves for each aircraft. As expected, the delay time for each aircraft increases with the number of collision-avoidance maneuvers, with a significant amount of statistical scatter among the 4,900 aircraft. In practically all cases, the delay time is less than 10 minutes, which is insignificant compared to flight times of five to six hours.

Figure 6B:
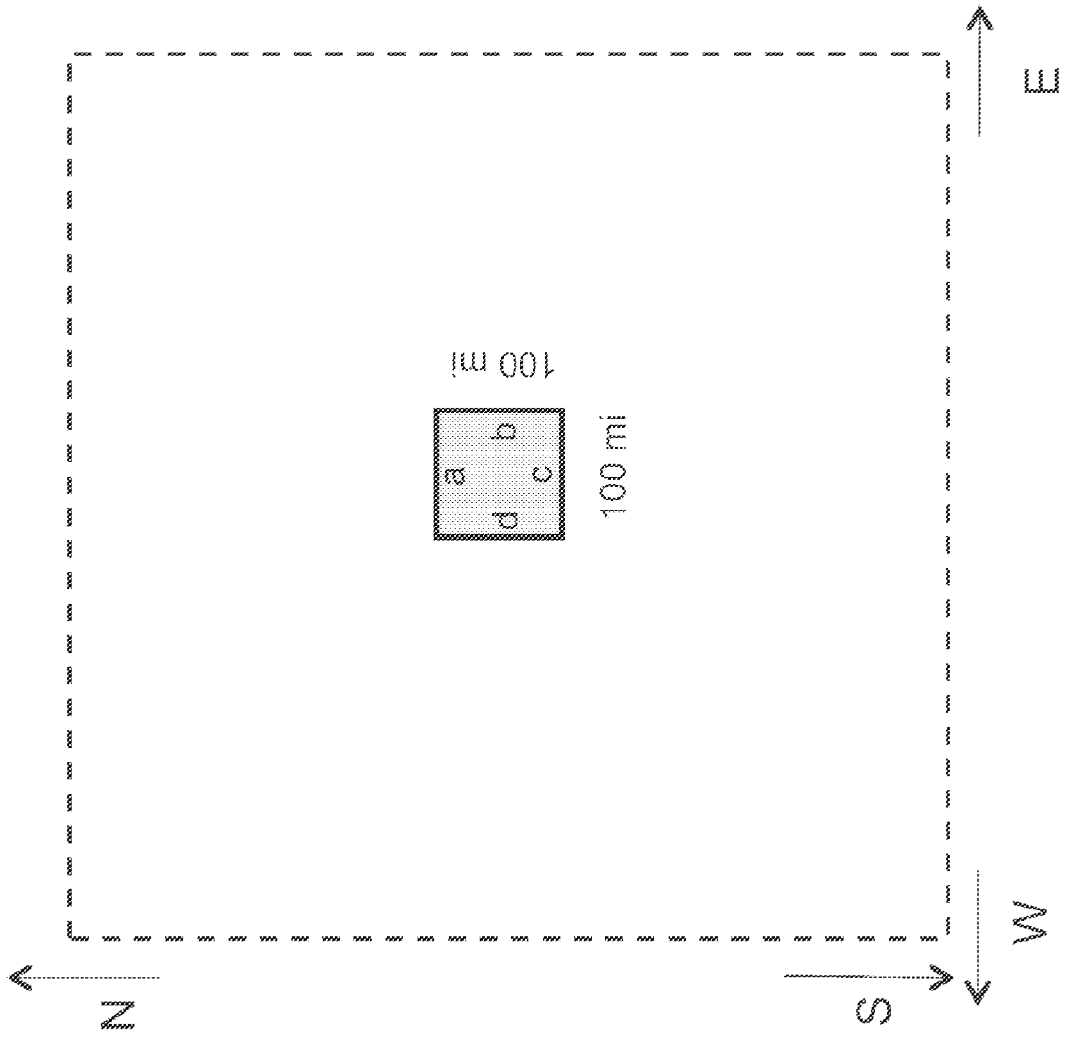
FIG. 6B illustrates a restricted area measuring 100 mi×100 mi and is located in the center of the computational domain.
Figure 6C:
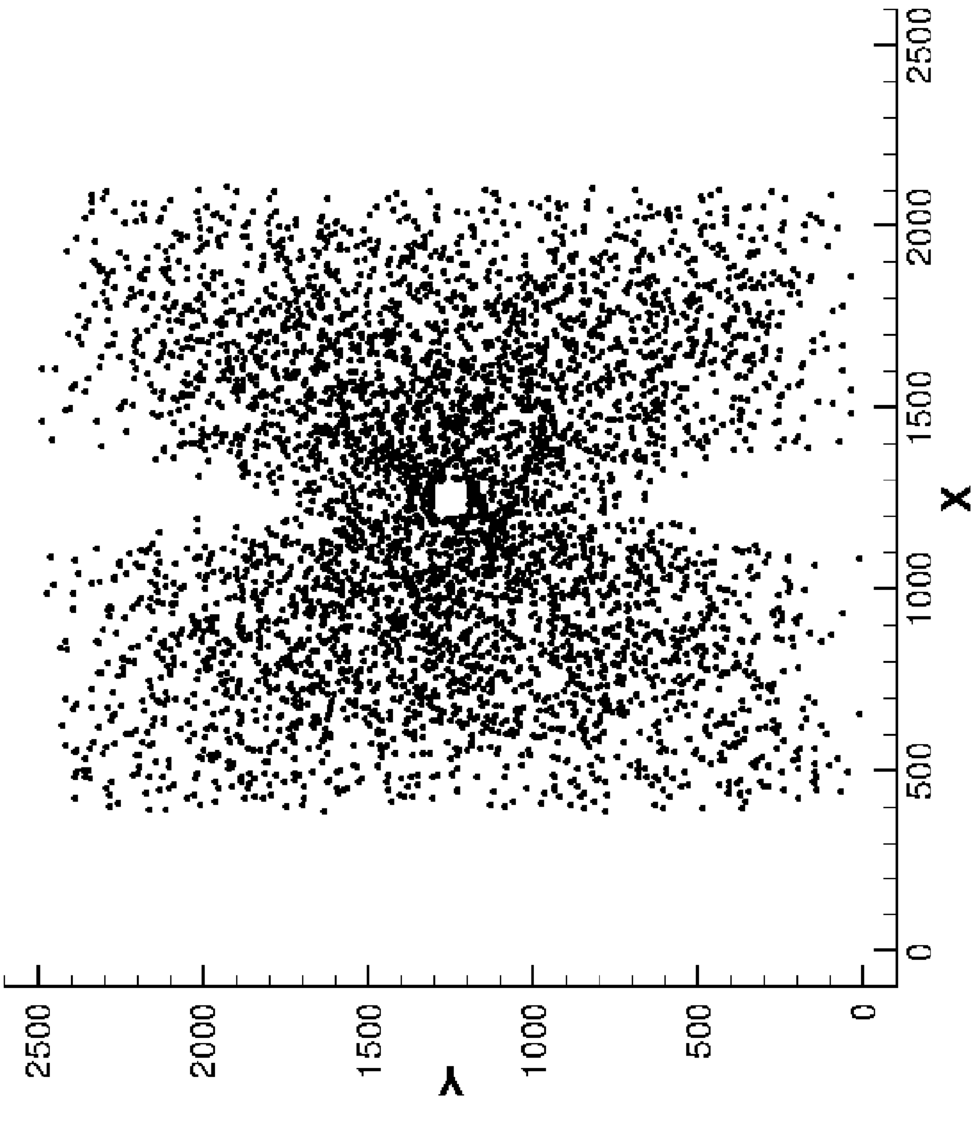
FIG. 6C illustrates an instantaneous image from one of the Scenario 2 test cases, showing the absence of aircraft in the restricted zone.

B. Scenario 2—Avoiding a restricted area in flight path: In a second test case scenario, there is a restricted area through which aircraft are not permitted to fly. This restricted area can represent an area of bad weather, or an imposed no-fly zone, due to government regulations. FIG. 6A shows a zoomed-in image of the instantaneous MLG structure and shows the physical locations and ID number for each aircraft in the MLG. The solid black lines represent the x-links, while the dotted lines represent the y-links. FIG. 6B, shows a blow up of the schematic for Scenario 2, where the restricted area measures 100 mi×100 mi and is located in the center of the computational domain. In this scenario, aircraft are required to circumvent the 100 mi×100 mi restricted area in the center of the computational domain. In these cases, only aircraft whose paths are projected to go through the restricted area are re-routed around it. All other aircraft, whose trajectories do not pass through this area, follow their intended paths. FIG. 6C shows an instantaneous image from one of the Scenario 2 test cases, further showing the absence of aircraft in the restricted zone. A series of simulations are conducted to test various "rules" to determine the best way for the aircraft to circumvent the restricted zone with the minimum amount of flight delay time. These simulations are performed with the same rules and initial conditions as used in Scenario 1, except for the presence of the restricted area, which must be circumvented by all aircraft projected to pass through it.

Figure 6D:
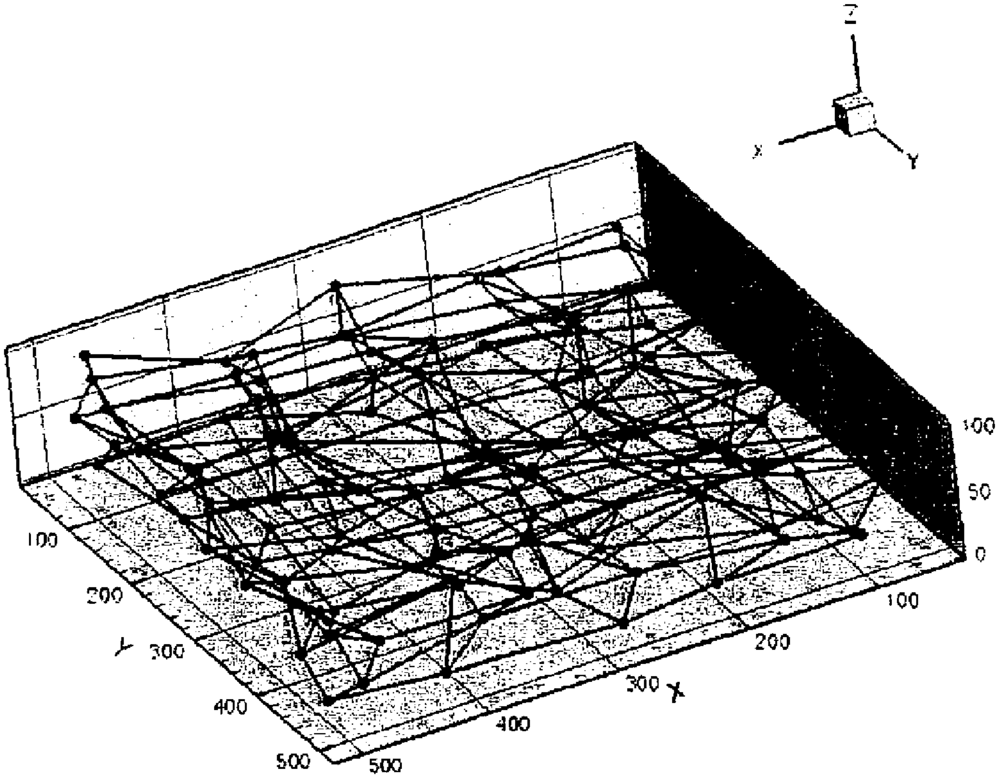
FIG. 6D illustrates a 3-D MLG, at one point in time, for a case involving 1000 aircraft.

FIG. 6D illustrates a 3-D MLG, at one point in time, for a case involving 1000 aircraft. The 3-D MLG image shows every other node, on each axis (i.e., x-, y-, and z-axes), for visual clarity; that is, rather than showing all 1000 ($10^3$) nodes, FIG. 6D shows 125 ($10^3/8$) nodes so that the 3-D MLG structure is clearer. The black dots represent the MLG nodes (i.e., the aircraft). The x-links, the y-links and the z-links are shown as connective lines, connecting the black dots representing distances between the aircraft.

A series of simulations were also conducted, in exemplary embodiments, to test various "rules" to determine the best way(s) for aircraft to circumvent a restricted zone with the minimum amount of flight delay time. FIG. 7 shows a schematic and an instantaneous image from one of these calculation determinations. The simulations show the ability of the model to account for and minimize the impact of sudden blockages in flight paths, to avoid near-collisions, and to suggest alternative flight path routes. The computations serve as a proof of concept for using the MLG as a platform for modeling aircraft separation assurance and other application contexts.

Figure 7A:
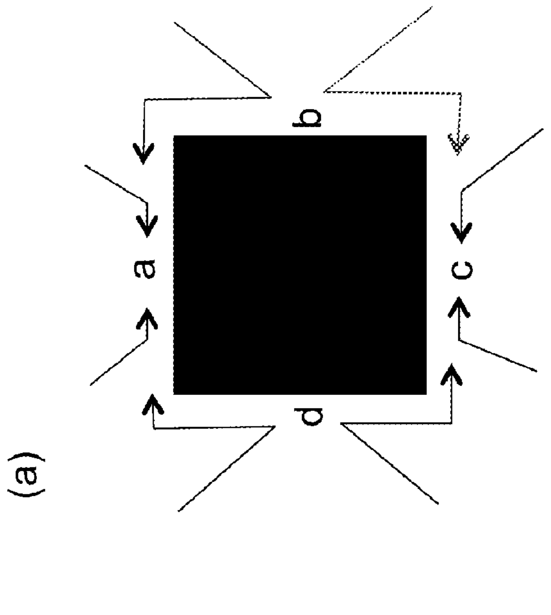
FIG. 7A illustrates the existence of a restricted zone that occurs suddenly (e.g., an unexpected thunderstorm), and aircraft must abruptly circumvent the region when they are within two minutes of the area.
Figure 7B:
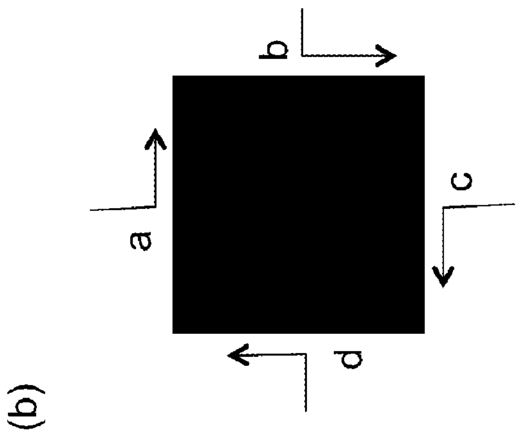
FIG. 7B also illustrates the existence of a suddenly occurring restricted zone, where an aircraft must abruptly circumvent the region when it is within two minutes of the area.
Figure 7C:
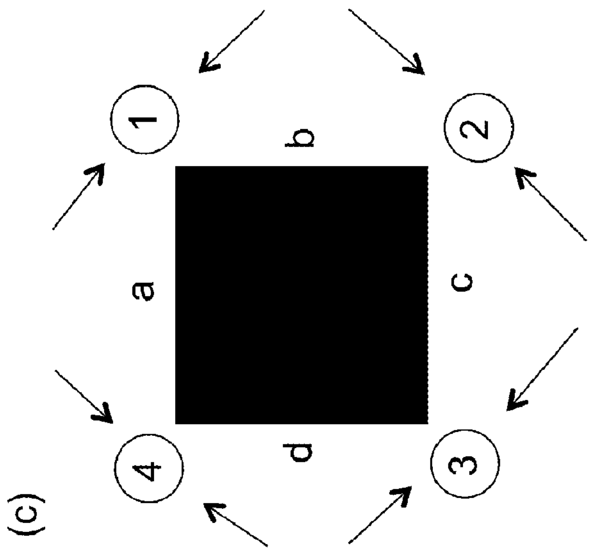
FIG. 7C illustrates where a pilot has some advance warning to plan a more direct route around the restricted area.

FIG. 7A, FIG. 7B, and FIG. 7C illustrate three sets of "rules" which govern how aircraft circumvent restricted zones. In FIG. 7A and FIG. 7B, the existence of a restricted zone occurs suddenly (e.g., an unexpected thunderstorm), the aircraft must abruptly circumvent the region when they are within two minutes of the restricted area. In FIG. 7C, the pilot has some advance warning to plan a more direct route around the restricted area.

In FIG. 7A, the aircraft that are projected to enter through face a are routed as shown by the two arrows at the top; that is, aircraft that enter from the northeast (and are headed west) are routed to the left, while aircraft that enter from the northwest (and are headed east) are routed to the right. Likewise, aircraft that would enter through face b are routed as shown by the two arrows at the right; that is, aircraft that enter from the northeast (and are headed west) are routed up and to the left, while aircraft that enter from the southeast (and are headed west) are routed down and to the left. As shown by all of the arrows in FIG. 7A, aircraft that are headed west travel to the left and aircraft that are headed east travel to the right. If the aircraft is coming from the north, it travels over the top, and if it is coming from the south, it travels around the bottom.

In FIG. 7B, the aircraft circumvent the restricted area by traveling in a clockwise direction. For example, aircraft which are projected to intersect face a are routed to the right and continue in a clockwise direction around the restricted area/zone until it can proceed in a straight line path to its final destination.

In FIG. 7C, the aircraft have advanced warning about the presence of the restricted area. The aircraft are rerouted to specific way-points (i.e., the numbered dots in FIG. 7C) 15 minutes before they would have arrived in the restricted zone. As shown in FIG. 7C, aircraft coming from the southeast are directed to the dot number (1) shown in the upper right-hand-corner, while those coming from the northeast are directed to the dot number (2) shown in the lower right-hand-corner.

Figure 8A:
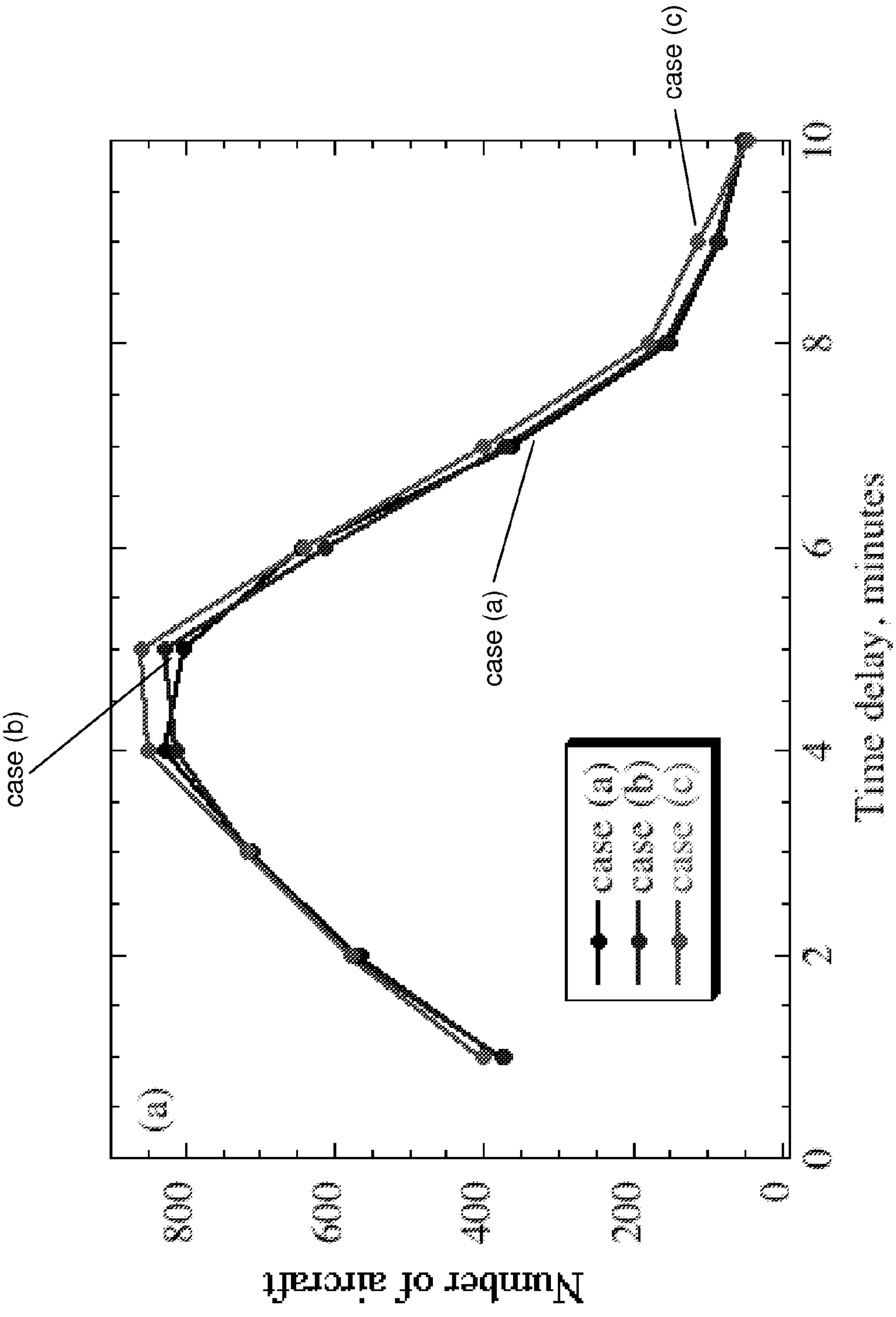
FIG. 8A illustrates delay time versus number of aircraft for short delay times (less than 10 minutes).
Figure 8B:
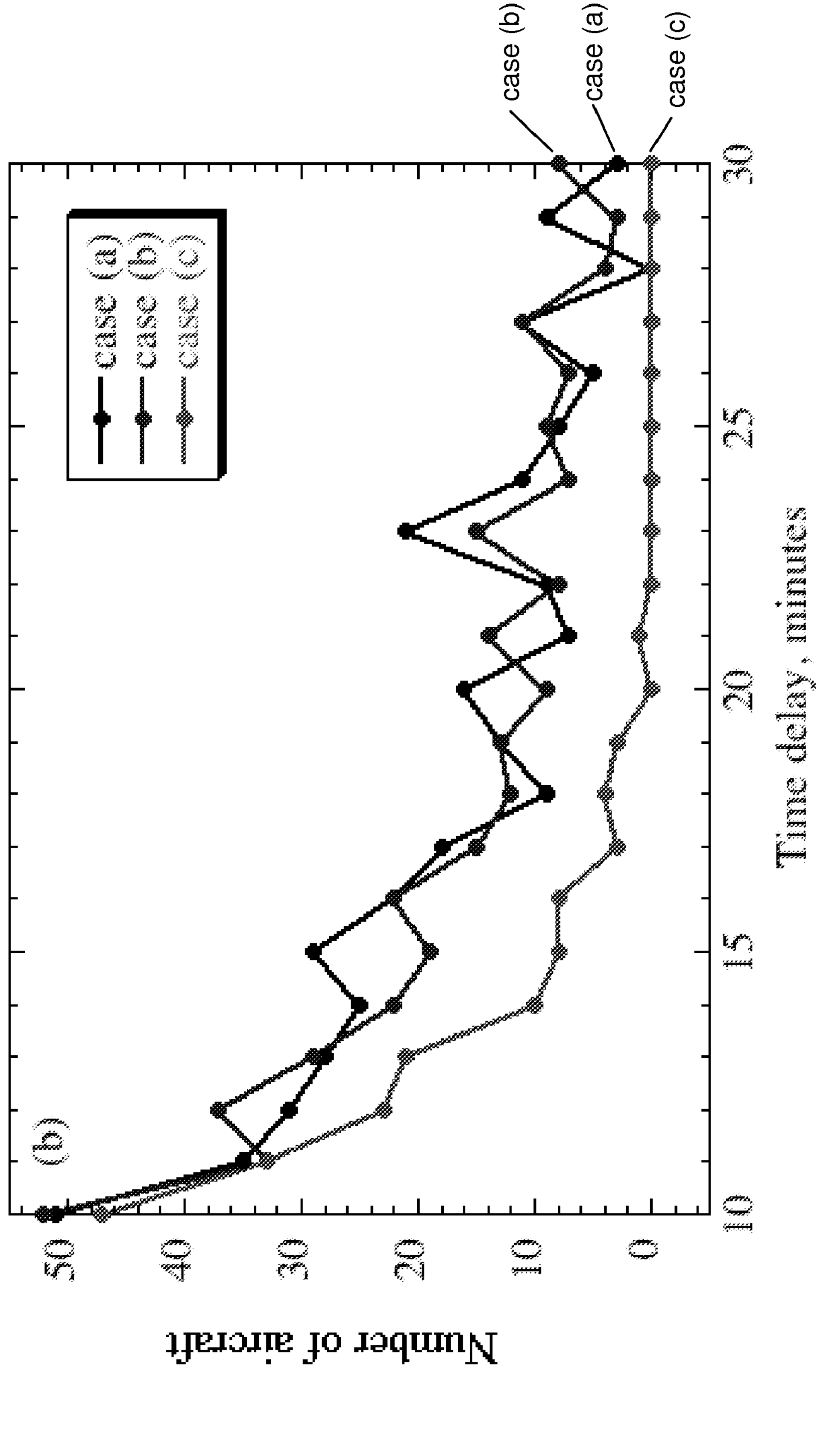
FIG. 8B illustrates delay time versus number of aircraft for longer delay times (10-30 minutes).

During these simulations, the arrival time of each aircraft is tracked at its final destination. The delay time is then calculated to be the arrival time minus the arrival time if the aircraft had traveled a straight path (if it had not avoided the restricted area). FIG. 8A and FIG. 8B illustrate the delay time versus the number of flights for the three cases, i.e., FIG. 8A delay time versus number of aircraft for short delay times (less than 10 minutes), and FIG. 8B, for longer delay times (10-30 minutes). FIG. 7A shows results out to 10 minutes of delay time, while FIG. 7B shows results from 10 to 30 minutes of delay time. FIG. 7C, shows the most aircraft having short delay times. This is an expected result, as the aircraft in this case began their detours 15 minutes in advance. There was not much difference between cases in FIG. 7A and FIG. 7B, which is an unexpected result, because it is expected that having all aircraft traveling in the same direction (as in case (b)) would have resulted in shorter delay times. As shown FIG. 7A, and FIG. 7C this resulted in significantly fewer aircraft having longer delay times, as expected.

Figure 9:
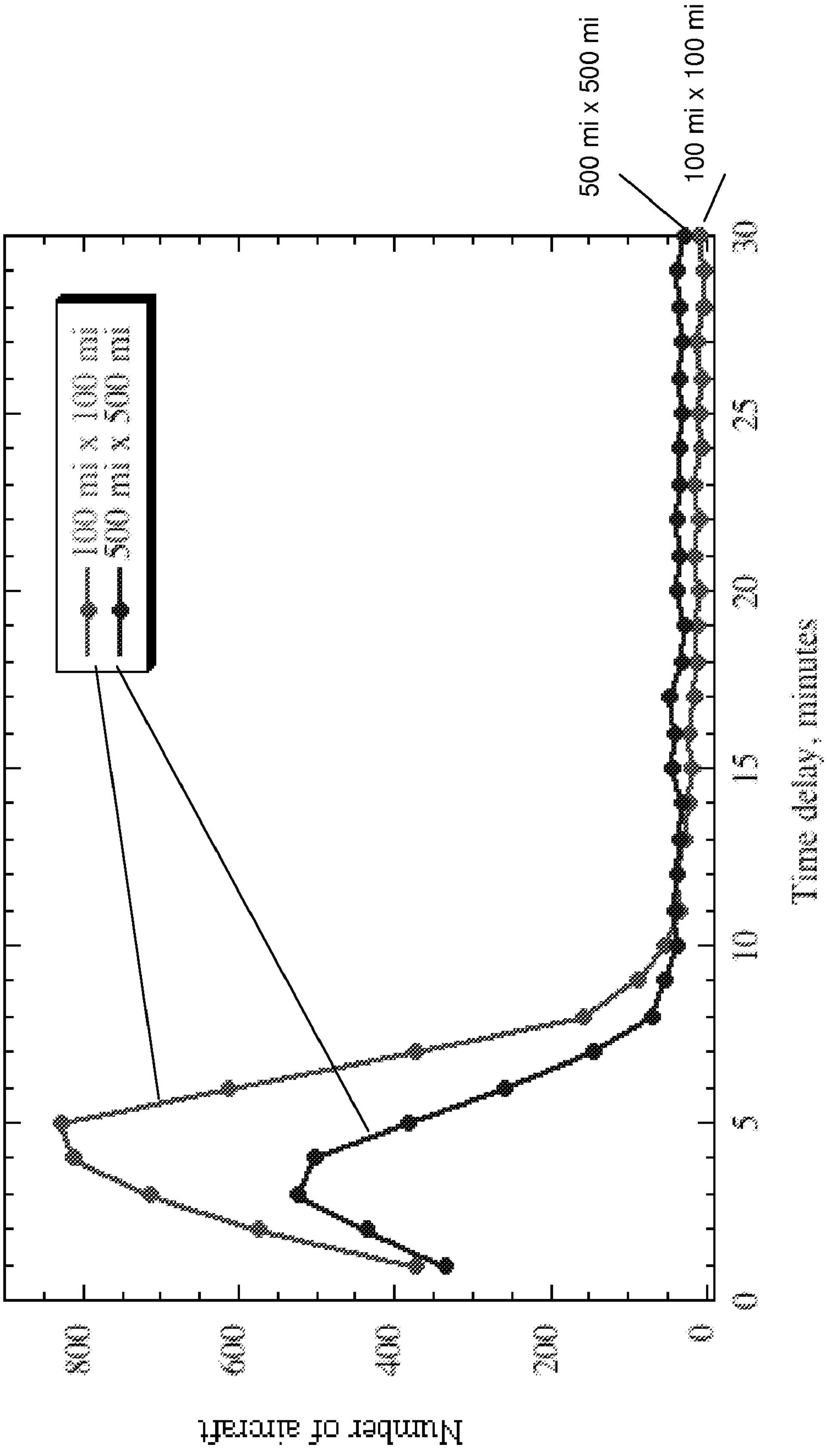
FIG. 9 illustrates the effect of size of the restricted area size on delay time.

In exemplary embodiments, the effect of enlarging the size of the restricted area to 500 mi×500 mi is tested. This last scenario uses the clockwise flow rule see FIG. 7B to avoid the restricted area. FIG. 9 illustrates the effect on the size of an associated delay time, caused by the size of the restricted area. As expected, the larger restricted area results in more aircraft delayed for 15 or more minutes, as shown in FIG. 9.

Figure 10A:
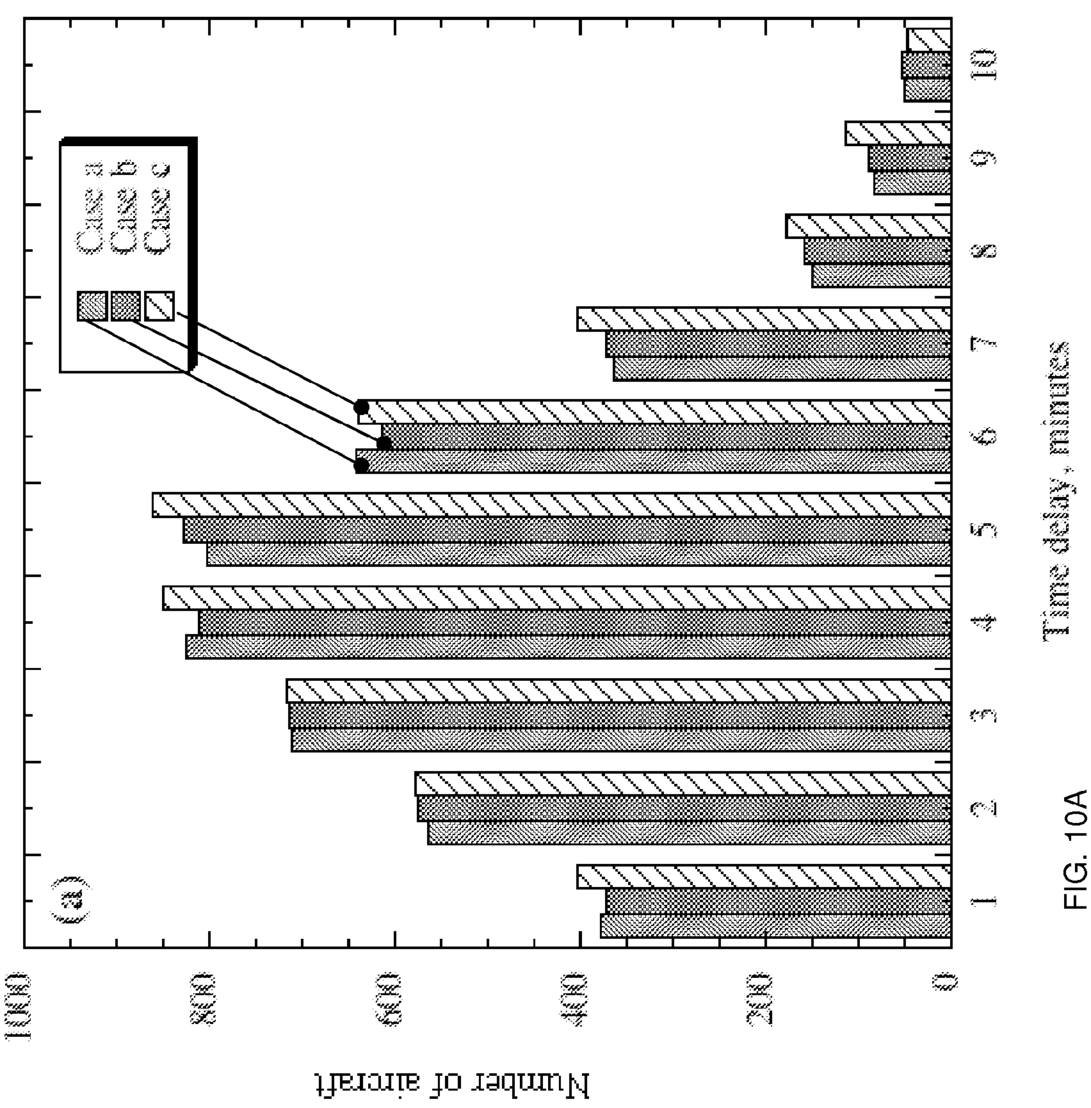
FIG. 10A illustrates a bar chart representing delay time versus number of aircraft for short delay times (less than 10 minutes).
Figure 10B:
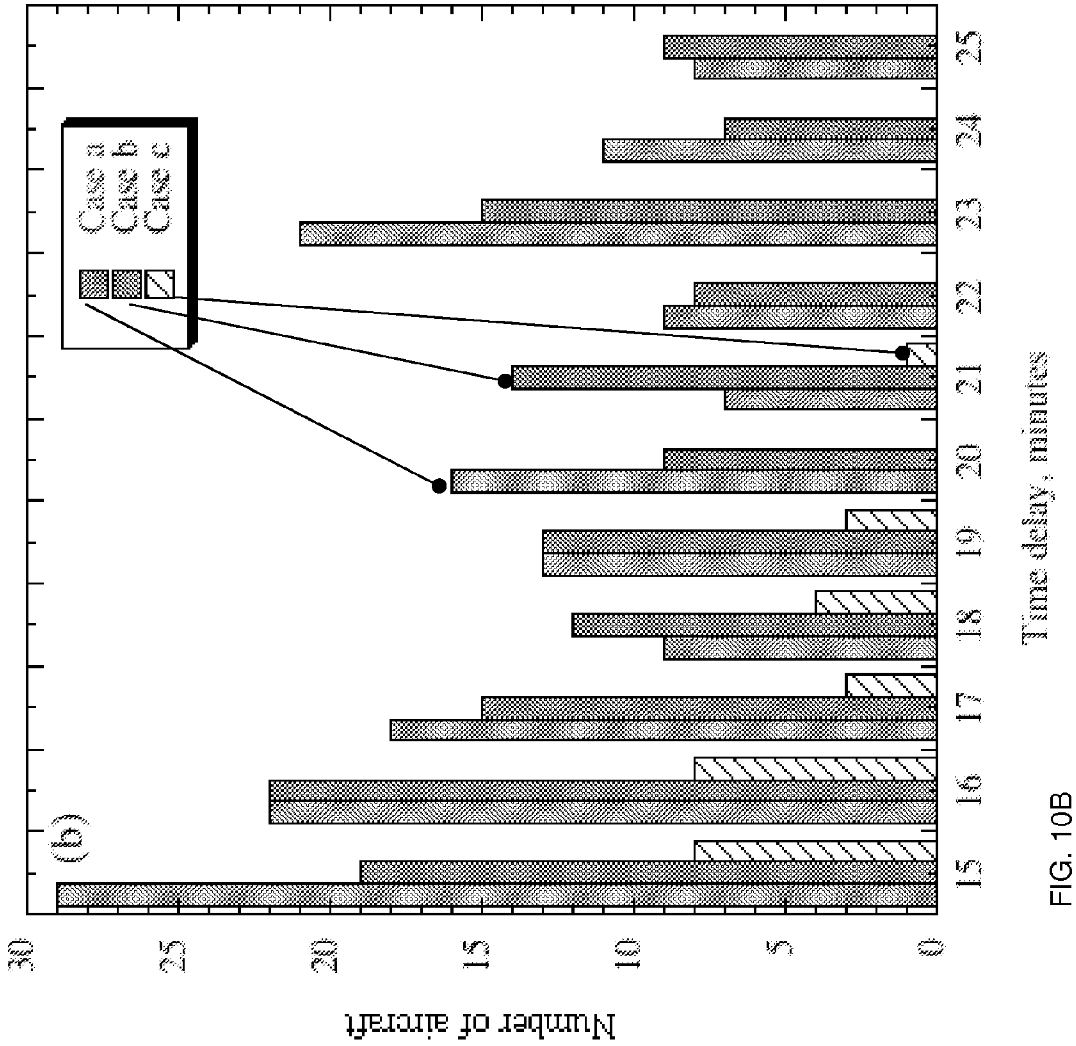
FIG. 10B illustrates a bar chart representing delay time versus number of aircraft for longer delay times (10-30 minutes).

FIG. 10A and FIG. 10B illustrate delay time versus number of aircraft; FIG. 10A (i.e., image (a)) shows short delay times (less than 10 minutes); and FIG. 10B (i.e., image (b)) shows longer delay times (15-25 minutes).

Figure 11A:
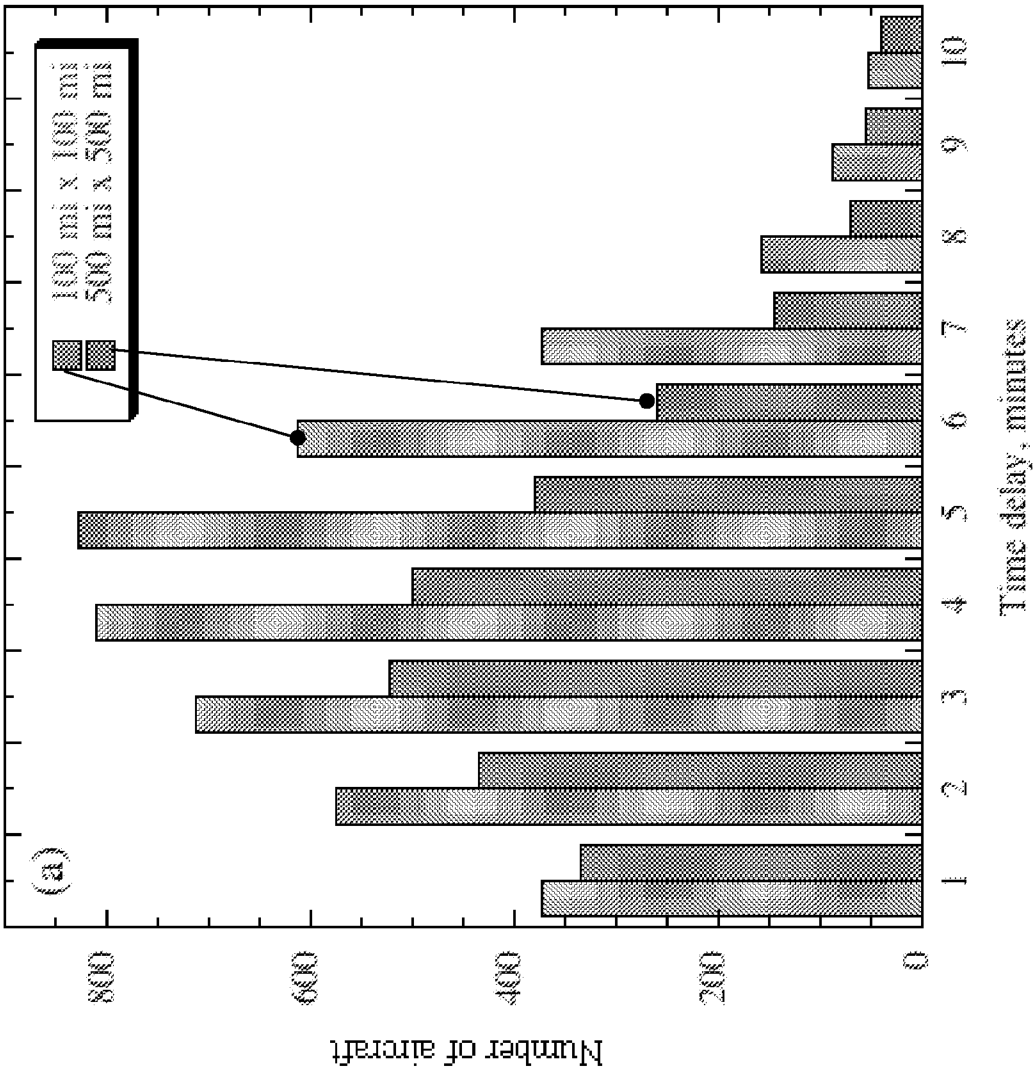
FIG. 11A illustrates a bar chart representing the effect that the size of the restricted area has on the size of delay time.
Figure 11B:
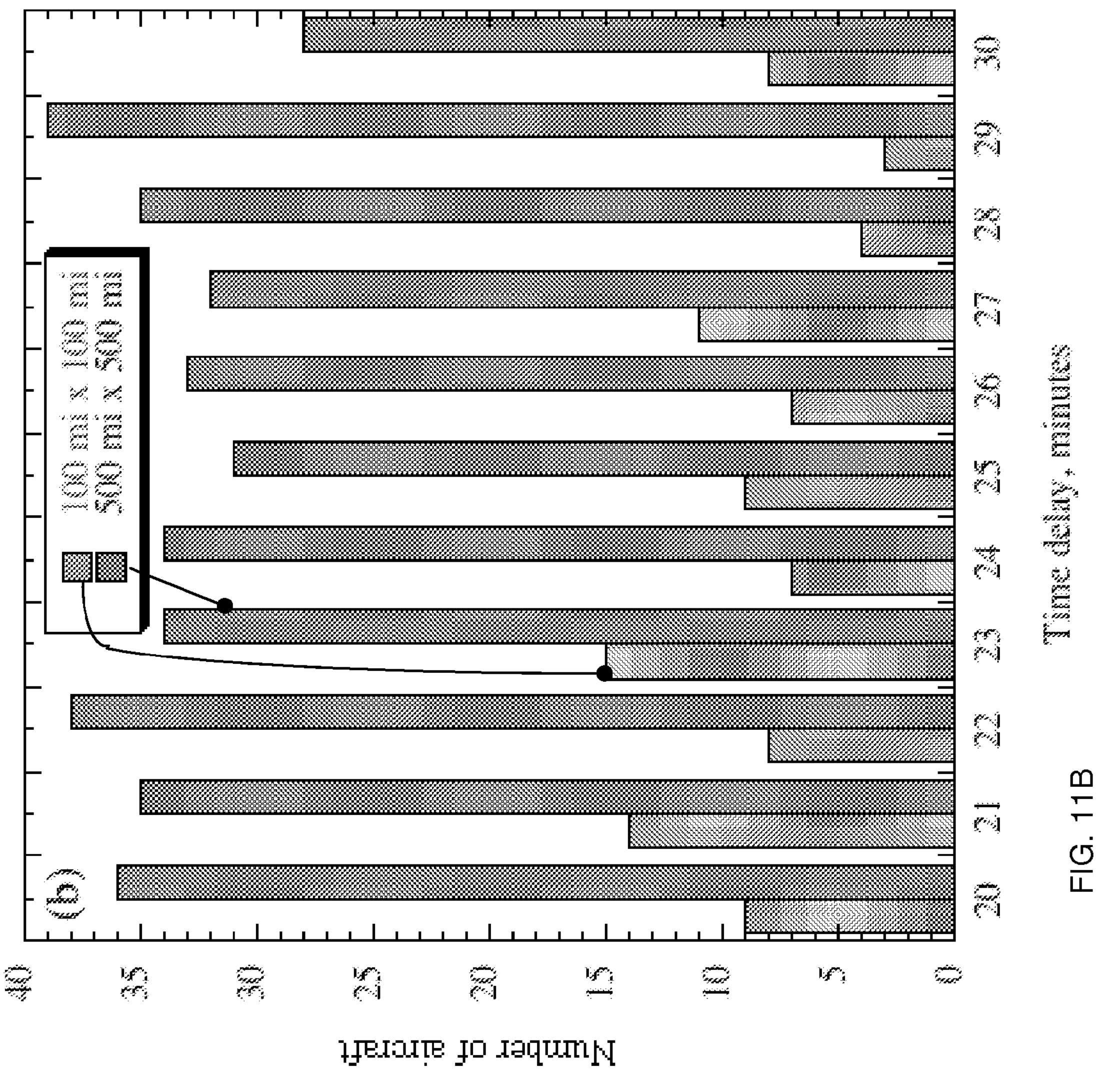
FIG. 11B illustrates a bar chart representing the effect that the size of the restricted area has on the size of delay time.

FIG. 11A and FIG. 11B show the effect on the size of the delay time that is caused by the size of the restricted area.

Referring again to FIG. 13A and FIG. 13B, in accordance with exemplary embodiments, the system 200 includes a computer processor 206 (hereafter "the computer processor 206") communicatively coupled to and/or communicatively coupling either externally or residing inside of the computer processor 206 a plurality of network interface controllers, input/output controllers, input devices and output devices, such as a network interface 270, a memory controller 260, an input/output controller 250 (hereafter "the I/O controller 250"), an input device 252, an output device 254, and a display 202, where the display 202 displays a user interface 204. In exemplary embodiments, software application packages including special purpose algorithms or any other commercially available software application packages can be accessed and exercised interactively by a user using the computer processor 206, either locally or remotely over a network 272.

Figure 13A:
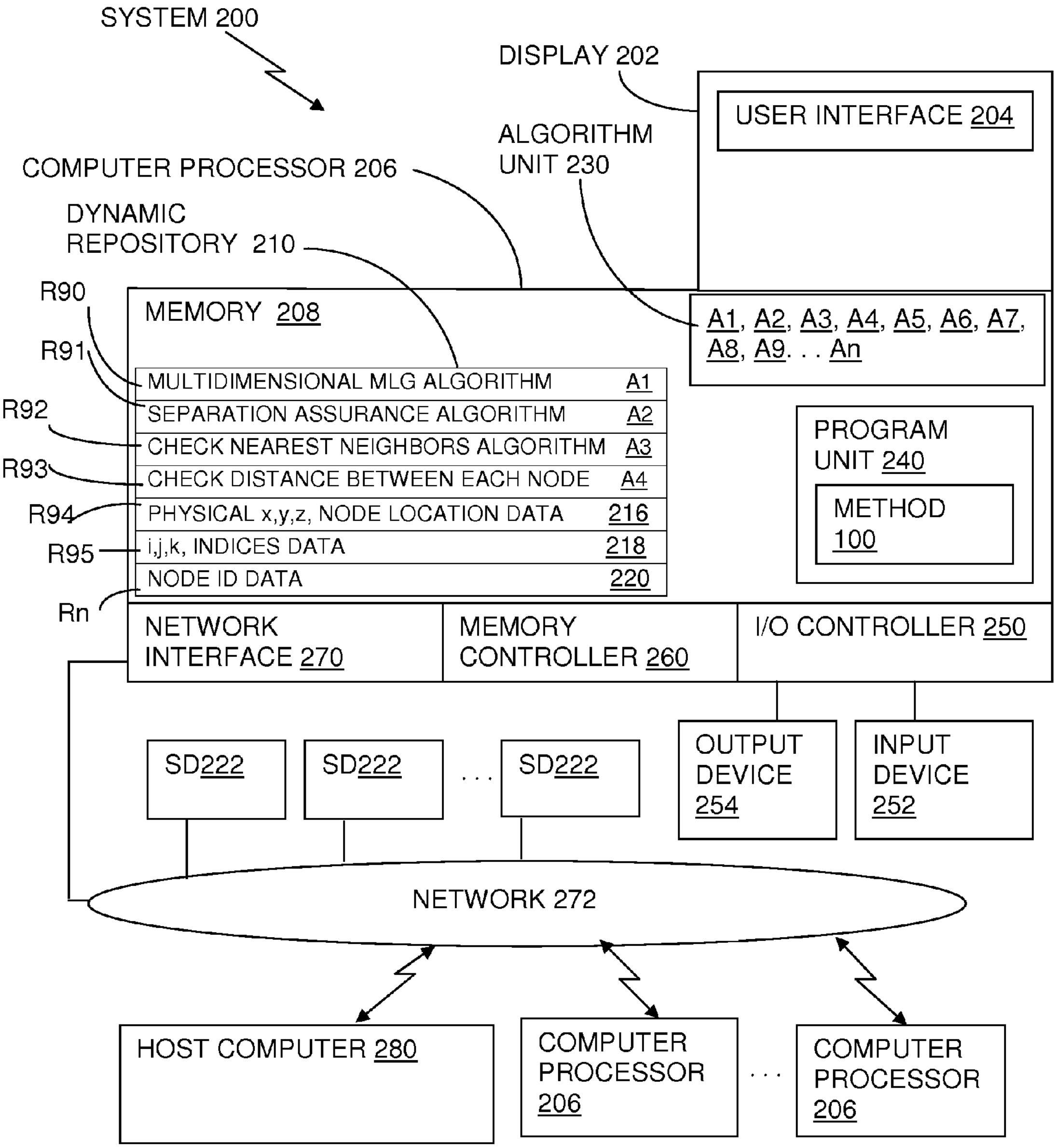
FIG. 13A illustrates a first embodiment of the system 200 used in cooperation with the method 100 of simulating, controlling and optimizing aircraft traffic systems.
Figure 13B:
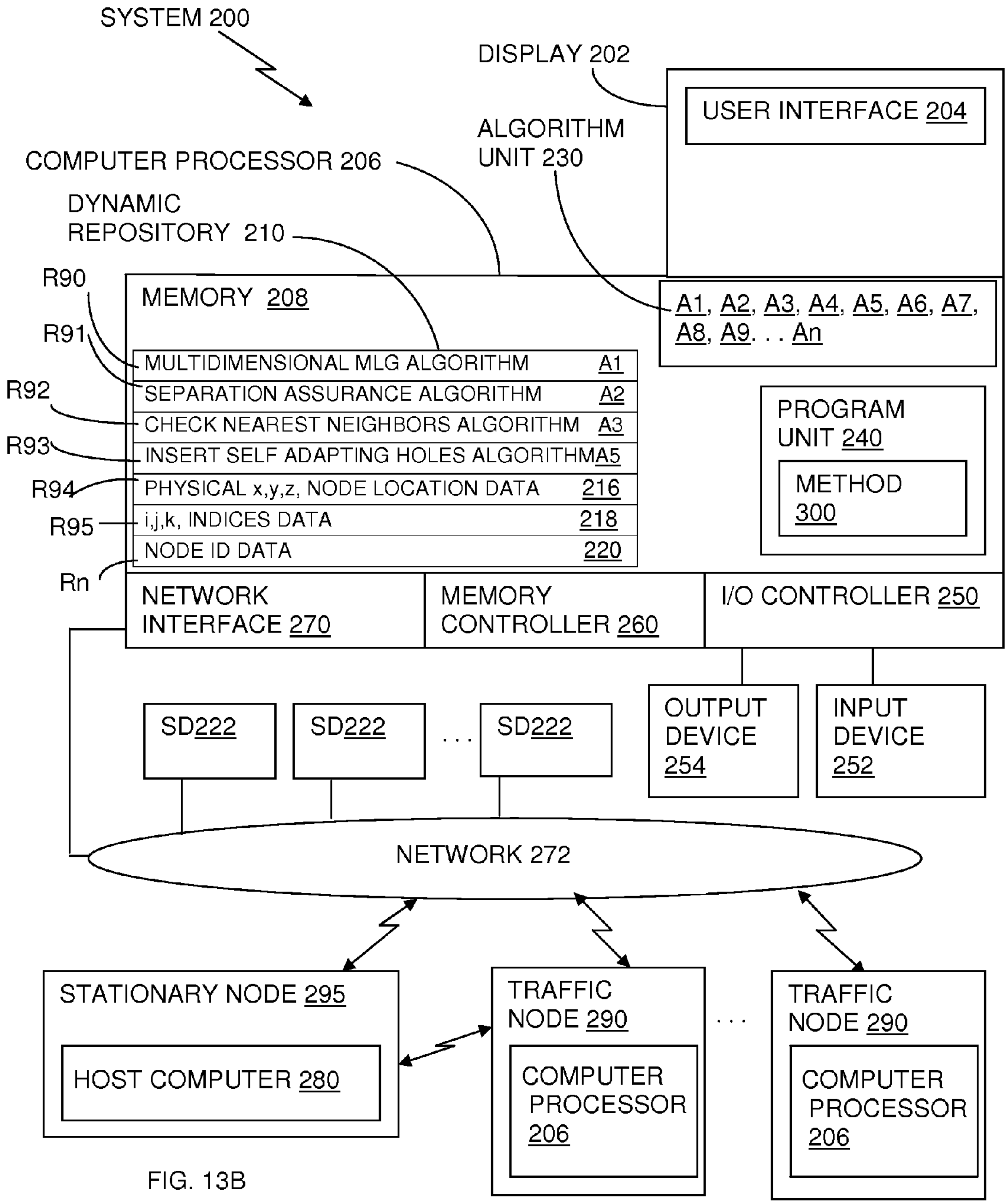
FIG. 13B illustrates a second embodiment of the system 200 used in cooperation with a method 300 of simulating, controlling and optimizing aircraft traffic systems.

Referring to FIG. 13A and FIG. 13B, in accordance with exemplary embodiments, the network interface 270 communicatively connects the computer processor 206 to a network 272, where a plurality of client side, server side and/or user networked devices and/or platforms reside, interact and operate communicatively over the network 272. The network 272 can be a wide area communications network, including an Internet or an extranet or the network 272 can be a local area network, including an intranet. These networked devices, platforms (also see stationary node 295 and traffic node 290 in FIG. 13B) and/or systems can include host computers, such as a host computer 280 (which may also contain one or more of the computer processor 206); these devices and systems can include storage devices, such as tape drives, thumb drives, and disc drives, operating individually or in storage library farms; in exemplary embodiments, a plurality of storage devices can include a device such as one or more of a storage device 222 (hereafter "the SD222"). These networked devices can also incorporate a plurality of devices, such as the computer processor 206.

Again referring to FIG. 13A and FIG. 13B, in accordance with exemplary embodiments, the input device 252 can be at least one or more of a mouse, a keyboard, a touch screen terminal, a light pen wand, a joystick, a thumbwheel, a copier system or machine, a hardcopy paper scanner system or machine, a microphone or an electronic and/or a radio frequency scanning device (including RFID).

In exemplary embodiments, the system 200 and the method 100 illustrated in FIG. 13A, FIG. 12A through FIG. 12E respectively, and/or the system 200 and a method 300 as illustrated in FIG. 14A through FIG. 14D and FIG. 13B respectively, can be implemented in software, firmware and/or hardware or any combination of each. According to exemplary embodiments, the method 100 and/or the method 300 are implemented in software, as executable program code (such as program 100 and/or program 300) which comprises an ordered listing of a plurality of computer executable instructions for implementing logical functions, and the method 100 and/or the method 300 is executed by either special or general purpose digital computers including a PDA, a personal computer, a workstation, a minicomputer or a mainframe computer as implemented in computer processor 206, in accordance with exemplary embodiments.

Further in accordance with exemplary embodiments, the system 200 is implemented with a general purpose digital computer designated as the computer processor 206. The computer processor 206 is a hardware device for executing software implementing the method 100, and/or as well as the method 300. The computer processor 206 can be any custom made or commercially available, off-the-shelf processor, a central processing unit (CPU), one or more auxiliary processors, a semiconductor based microprocessor, in the form of a microchip or chip set, a macroprocessor or generally any device for executing software instructions. The system 200 when implemented in hardware can include discrete logic circuits having logic gates for implementing logic functions upon data signals, or the system 200 can include an application specific integrated circuit (ASIC).

Referring to FIG. 13A and FIG. 13B, in accordance with exemplary embodiments, the computer processor 206 further includes a memory 208 (hereafter "the memory 208"). Residing in the memory 208 are a program unit 240 (hereafter "the program unit 240") and a dynamic repository 210 (hereafter "the dynamic repository 210"), where the dynamic repository can be a dynamic random access memory (DRAM). Residing in the dynamic repository 210 are a plurality of repository entry locations R90, R91, R92, R93, R94, and R95 up to and including Rn, where Rn theoretically represents an infinite number of repository entry locations limited only by known physical and/or virtual memory capacity. Thus, each repository entry location R90 up to Rn can hold, store and/or save a plurality of information and/or data including algorithms and program data, including the multidimensional MLG algorithm A1, represented as being stored in repository entry location R90; separation assurance algorithm A2, represented as being stored in repository entry location R91; check nearest neighbors algorithm A3, stored and/or saved in repository entry location R92.

In accordance with a first exemplary embodiment, referring to FIG. 13A, a check distance between each node algorithm A4 is held in repository entry location R93 and will be discussed further in regard to the first exemplary embodiment as shown in FIG. 13A.

In accordance with a second exemplary embodiment, referring to FIG. 13B, an insert self adapting holes algorithm A5 is held in repository entry location R93, an will be discussed further in regard to the second exemplary embodiment as shown in FIG. 13B.

Referring again to FIG. 13A and FIG. 13B and further, in accordance with exemplary embodiments, physical x-, y-, z-node location data 216 are stored in repository entry location R94; i, j, k indices data are stored in repository entry location R95; and node ID data are saved in representative repository entry location Rn. These groups of algorithms and/or data and/or program information can be easily, automatically, and programmatically accessed and exercised by computer processor 206, resulting in avoidance of blockages in transport paths and avoidance of collisions of aircraft and other nodes in transport systems.

In addition, a plurality of other data and/or algorithms and information may be called and entered into the repository entry locations R90 through Rn. The plurality of other data and or algorithms can include Enhanced Traffic Management System (ETMS) data; National Oceanic And Atmospheric Administration (NOAA) data; the number of particles in the transport system N; the number of particles in directions x-, y-, and/or z-, such as physical x, y, z, node location data 216; i, j, k, indices data 218; node velocity; node flight time; node final destination; node flight plan data; node ID data 220; diagnostics data; simulation data; rules data; meteorological data, atmospheric data; environmental data, including solar wind data; government restriction data, such as restricted area data; learning algorithms; sorting algorithms; node trajectory algorithms; separation assurance algorithms and/or conflict detection and resolution algorithms; nearest neighbors search algorithms, such as check nearest neighbors algorithm A3; insert self adapting holes algorithms A5; an interaction algorithm A6; and/or a tracking algorithm A7. These groups of information, and/or data, and/or algorithms, including the plurality of other data can be stored temporarily and/or permanently and/or semi permanently in the repository entry locations R90 through Rn or stored over the network 272 in any of the plurality of storage devices residing on and/or communicatively coupled to the network 272, including the SD222. In exemplary embodiments, these groups of information and data can be called and/or downloaded programmatically over the network 272 or entered manually by way of the input device 252.

Referring again to FIG. 13A and FIG. 13B, in accordance with exemplary embodiments, the memory 208 further includes an algorithm unit 230. Residing in the algorithm unit 230, is a plurality of algorithms such as an algorithm A1, an algorithm A2, an algorithm A3, an algorithm A3, an algorithm A5 up to and including an algorithm An, where the algorithm An theoretically represents an infinite number of algorithms limited only by known physical and/or virtual memory capacity. In exemplary embodiments, algorithm A1 is the multidimensional MLG algorithm A1; the algorithm A2 is the separation assurance algorithm A2; the algorithm A3 is the check nearest neighbors algorithm A3; the algorithm A4 is the check distance between each node A4 algorithm (see FIG. 13A, i.e., the first embodiment); the algorithm A5 is the insert self adapting holes algorithm A5 (see FIG. 13B, i.e., the second embodiment). In addition, these algorithms can include the interaction algorithm A6 and the tracking algorithm A7, a bubble sorting algorithm A8 and a shell sorting algorithm A9. These algorithms can be in the form of one or more formulas, applets, programs, routines, sub routines, macro programs and/or micro programs and/or any combination of such programs, applets, formulas, routines and/or sub routines. In exemplary embodiments, these algorithms and/or formulas can represent either individual segments of knowledge base applications or standard known programming languages which are called and/or executed to create rapid predictions and models which enable active design of air transportation systems. These algorithms and/or formulas are called by programmatic operations of the method 100 and/or the method 300, either automatically or manually to perform computational and predictive tasks. Furthermore, these algorithms can be stored temporarily and/or permanently and/or semi permanently in the algorithm unit 230 or stored over the network 272 in any of the plurality of computers or storage devices, such as the SD222 or in a repository (such as the dynamic repository 210) in the computer processor 206 or in the host computer 280 or in any one or more of the computer processor 206 or the memory 208. In exemplary embodiments, the plurality of algorithms and/or formulas can be downloaded programmatically over the network 272 or entered manually by way of the input device 252.

Referring to FIG. 13A and FIG. 13B, in accordance with exemplary embodiments, residing in the program unit 240 is a plurality of computer readable and/or computer executable and/or computer writable media (such as a computer usable medium 1502) which contain a plurality of computer programs, or algorithms and/or software applications, composing operations, instructions and/or procedures of the method 100 and/or the method 300 encoded as computer readable and computer executable program code, contained in a computer program product 1500. In exemplary embodiments, software in the program unit 240 includes a suitable operating system.

Figure 15A:
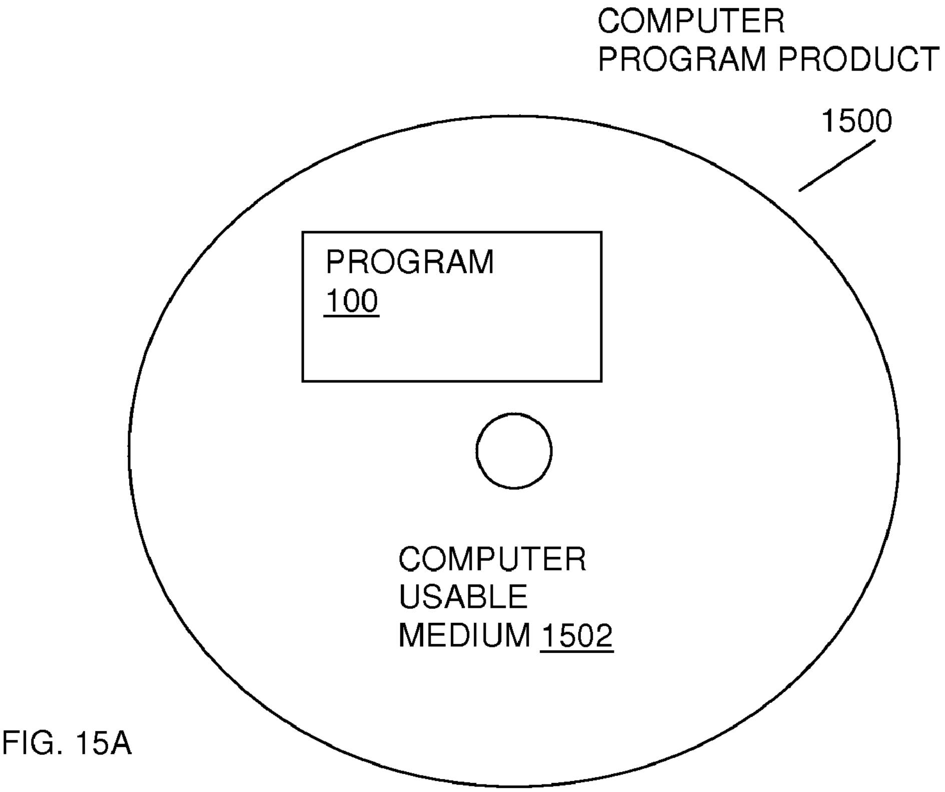
FIG. 15A illustrates a computer program product in which the instructions for the method 100 reside in program code, such as program 100.
Figure 15B:
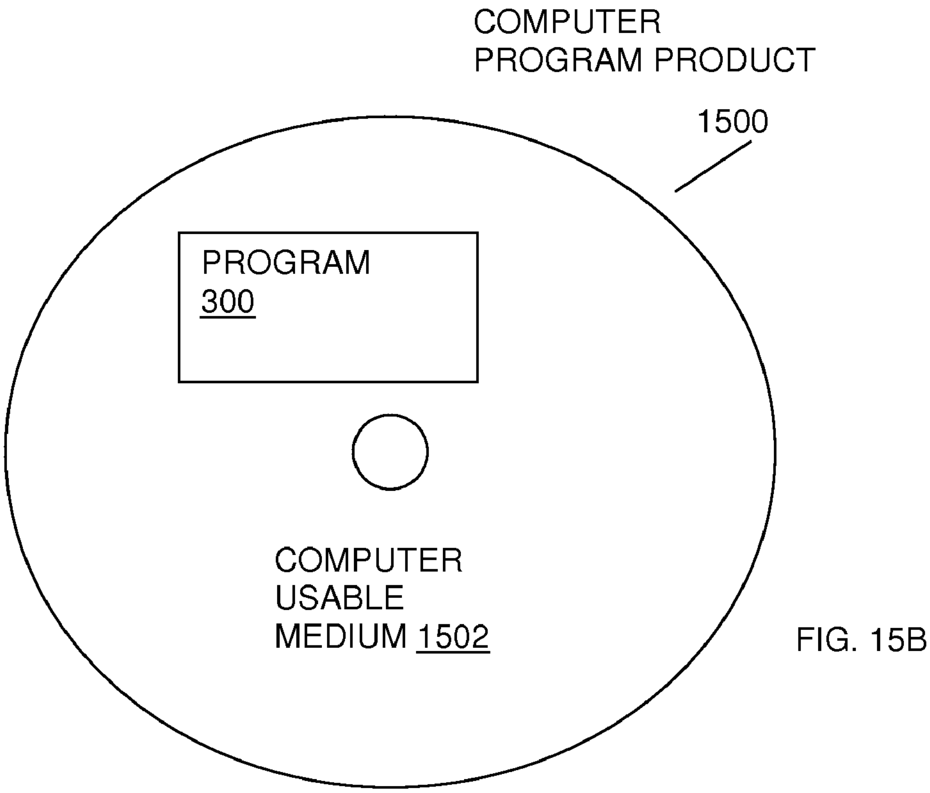
FIG. 15B illustrates a computer program product in which the instructions for the method 300 reside in program code, such as program 300.

In exemplary embodiments, referring to FIG. 13A, FIG. 13B and FIG. 15A and FIG. 15B, the memory 208 and the dynamic repository 210 and the plurality of storage devices including such devices as the SD222 can include any one of or a combination of volatile memory elements, including random access memory (i.e., including RAM, DRAM, SRAM and/or SDRAM) and non-volatile memory elements including read only memory (i.e., ROM, erasable programmable read only memory, electronically erasable programmable read only memory EEPROM, programmable read only memory PROM, and/or compact disc read only memory CDROM or FLASH memory or cache) magnetic tape, disk, diskette, cartridge, cassette and/or optical memory (see FIG. 15A and FIG. 15B). The memory 208 can have an architecture where various components are situated remotely from one another, but can be accessed by the computer processor 206, either directly and/or locally or logically through various communications buses or remotely over the network 272.

Referring to FIG. 1A and FIG. 13A, in accordance with a first exemplary embodiment, at an operation start 102 (hereafter "the operation 102"), the system 200 receives a signal from an operator or an individual user via either the input device 252 or an automatic programmatic wake up signal from the computer processor 206, which activates and initiates the computer executable program code implementing the method 100. The method 100, upon activation, performs other operations from selection signals received in the computer processor 206 from the input device 252, causing the method 100 to be executed by the computer processor 206 and in turn causing the computer processor 206 to perform operations and procedures including calling algorithms and software applications and executing the instructions in the algorithms and applications including mathematical calculations, analyses and determinations resulting in rapid predictions and models which enable active design of air transportation systems, involving operations and sub operations of the method 100 of providing various solutions in regard to simulating, controlling, and optimizing dynamic global models of transport systems, by combining a multidimensional Monotonic Lagrangian Grid (MLG) algorithm with algorithms for separation assurance and updating trajectories of a plurality of moving nodes within transport systems.

Figure 12A:
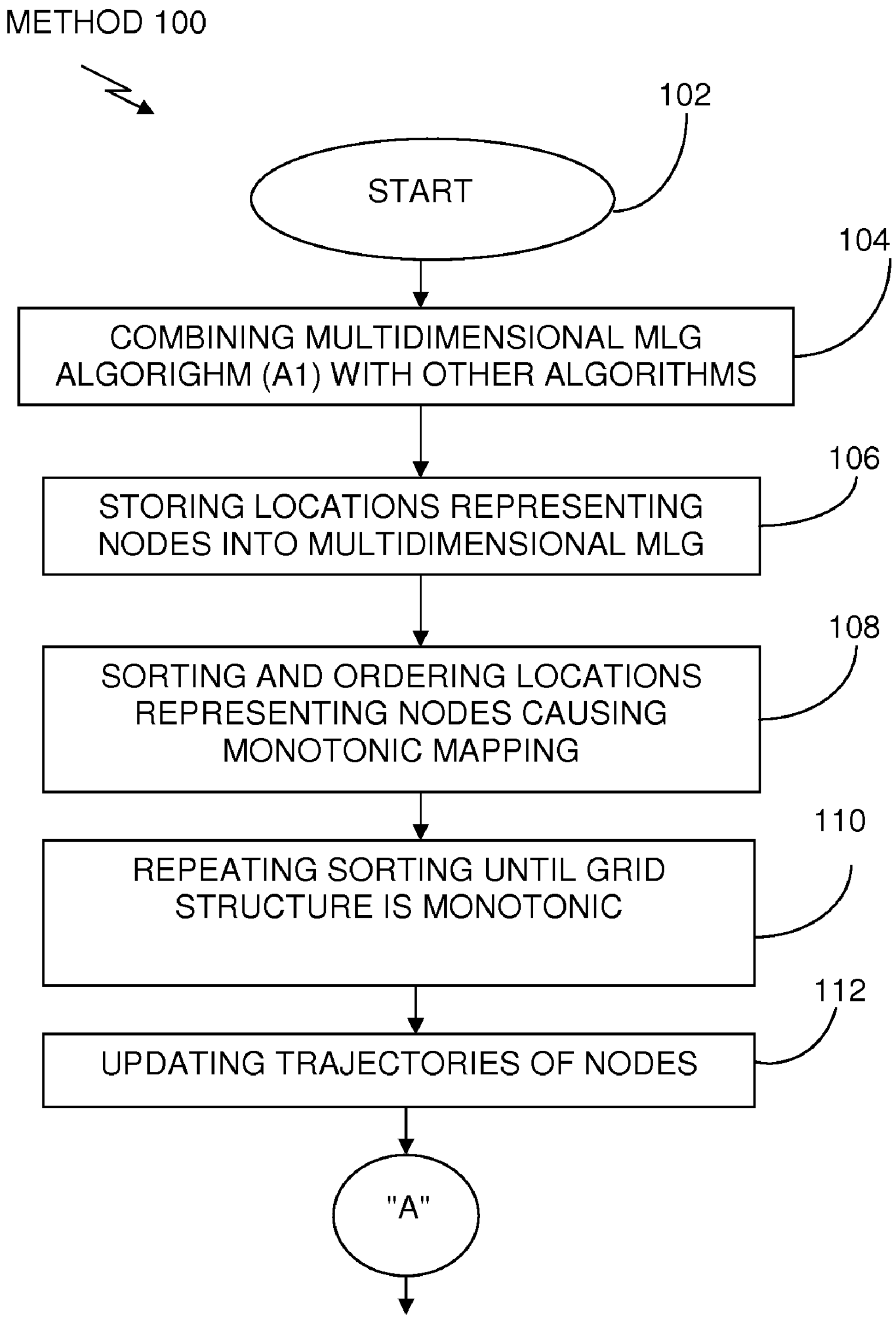
FIG. 12A illustrates a method 100 of combining a multi-dimensional MLG algorithm with other algorithms for simulating, controlling and optimizing aircraft traffic systems.

Referring to FIG. 12A and FIG. 13A, in accordance with the first exemplary embodiment, at "an operation combining multidimensional MLG algorithm (A1) with other algorithms 104" (hereafter "the operation 104"), the system 200 receives a signal from an operator or an individual user via the input device 252 from the computer processor 206, causing the computer processor 206 to perform operations and procedures including separation assurance and updating trajectories of a plurality of moving nodes within transport systems. The number of dimensions of the multidimensional MLG can range from about 2 dimensions up to about 10 dimensions. According to exemplary embodiments, the multidimensional MLG can be used in air traffic management, where the multidimensional MLG is used to sort in three spatial dimensions (3D). In addition, the multidimensional MLG can be used to sort the three spatial dimensions plus time, resulting in a 4D MLG. Furthermore, multidimensional MLG applications can include sorting on aircraft size, sorting on the number of passengers, sorting on airline organizations and sorting any other items, as well as sorting on time. Therefore, the number of dimensions of the multidimensional MLG can be infinite only limited by the hardware and/or software capacity of the computer processing and/or computer memory capacity implemented in a given transport system. In addition, any one or more nodes of the plurality of moving nodes can become a stationary node 295 (see FIG. 13B).

In the first exemplary embodiment, the operations of combining the multidimensional MLG with additional algorithms include the following operations:

Referring again to FIG. 12A and FIG. 13A, in accordance with the first exemplary embodiment, at an operation "storing locations representing nodes into multidimensional MLG 106" (hereafter "the operation 106"), the program code of the method 100 executed by the computer processor 206 of the system 200 causes the computer processor 206 to store the physical locations describing the plurality of moving nodes (such as the physical x,y,z, node location data 216 found in repository location R94) into a structure of the multidimensional MLG algorithm, by the computer processor 206. Nodes of the plurality of moving nodes can be any one or more objects in an atmosphere, where these objects can include aircraft, and projectiles; objects in space, including spacecraft, satellites, space debris, projectiles and a plurality of mobile sensors; objects on land, including all terrain land vehicles; and objects on and in bodies of water, including surface watercraft, below surface watercraft, mines, and projectiles, all of which can be moving in complex paths relative to each other or some can be stationary, as in stationary node 295. These objects, vehicles and/or platforms can be manned or unmanned guided/controlled and/or robotic vehicles.

Referring again to FIGS. 12A and 13A, in accordance with the first exemplary embodiment, at an operation "sorting and ordering the locations representing nodes causing monotonic mapping 108" (hereafter "the operation 108") the program code of the method 100 executed by the computer processor 206 of the system 200 causes the computer processor 206 to sort and order, on a grid structure of the MLG in real (operational) space and indexing space (computer memory, such as memory 208), the physical locations describing nodes of the plurality of moving nodes, causing a monotonic mapping between indices of the grid structure and locations describing the plurality of moving nodes. According to exemplary embodiments, sorting can include operations involving the bubble sorting algorithm A8 and/or the shell sorting algorithm A9 executed on all axes, when nodes are not monotonic.

In accordance with the first exemplary embodiment, referring again to FIGS. 12A and 13A, at an operation "repeating sorting until grid structure is monotonic 110" (hereafter "the operation 110") the program code of the method 100 executed by the computer processor 206 of the system 200 causes the computer processor 206 to repeat sorting of the physical locations describing the plurality of moving nodes, until the grid structure is monotonic.

Referring to FIG. 12A and FIG. 13A, in accordance with the first exemplary embodiment, at an operation "updating trajectories of nodes 112" (hereafter "the operation 112"), the program code of the method 100 executed by the computer processor 206 of the system 200 causes the computer processor 206 to update the trajectories of the plurality of moving nodes.

Figure 12B:
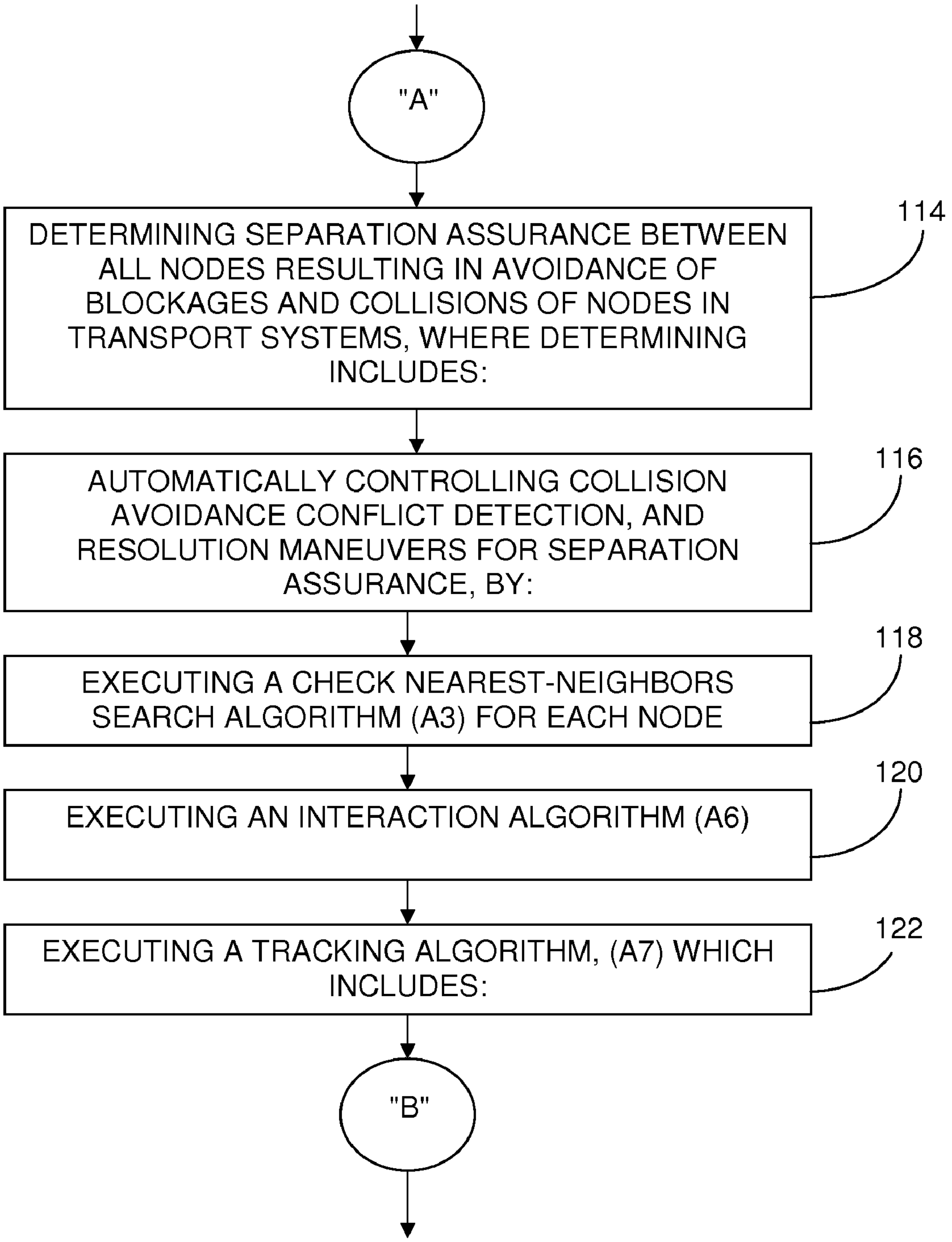
FIG. 12B illustrates the continuation of the method 100 of simulating, controlling and optimizing aircraft traffic systems.

In accordance with the first exemplary embodiment, the operations of the method 100 continue from FIG. 12A to FIG. 12B, as indicated by continuation symbol "A" circled at the bottom of FIG. 12A representing the continuation of the operations at symbol "A" circled at the top of FIG. 12B.

Referring to FIG. 12A, FIG. 12B and FIG. 13A, in accordance with the first exemplary embodiment, at an operation "determining separation assurance between all nodes resulting in avoidance of blockages and collisions of nodes in transport systems . . . 114" (hereafter "the operation 114"), the program code of the method 100 executed by the computer processor 206 of the system 200 causes the computer processor 206 to determine, automatically, the assurance separation between all nodes of the plurality of moving nodes in dynamic global models of transport systems, in at least real time, resulting in avoidance of blockages in transport paths, and avoidance of collisions of nodes of the plurality of moving nodes in transport systems.

According to the first exemplary embodiment, the operation 114 of determining, further includes determining separation assurance by generating predictions, including optimizing, and assuring automated separation modeling predictions for each node in the plurality of moving nodes.

Again referring to FIG. 12A, FIG. 12B and FIG. 13A, and in accordance with the first exemplary embodiment, the operation 114 which further includes generating predictions, further yet includes at an operation automatically controlling collision avoidance conflict detection, and resolution maneuvers for separation assurance . . . 116" (hereafter "the operation 116").

At the operation 116, the program code of the method 100 executed by the computer processor 206 of the system 200 causes the computer processor 206 to perform additional operations and/or sub operations of automatically controlling collision avoidance conflict detection and resolution maneuvers for separation assurance to maintain an adequate separation distance between each node in the plurality of moving nodes. These determining operations are achieved by the additional operations and/or sub operations of executing a fast nearest-neighbors search algorithm for each node 118, executing an interaction algorithm (A6) 120, and executing a tracking algorithm (A7) 122.

Again referring to FIG. 12A, FIG. 12B and FIG. 13A, and in accordance with the first exemplary embodiment, at the operation "executing a fast nearest-neighbors search algorithm for each node 118" (hereafter "the operation 118") the program code of the method 100 executed by the computer processor 206 of the system 200 causes the computer processor 206 to execute a fast nearest-neighbor search algorithm for each node, in order to facilitate a primary collision avoidance conflict resolution maneuver and, a group of subsequent collision avoidance conflict resolution maneuvers for each node in the plurality of moving nodes.

Referring again to FIG. 12A, FIG. 12B and FIG. 13A, and in accordance with the first exemplary embodiment, at the operation "executing an interaction algorithm (A6) 120" (hereafter "the operation 120") the program code of the method 100 executed by the computer processor 206 of the system 200 causes the computer processor 206 to execute the interaction algorithm A6, in order to facilitate the primary collision avoidance conflict resolution maneuver and, a group of subsequent collision avoidance conflict resolution maneuvers for each node in the plurality of moving nodes.

Referring again to FIG. 12A, FIG. 12B and FIG. 13A, and in accordance with the first exemplary embodiment, at the operation "executing a tracking algorithm (A7) . . . 122" (hereafter "the operation 122) the program code of the method 100 executed by the computer processor 206 of the system 200 causes the computer processor 206 to execute the tracking algorithm A7, in order to facilitate the primary collision avoidance and/or conflict detection and resolution maneuver and a group of subsequent collision avoidance and/or conflict detection and resolution maneuvers for each node in the plurality of moving nodes.

According to exemplary embodiments, executing the tracking algorithm A7 in the operation 122, further includes simulator operations of reading by the computer processor, a travel path plan for each node (see operation 124) in the plurality of moving nodes into computer memory, such as memory 208; assigning each node a node ID, such as node ID data 220, (where the node ID data 220 can be an ID for an airplane, a space shuttle vehicle, a satellite, a piece of space debris, one or more sensors, one or more weapons or pieces of ordinance, as represented by the node ID data 220) an initial x-, y-, z-location, a final x-, y-, z-location, a set of waypoints between the initial x-, y-, z-location, the final x-, y-, z-location, and an average speed; calculating a first velocity vector for each node in the plurality of moving nodes; and inputting a plurality of data in a data structure of the multidimensional (multi-D) MLG.

Figure 12C:
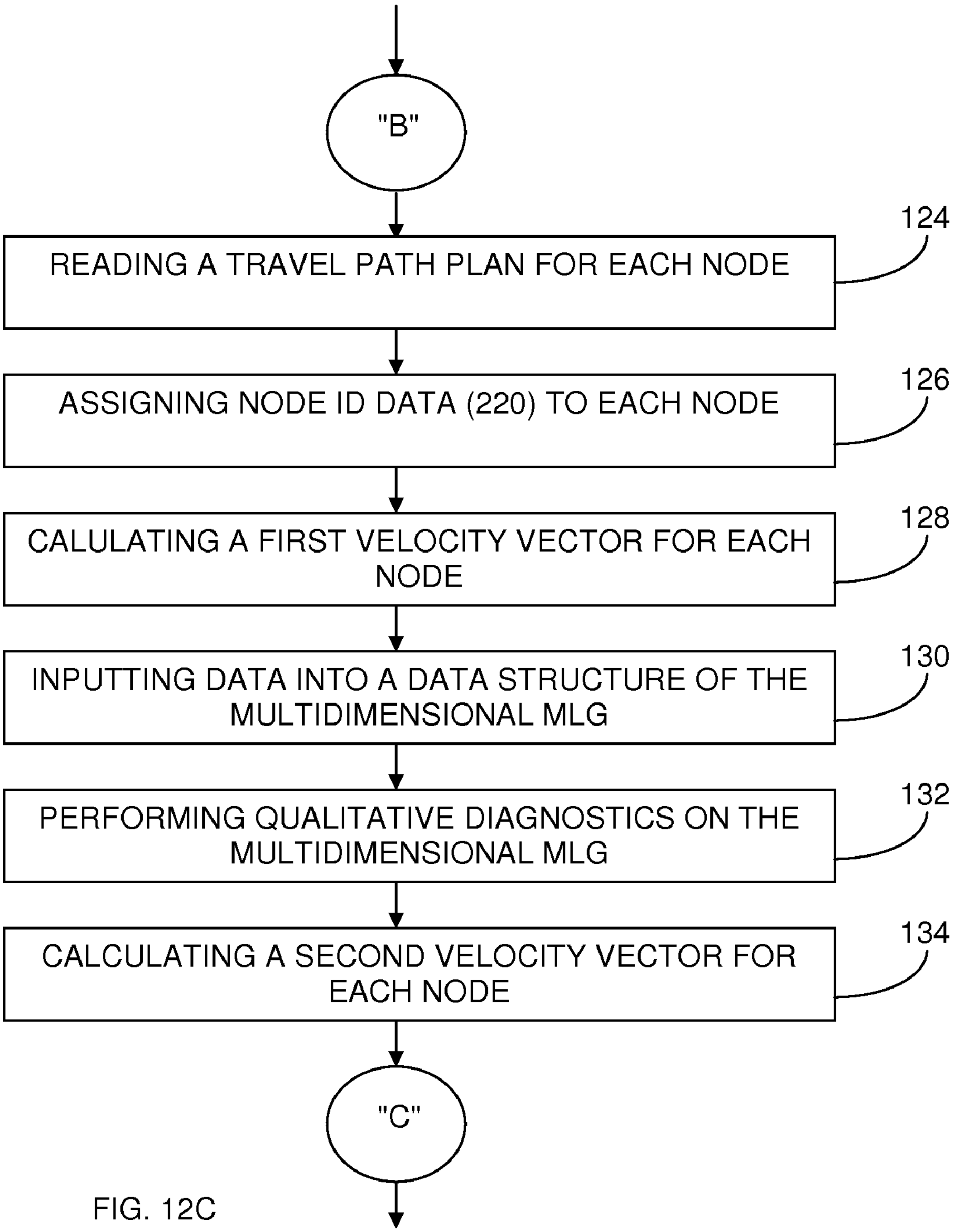
FIG. 12C illustrates the continuation of the method 100 of simulating, controlling and optimizing aircraft traffic systems.

In accordance with the first exemplary embodiment, the operations of the method 100 continue from FIG. 12B to FIG. 12C, as indicated by continuation symbol "B" circled at the bottom of FIG. 12B representing the continuation of the operations at symbol "B" circled at the top of FIG. 12C.

Referring to FIG. 12A, FIG. 12B, FIG. 12C and FIG. 13A, and in accordance with the first exemplary embodiment, at an operation "reading a travel path plan for each node 124" (hereafter "the operation 124"), the program code of the method 100 executed by the computer processor 206 of the system 200 causes the computer processor 206 to read a travel path plan for each node or aircraft.

Referring to FIG. 12A, FIG. 12B, FIG. 12C and FIG. 13A, and in accordance with the first exemplary embodiment, at an operation "assigning node ID data (220) to each node 126" (hereafter "the operation 126"), the program code of the method 100 when executed by the computer processor 206 of the system 200 causes the computer processor 206 to assign each node in the plurality of moving nodes an ID (such as node ID data 220), an initial x-, y-, z-location (such as physical x,y,z, node location data 216), a final x-, y-, z-location (also, such as physical x,y,z, node location data 216), a set of waypoints between the initial x-, y-, z-location, the final x-, y-, z-location, and an average speed.

Referring again to FIG. 12A, FIG. 12B, FIG. 12C and FIG. 13A, and in accordance with the first exemplary embodiment, at an operation "calculating a first velocity vector for each node 128" (hereafter "the operation 128"), the program code of the method 100 when executed by the computer processor 206 of the system 200 causes the computer processor 206 to calculate a first velocity vector for each node in the plurality of moving nodes.

Again referring to FIG. 12A, FIG. 12B, FIG. 12C and FIG. 13A, and in accordance with the first exemplary embodiment, at an operation "inputting data into a data structure of the multidimensional MLG 130" (hereafter "the operation 130"), the program code of the method 100 when executed by the computer processor 206 of the system 200 causes the computer processor 206 to input a plurality of data in a data structure of the multidimensional MLG, where the plurality of data include node ID data 220 and a current x-, y-, z-location, such as physical x,y,z, node location data 216, for each node; where the plurality of data can be characterized, as follows:

$$\text{(3D) MLG}(i,N),\text{ where } i=1, \ldots, 4 \quad (7),$$

$$i=1: x\text{-location} \quad (3),$$

$$i=2: y\text{-location} \quad (4),$$

$$i=3: z\text{-location} \quad (5),$$

and $$i=4: \text{a node ID} \quad (8).$$

According to exemplary embodiments, the node ID (such as the node ID data 220 (see FIG. 13A and FIG. 13B) can be an aircraft ID used in the multidimensional (i.e., an at least 2D, 3D, 4D or greater multidimensional) MLG data structure to cross reference tracking of velocity, travel time, and final destination of each node or aircraft.

According to exemplary embodiments, the data structure of the multidimensional MLG in Cartesian coordinates is defined by a plurality of constraints, as follows:

$$x(i,j,k) \leqq x(i+1,j,k)\ i=1, \ldots, Nx-1; j=1, \ldots, Ny; k=1, \ldots, Nz,$$

$$y(i,j,k) \leqq y(i,j,+1,k)\ i=1, \ldots, Nx; j=1, \ldots, Ny-1; k=1, \ldots, Nz$$

$$z(i,j,k) \leqq z(i,j,k+1)\ i=1, \ldots, Nx; j=1, \ldots, Ny; k=1, \ldots, Nz-1, \quad (1),$$

where i, j, and k are grid indices (in i-j-k space) of each node;

where Nx, Ny, and Nz are the number of particles/objects/nodes in each direction; and where the plurality of constraints mean that each grid line in each spatial direction is forced to be a monotone index mapping; thus, $$N=Nx \times Ny \times Nz \quad (9),$$

is a total number of nodes, and a node can represent an individual vehicle or platform in various transport systems.

Further, according to exemplary embodiments, executing the tracking algorithm A7 (such as in the operation 122) includes further simulator operations as described as follows.

Referring to FIG. 12A, FIG. 12B, FIG. 12C, FIG. 12D and FIG. 13A, and in accordance with the first exemplary embodiment, at an operation "performing qualitative diagnostics on the multidimensional MLG 132" (hereafter "the operation 132"), the program code of the method 100 when executed by the computer processor 206 of the system 200 causes the computer processor 206 to perform qualitative diagnostics checking operations of the multidimensional MLG; calling one or more algorithms to return again to the operation 116 to perform operations of conflict detection and resolution, and repeating iterations of conflict detection and resolution operations as necessary, and returning again to the operation 112 repeating iterations of updating positions and trajectories of each node, as necessary.

Referring again to FIG. 12A, FIG. 12B, FIG. 12C, FIG. 12D, FIG. 12E and FIG. 13A, and in accordance with the first exemplary embodiment, at an operation "calculating a second velocity vector for each node 134" (hereafter "the operation 134"), the program code of the method 100 when executed by the computer processor 206 of the system 200 causes the computer processor 206 to calculate a second velocity vector for each node in the plurality of moving nodes; incrementing time; and either returning to sorting each node in the plurality of moving nodes using the multidimensional MLG, based on the x-, y-, z-locations or ending execution of the tracking algorithm, where velocity vectors are calculated and recalculated at timed intervals for each node and where the first velocity vector and the second velocity vector can be calculated and/or recalculated for collision avoidance, forming a straight line path to a final x-, y-, z-location of each node (refer to the operation 150).

Figure 12D:
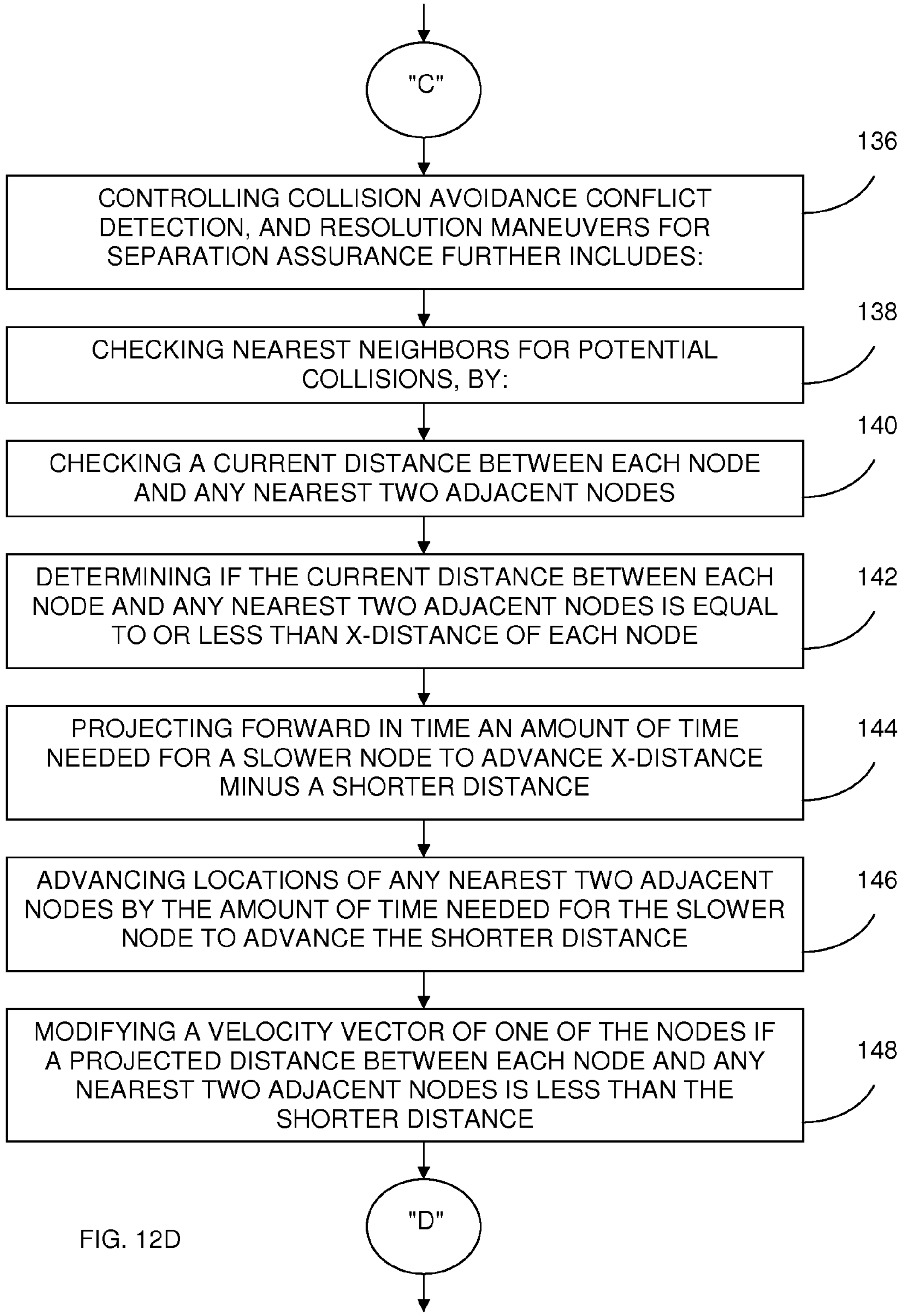
FIG. 12D illustrates the continuation of the method 100 of simulating, controlling and optimizing aircraft traffic systems.

Again referring to FIG. 12A, FIG. 12B, FIG. 12C, FIG. 12D and FIG. 13A and further, according to the first exemplary embodiment, referring to the operation 114, in regard to determining separation assurance, the determining operation (i.e., the operation 114) further includes controlling collision avoidance, performing conflict detection operations and deriving node resolution maneuvers (see the operation 136), and further includes the operation 138 of checking nearest neighbors for potential collisions as follows:

In accordance with the first exemplary embodiment, the operations of the method 100 continue from FIG. 12C to FIG. 12D, as indicated by continuation symbol "C" circled at the bottom of FIG. 12C representing the continuation of the operations at symbol "C" circled at the top of FIG. 12D.

Referring to FIG. 12A, FIG. 12B, FIG. 12C, FIG. 12D and FIG. 13A, and in accordance with the first exemplary embodiment, at an operation "controlling collision avoidance, conflict detection, and resolution maneuvers for separation assurance further includes: 136" (hereafter "the operation 136"), the program code of the method 100 when executed by the computer processor 206 of the system 200 causes the computer processor 206 to further control collision avoidance, perform conflict detection operations and derive node resolution maneuvers by performing the following operations and/or sub operations:

Referring again to FIG. 12A, FIG. 12B, FIG. 12C, FIG. 12D and FIG. 13A, and in accordance with the first exemplary embodiment, at an operation "checking nearest neighbors for potential collisions, by: 138" (hereafter "the operation 138"), the program code of the method 100 when executed by the computer processor 206 of the system 200 causes the computer processor 206 to check for potential collisions of nodes by checking the nearest neighbors of a given node or nodes in transport systems.

Again referring to FIG. 12A, FIG. 12B, FIG. 12C, FIG. 12D and FIG. 13A, and in accordance with the first exemplary embodiment, at an operation "checking a current distance between each node and any nearest two adjacent nodes 140" (hereafter "the operation 140"), the program code of the method 100 when executed by the computer processor 206 of the system 200 causes the computer processor 206 to check a current distance between each node and any nearest two adjacent nodes in all three x-, y-, and z-directions in the multidimensional MLG, by determining distance as follows:

Referring to FIG. 12A, FIG. 12B, FIG. 12C, FIG. 12D and FIG. 13A, and in accordance with the first exemplary embodiment, at an operation "determining if the current distance between each node and any nearest two adjacent nodes is equal to or less than a certain distance "X" of each node 142" (hereafter "the operation 142"), the program code of the method 100 when executed by the computer processor 206 of the system 200 causes the computer processor 206 to determine if the current distance between each node under examination in the multidimensional MLG and any nearest two adjacent nodes in all three x-, y-, and z-directions is equal to or less than X-distance of each node, where X-distance can be a value from about 4 units of distance up to about 10 units of distance or even greater depending on the circumstances involving the speed of the involved nodes and the timeframe of a possible collision of nodes; thus, the value for X-distance can range from about 1 unit of distance up to about 1,000 units of distance.

According to exemplary embodiments, units of distance can be in any system of measurement, including the Metric System of Measurement and/or in the English System of Measurement including centimeters, meters, and/or kilometers and/or inches, feet, yards and/or miles and/or any other units and systems of measurement.

Referring again to FIG. 12A, FIG. 12B, FIG. 12C, FIG. 12D and FIG. 13A, and in accordance with the first exemplary embodiment, at an operation "projecting forward in time an amount of time needed for a slower node to advance X-distance minus a shorter distance 144" (hereafter "the operation 144"), the program code of the method 100 when executed by the computer processor 206 of the system 200 causes the computer processor 206 to project forward in time an amount of time needed for a slower node to advance X-distance minus a shorter distance, where the shorter distance can be X-3 units shorter than the X-distance, preferably where the value of the X-distance can be 5 miles and thus the value of the X-3 shorter distance can preferably be 2 miles.

Again referring to FIG. 12A, FIG. 12B, FIG. 12C, FIG. 12D and FIG. 13A, and in accordance with the first exemplary embodiment, at an operation "advancing locations of any nearest two adjacent nodes by the amount of time needed for the slower ode to advance the shorter distance 146" (hereafter "the operation 146"), the program code of the method 100 when executed by the computer processor 206 of the system 200 causes the computer processor 206 to advance locations of any nearest two adjacent nodes by the amount of time needed for the slower node to advance the shorter distance, where the value for the shorter distance can range from about a half of a unit of distance up to about 1000 units of distance.

Referring to FIG. 12A, FIG. 12B, FIG. 12C, FIG. 12D and FIG. 13A, and in accordance with the first exemplary embodiment, at an operation "modifying a velocity vector of one of the nodes if a projected distance between each node and any nearest two adjacent nodes is less than the shorter distance 148" (hereafter "the operation 148"), the program code of the method 100 when executed by the computer processor 206 of the system 200 causes the computer processor 206 to modify a velocity vector of one of the nodes by X number of degrees in an x-y direction, if a projected distance between each node and any nearest two adjacent nodes in all three x-, y-, and z-directions is less than the shorter distance. The value for the X number of degrees can range from about X=10 degrees up to about X=50 degrees, preferably the X number of degrees ranges from about 20 degrees to about 30 degrees. See FIG. 2D which illustrates a schematic of a collision avoidance maneuver between two aircraft, that are within five miles of each other after projecting forward in time for 10 seconds. The direction of the velocity vector for each aircraft (before the collision avoidance move) is shown by the solid black arrow representing aircraft 1 and the solid black arrow representing aircraft 2, and the angle between the velocity vector for each aircraft and the positive x-axis of each aircraft is shown by the curved dotted arrow(s). The collision avoidance conflict detection and resolution algorithm modifies the direction of one aircraft by 30 degrees (in this illustration the direction of aircraft 2 is modified), while maintaining the same velocity magnitude for that aircraft (i.e., for aircraft 2). To avoid collision with aircraft 1, the angle of the velocity vector of aircraft 2 is adjusted by 30 degrees, as shown by the arrow having longer black dashes, labeled "new", which is offset 30 degrees from the solid black arrow labeled "old". Velocity vectors are calculated and recalculated at timed intervals for each node, and where the first velocity vector and the second velocity vector can be calculated and/or recalculated for collision avoidance, forming a straight line path to a final x-, y-, z-location of each node.

Figure 12E:
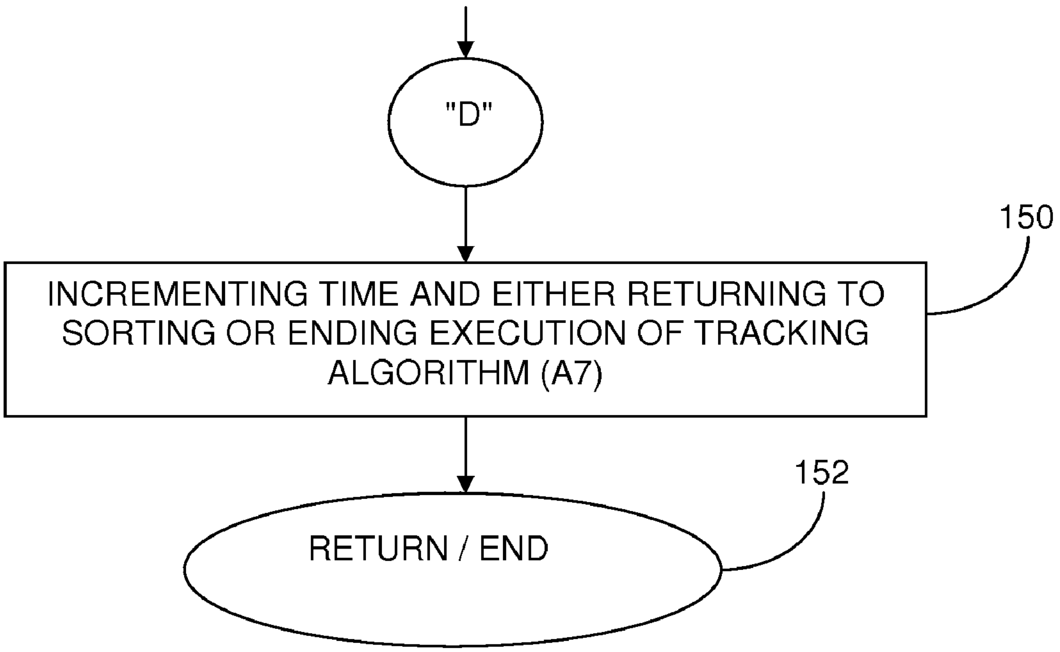
FIG. 12E illustrates the continuation of the method 100 of simulating, controlling and optimizing aircraft traffic systems.

In accordance with the first exemplary embodiment, the operations of the method 100 continue from FIG. 12D to FIG. 12E, as indicated by continuation symbol "D" circled at the bottom of FIG. 12D representing the continuation of the operations at symbol "D" circled at the top of FIG. 12E.

Referring to FIG. 12A, FIG. 12B, FIG. 12C, FIG. 12D, FIG. 12E and FIG. 13A, and in accordance with the first exemplary embodiment, at an operation "incrementing time and either returning to sorting or ending execution of tracking algorithm 150" (hereafter "the operation 150"), the program code of the method 100 when executed by the computer processor 206 of the system 200 causes the computer processor 206 to increment a segment of time; and cause the program code to either return to sorting each node in the plurality of moving nodes using the multidimensional MLG, based on the x-, y-, z-locations or end execution of the tracking algorithm A7.

Referring to 12A, FIG. 12B, FIG. 12C, FIG. 12D, FIG. 12E and FIG. 13A, in accordance with the first exemplary embodiment, at an operation "return/end 152", (hereafter "the operation 152"), the program code of the method 100 executed by the computer processor 206, causes the computer processor 206 to automatically either return to any of the above operations and/or sub operations and iteratively perform any one or more of the operations and/or sub operations until the appropriate operations are completed, resulting in rapid predictions and models which enable active design of air transportation systems, involving operations and sub operations of the method 100 of providing various solutions in regard to simulating, controlling, and optimizing dynamic global models of transport systems, by combining a multidimensional Monotonic Lagrangian Grid (MLG) algorithm with algorithms for separation assurance and updating trajectories of a plurality of moving nodes within transport systems, in accordance with the first exemplary embodiment. Or, the program code, such as program 100, of the method 100 executed by the computer processor 206, causes the computer processor 206 to end, when program code of the method 100 receives a signal to stop executing.

According to a second exemplary embodiment, referring to FIG. 13B, a system of traffic control management, simulation, control and optimization of dynamic global traffic models, using dynamic global models of a plurality of traffic nodes, such as traffic node 290, comprises: a plurality of instrument control and data management modules residing in one or more of a plurality of traffic node 290 platforms and a plurality of traffic node 290 platform control stations, where any one or more of a traffic node 290 platform of the plurality of traffic node 290 platforms can be any one or more of a plurality of moving objects and a plurality of stationary objects (such as stationary node 295) including aircraft, spacecraft, and watercraft; moving in complex paths or land stations, such as stationary node 295, existing in stationary states.

According to exemplary embodiments, the system of traffic control management further includes (again referring to FIG. 13B and/or FIG. 13A): a communications network 272 communicatively coupling electronic communications between the plurality of instrument control and data management modules of the plurality of traffic node 290 platforms and the plurality of traffic node 290 platform control stations, such as stationary node 295.

Referring to FIG. 13B, FIG. 14A, FIG. 14B, FIG. 14C, FIG. 14D, FIG. 15A and FIG. 15B, further according to the second exemplary embodiment, the system of traffic control management further includes: a computer processor 206 having a computer memory, such as memory 208, and having a computer read/write media, such as computer usable medium 1502, residing in the computer memory, containing either a computer readable, a computer writable, and/or a computer executable program code, such as the program 300, residing in the plurality of instrument control and data management modules, that when executed by the computer processor 206, the computer executable program code such as program 300 containing the method 300 causes the computer processor to execute instructions causing the computer process in combination with the system of traffic control management, to perform the operations comprising the method of traffic control management, such as the method 300, where the method of traffic control management includes operations and/or sub operations of combining a multidimensional MLG algorithm A1 with other algorithms, such as in an operation 304, for separation assurance and updating trajectories of the plurality of traffic node 290 platforms in the system of traffic control management, such as the system 200, illustrated in FIG. 13B and/or FIG. 13A, where, according to exemplary embodiments, a numerical model runs on a desktop or laptop computer, containing a Fortran90 compiler and a display screen, such as display 202. The numerical model can also run on UNIX workstations, with Fortran90 compilers. On these computing platforms, such as computer processor 206, the numerical model runs faster than real time. In exemplary embodiments, the numerical model can track and sort the movement of approximately 5,000 aircraft over 10 hours of physical time, in approximately 10 minutes of CPU time.

Referring to FIG. 13A and FIG. 13B, in exemplary embodiments a dynamic global model for air traffic is developed, and used in a computational test-bed framework for evaluating approaches to global air systems control and optimization. The underlying algorithm used in the model is the MLG, including the multidimensional MLG algorithm A1, which can quickly track and sort positions of many aircraft, both on the ground (at airports) and in the air. By using the fast sorting algorithm in the MLG, such as bubble sorting algorithm A8 and shell sorting algorithm A9, the simulations presented here (with about 5,000 aircraft) have used approximately 10 minutes of CPU time, on a single processor machine, to simulate 10 hours of physical time.

The multidimensional MLG algorithm A1 can be at least a 2D, 3D, 4D or greater multidimensional MLG.

According to the second exemplary embodiment, the system of traffic control management, where any one or more of the plurality of moving objects and the plurality of stationary objects further includes ordinance and weapons; and further includes objects in an atmosphere including projectiles, space shuttles, and/or airplanes; objects in space, further including satellites, space debris, space shuttles, projectiles and a plurality of mobile sensors; objects on land including all terrain land vehicles; and objects on and in bodies of water, further including surface watercraft, below surface watercraft, mines, and projectiles.

Further, according to the second exemplary embodiment, the computer processor 206 executes program code, such as program 300 and/or program 100 having instructions causing the computer processor 206 operating in combination with the system of traffic control management, such as the system 200, to perform the operations comprising the method of traffic control management, such as the method 300 and/or the method 100, where the method of traffic control management further includes operations and sub operations, as follows, according to the second exemplary embodiment.

Figure 14A:
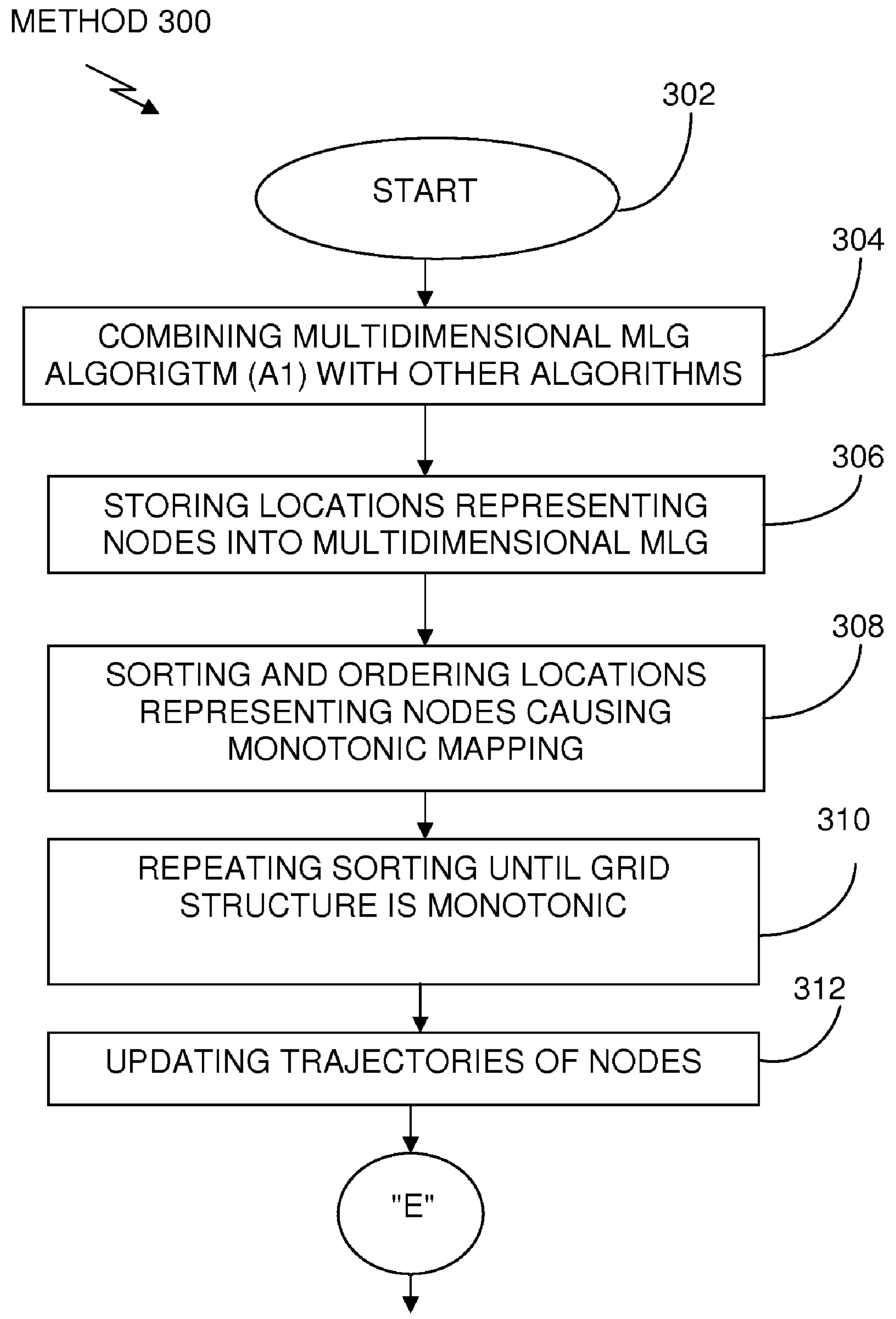
FIG. 14A illustrates the method 300 of combining a multidimensional MLG algorithm with other algorithms for simulating, controlling and optimizing aircraft traffic systems.

Referring to FIG. 13B and FIG. 14A, and in accordance with the second exemplary embodiment, at an operation "start 302" (hereafter "the operation 302"), the system 200 receives a signal which activates and initiates the computer executable program code implementing the method 300. The method 300, upon activation, performs other operations from selection signals received in the computer processor 206 from the input device 252, causing the method 300 to be executed by the computer processor 206 and in turn causing the computer processor 206 to perform operations and procedures including calling algorithms and software applications and executing the instructions in the algorithms and applications, resulting in rapid predictions and models which enable active design of air transportation systems, involving operations and sub operations of the method 300 of providing various solutions in regard to simulating, controlling, and optimizing dynamic global models of transport systems, by combining a multidimensional Monotonic Lagrangian Grid (MLG) algorithm (such as the multidimensional MLG algorithm A1) with algorithms for separation assurance and updating trajectories of a plurality of moving nodes within transport systems.

Referring to FIG. 13B and FIG. 14A, in accordance with the second exemplary embodiment, at an operation "combining multidimensional MLG algorithm A1 with other algorithms 304" (hereafter "the operation 304"), the program code (such as the program 300) of the method 300 when executed by the computer processor 206 of the system 200 causes the computer processor 206 to combine a 3D MLG algorithm A1 with algorithms for separation assurance and updating trajectories of the plurality of traffic node 290 platforms in the system 200 of traffic control management.

Referring again to FIG. 13B and FIG. 14A, in accordance with the second exemplary embodiment, at an operation "storing locations representing nodes into multidimensional MLG 306" (hereafter "the operation 306"), the program code of the method 300 causes the computer processor 206 to store in a structure of the 3D MLG algorithm, such as the multidimensional MLG algorithm A1, physical locations describing the plurality of traffic node 290 platforms.

Referring again to FIG. 13B and FIG. 14A, in accordance with the second exemplary embodiment, at an operation "sorting and ordering locations representing nodes causing monotonic mapping 308" (hereafter "the operation 308"), the program code of the method 300 causes the computer processor 206 to sort and order the plurality of traffic node 290 platforms on a grid structure in real space and indexing space, causing a monotonic mapping between indices of the grid structure and locations describing the plurality of traffic node 290 platforms.

Again referring to FIG. 13B and FIG. 14A, in accordance with the second exemplary embodiment, at an operation "repeating sorting until grid structure is monotonic 310" (hereafter "the operation 310"), the program code of the method 300 causes the computer processor 206 to repeat sorting until the grid structure is monotonic. Sorting algorithms include bubble sorting algorithm A8 and shell sorting algorithm A9.

Referring to FIG. 13B and FIG. 14A again, in accordance with the second exemplary embodiment, at an operation "updating trajectories of nodes 312" (hereafter "the operation 312"), the program code of the method 300 causes the computer processor 206 to update trajectories of the plurality of traffic node 290 platforms.

Figure 14B:
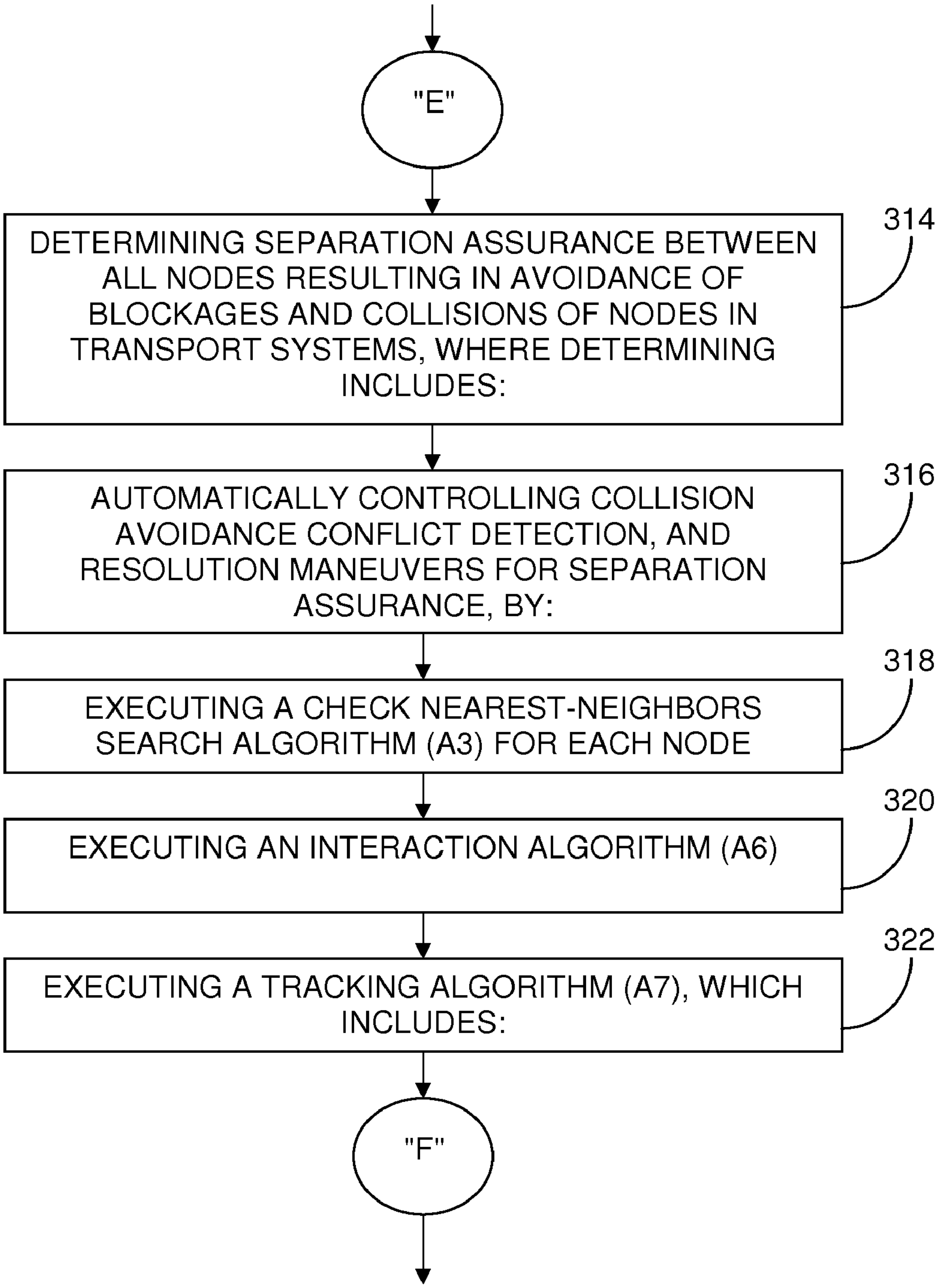
FIG. 14B illustrates the continuation of the method 300 of simulating, controlling and optimizing aircraft traffic systems.

In accordance with the second exemplary embodiment, the operations of the method 300 continue from FIG. 14A and FIG. 14B, as indicated by continuation symbol "E" circled at the bottom of FIG. 14A representing the continuation of the operations at symbol "E" circled at the top of FIG. 14B.

Referring to FIG. 13B, FIG. 14A and FIG. 14B in accordance with the second exemplary embodiment, at an operation "determining separation assurance between all nodes resulting in avoidance of blockages and collisions of nodes in transport systems . . . 314" (hereafter "the operation 314"), the program code of the method 300 causes the computer processor 206 to determine, automatically, by the computer processor 206 separation assurance between all traffic node 290 platforms of the plurality of traffic node 290 platforms, resulting in either circumventing a restricted area or avoiding blockages in transport paths, and avoiding collisions of nodes of the plurality of nodes in models of transport systems.

According to the second exemplary embodiment, the operation 314 of determining, further includes determining separation assurance by generating predictions, including optimizing, and assuring automated separation modeling predictions for each node in the plurality of moving nodes.

Again referring to FIG. 13B, FIG. 14A and FIG. 14B, and in accordance with the second exemplary embodiment, the operation 314 further includes generating predictions and further yet includes at an operation automatically controlling collision avoidance, conflict detection, and resolution maneuvers for separation assurance . . . 316" (hereafter "the operation 316").

At the operation 316, the program code of the method 300 executed by the computer processor 206 of the system 200 causes the computer processor 206 to perform additional operations and/or sub operations of automatically controlling collision avoidance, conflict detection and resolution maneuvers for separation assurance to maintain an adequate separation distance between each node in the plurality of moving nodes. These determining operations are achieved by the additional operations and/or sub operations of executing a fast nearest-neighbors search algorithm for each node 318, executing an interaction algorithm (A6) 320, and executing a tracking algorithm (A7) 322.

Again referring to FIG. 13B, FIG. 14A, and FIG. 14B, and in accordance with the second exemplary embodiment, at the operation "executing a check nearest neighbors algorithm A3 for each node 318" (hereafter "the operation 318") the program code of the method 300 executed by the computer processor 206 of the system 200 causes the computer processor 206 to execute a fast nearest neighbor search algorithm (such as the algorithm A3) for each node, in order to facilitate a primary collision avoidance conflict resolution maneuver and, a group of subsequent collision avoidance conflict resolution maneuvers for each node in the plurality of moving nodes, and/or the program code of the method 300 causes the computer processor 206 to call algorithm A5 to insert self adapting holes, serving as blank place holders within the multidimensional MLG structure.

Referring again to FIG. 13B, FIG. 14A, and FIG. 14B, and in accordance with the second exemplary embodiment, at the operation "executing an interaction algorithm (A6) 320" (hereafter "the operation 320") the program code of the method 300 executed by the computer processor 206 of the system 200 causes the computer processor 206 to execute the interaction algorithm A6, in order to facilitate the primary collision avoidance conflict resolution maneuver and, a group of subsequent collision avoidance conflict resolution maneuvers for each node in the plurality of moving nodes.

Referring again to FIG. 13B, FIG. 14A, and FIG. 14B, and in accordance with the second exemplary embodiment, at the operation "executing a tracking algorithm (A7) . . . 322" (hereafter "the operation 322) the program code of the method 300 executed by the computer processor 206 of the system 200 causes the computer processor 206 to execute the tracking algorithm A7, in order to also facilitate the primary collision avoidance conflict resolution maneuver and, a group of subsequent collision avoidance conflict resolution maneuvers for each node in the plurality of moving nodes. According to exemplary embodiments, executing the tracking algorithm A7 in the operation 322 further includes simulator operations of reading by the computer processor, a travel path plan for each traffic node 290 platform (see operation 324) in the plurality of moving traffic node 290 platforms into computer memory; assigning each traffic node 290 platform a traffic node 290 platform ID, (where the traffic node 290 platform ID can be an ID for an airplane, a space shuttle vehicle, a satellite, a piece of space debris, one or more sensors, one or more weapons or pieces of ordinance, as represented by node ID data 220) an initial x-, y-, z-location, a final x-, y-, z-location, a set of waypoints between the initial x-, y-, z-location, the final x-, y-, z-location, and an average speed; calculating a first velocity vector for each node in the plurality of moving nodes; inputting a plurality of data in a data structure of the multidimensional (multi-D) MLG.

Figure 14C:
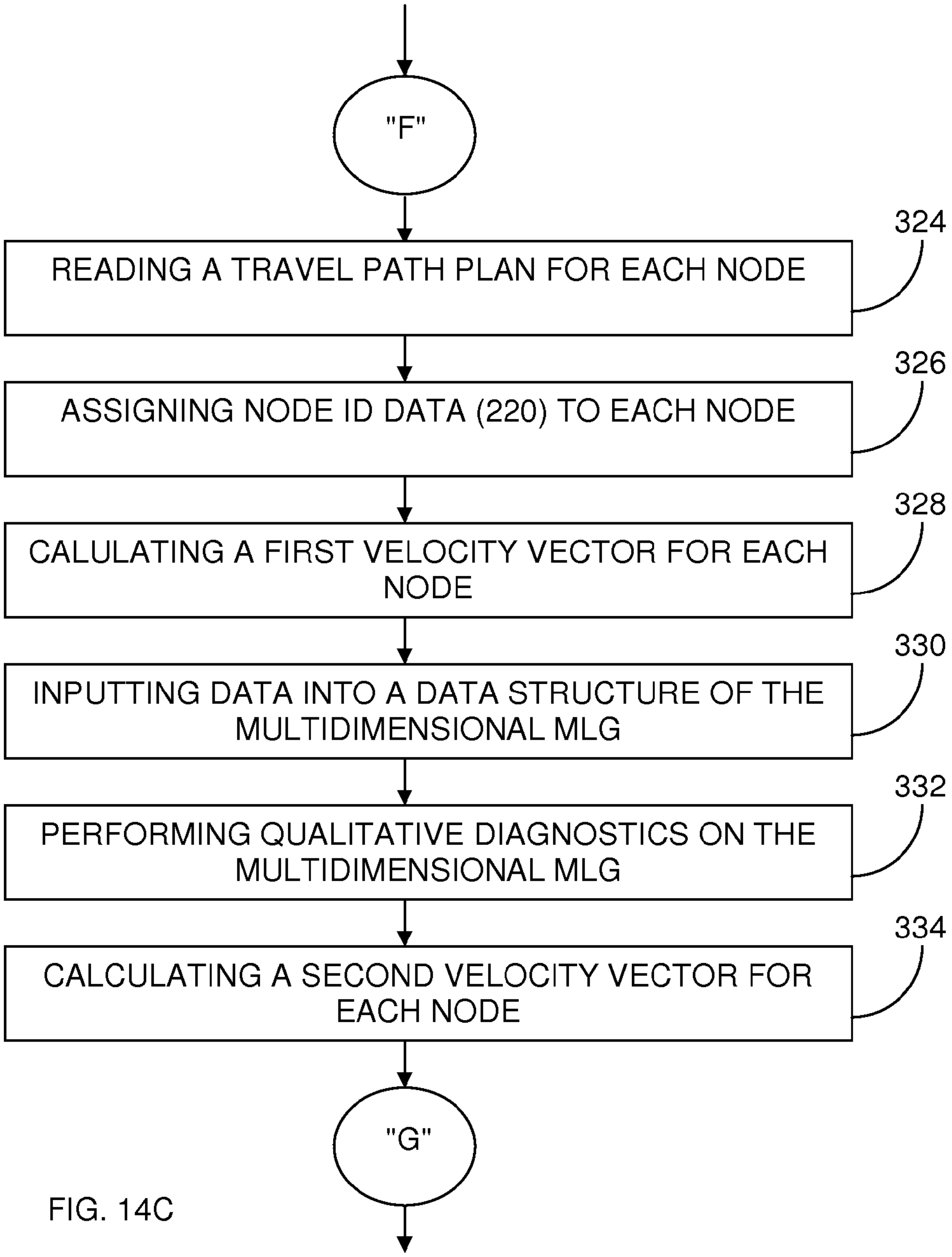
FIG. 14C illustrates the continuation of the method 300 of simulating, controlling and optimizing aircraft traffic systems.

In accordance with the second exemplary embodiment, the operations of the method 300 continue from FIG. 14B to FIG. 14C, as indicated by continuation symbol "F" circled at the bottom of FIG. 14B representing the continuation of the operations at symbol "F" circled at the top of FIG. 14C.

Referring to FIG. 13B, FIG. 14A, FIG. 14B, and FIG. 14C, and in accordance with the second exemplary embodiment, at an operation "reading a travel path plan for each node 324" (hereafter "the operation 324"), the program code of the method 300 executed by the computer processor 206 of the system 200 causes the computer processor 206 to read a travel path plan for each traffic node 290 platform or aircraft.

Referring to FIG. 13B, FIG. 14A, FIG. 14B, and FIG. 14C, and in accordance with the second exemplary embodiment, at an operation "assigning node ID data (220) to each node 326" (hereafter "the operation 326"), the program code of the method 300 when executed by the computer processor 206 of the system 200 causes the computer processor 206 to assign each node in the plurality of moving nodes an ID (such as node ID data 220), an initial x-, y-, z-location (such as physical x,y,z, node location data 216), a final x-, y-, z-location (also, such as physical x,y,z, node location data 216), a set of waypoints between the initial x-, y-, z-location, the final x-, y-, z-location, and an average speed.

Referring again to FIG. 13B, FIG. 14A, FIG. 14B, and FIG. 14C, and in accordance with the second exemplary embodiment, at an operation "calculating a first velocity vector for each node 328" (hereafter "the operation 328"), the program code of the method 300 causes the computer processor 206 to calculate a first velocity vector for each traffic node 290 platform in the plurality of moving traffic node 290 platforms.

Again referring to FIG. 13B, FIG. 14A, FIG. 14B, and FIG. 14C, and in accordance with the second exemplary embodiment, at an operation "inputting data into a data structure of the multidimensional MLG 330" (hereafter "the operation 330"), the program code of the method 300 causes the computer processor 206 to input a plurality of data in a data structure of the multidimensional MLG, where the plurality of data include node ID data 220 and a current x-, y-, z-location, such as physical x,y,z, node location data 216, for each traffic node 290 platform; where the plurality of data can be characterized, as follows:

where the $$\text{(multi-D) MLG}(i,N),\text{ where i}=1,\ldots,4 \quad (10),$$

$$i=1: x\text{-location} \quad (3),$$

$$i=2: y\text{-location} \quad (4),$$

$$i=3: z\text{-location} \quad (5),$$

and $$i=4: \text{the traffic node 290 platform ID} \quad (8).$$

According to exemplary embodiments, the node ID can be an aircraft ID used in the 3D MLG data structure to cross reference tracking of velocity, travel time, and final destination of each node or aircraft.

According to exemplary embodiments, the data structure of the multidimensional MLG in Cartesian coordinates is defined by a plurality of constraints, as follows:

$$x(i,j,k)\leqq x(i+1,j,k)\ i=1,\ldots,Nx-1;\ j=1,\ldots,Ny;\ k=1,\ldots,Nz,$$

$$y(i,j,k)\leqq y(i,j,+1,k)\ i=1,\ldots,Nx;\ j=1,\ldots,Ny-1;\ k=1,\ldots,Nz$$

$$z(i,j,k)\leqq z(i,j,k+1)\ i=1,\ldots,Nx;\ j=1,\ldots,Ny;\ k=1,\ldots,Nz-1, \quad (1),$$

where i, j, and k are grid indices (in i-j-k space) of each node;

where Nx, Ny, and Nz are the number of particles/objects/nodes in each direction; and where the plurality of constraints mean that each grid line in each spatial direction is forced to be a monotone index mapping; thus, $$N=Nx\times Ny\times Nz \quad (9),$$

is a total number of nodes, and a node can represent an individual vehicle or platform in transport systems.

Further, according to the second exemplary embodiment, executing the tracking algorithm includes further simulator operations of performing qualitative diagnostics checking operations of the multidimensional MLG; calling one or more algorithms to perform operations of conflict detection and resolution, and updating positions and trajectories of each node; calculating a second velocity vector for each node in the plurality of moving nodes; incrementing time; and either returning to sorting each node in the plurality of moving nodes using the multidimensional MLG, based on the x-, y-, z-locations; and/or checking nearest neighbors for potential collisions by inserting self adapting holes serving as blank placeholders within the MLG structure or ending execution of the tracking algorithm, as follows:

Referring to FIG. 13B, FIG. 14A, FIG. 14B, and FIG. 14C, and in accordance with the second exemplary embodiment, at an operation "performing qualitative diagnostics on the multidimensional MLG 332" (hereafter "the operation 332"), the program code of the method 300 when executed by the computer processor 206 of the system 200 causes the computer processor 206 to perform qualitative diagnostics checking operations of the multidimensional MLG, using one or more iterations of a simulated annealing process of randomly perturbing traffic node 290 platforms, creating unperturbed original traffic node 290 platforms and by calling one or more algorithms to return to the operation 316 to perform operations of conflict detection and resolution, and repeating iterations of conflict detection and resolution operations as necessary, and returning again to the operation 312 repeating iterations of updating positions and trajectories of each node, as necessary.

Referring again to FIG. 13B, FIG. 14A, FIG. 14B, and FIG. 14C, and in accordance with the second exemplary embodiment, at an operation "calculating a second velocity vector for each node 334" (hereafter "the operation 334"), the program code of the method 300 when executed by the computer processor 206 of the system 200 causes the computer processor 206 to calculate a second velocity vector for each traffic node 290 platform n the plurality of moving traffic node 290 platforms; incrementing time; and either returning to sorting each traffic node 290 platform in the plurality of moving traffic node 290 platforms, using the multidimensional MLG, based on the x-, y-, z-locations or ending execution of the tracking algorithm A7, where velocity vectors are calculated and recalculated at timed intervals for each traffic node 290 platform and where the first velocity vector and the second velocity vector can be calculated and/or recalculated for collision avoidance, forming a straight line path to a final x-, y-, z-location of each node (refer to the operation 342).

Figure 14D:
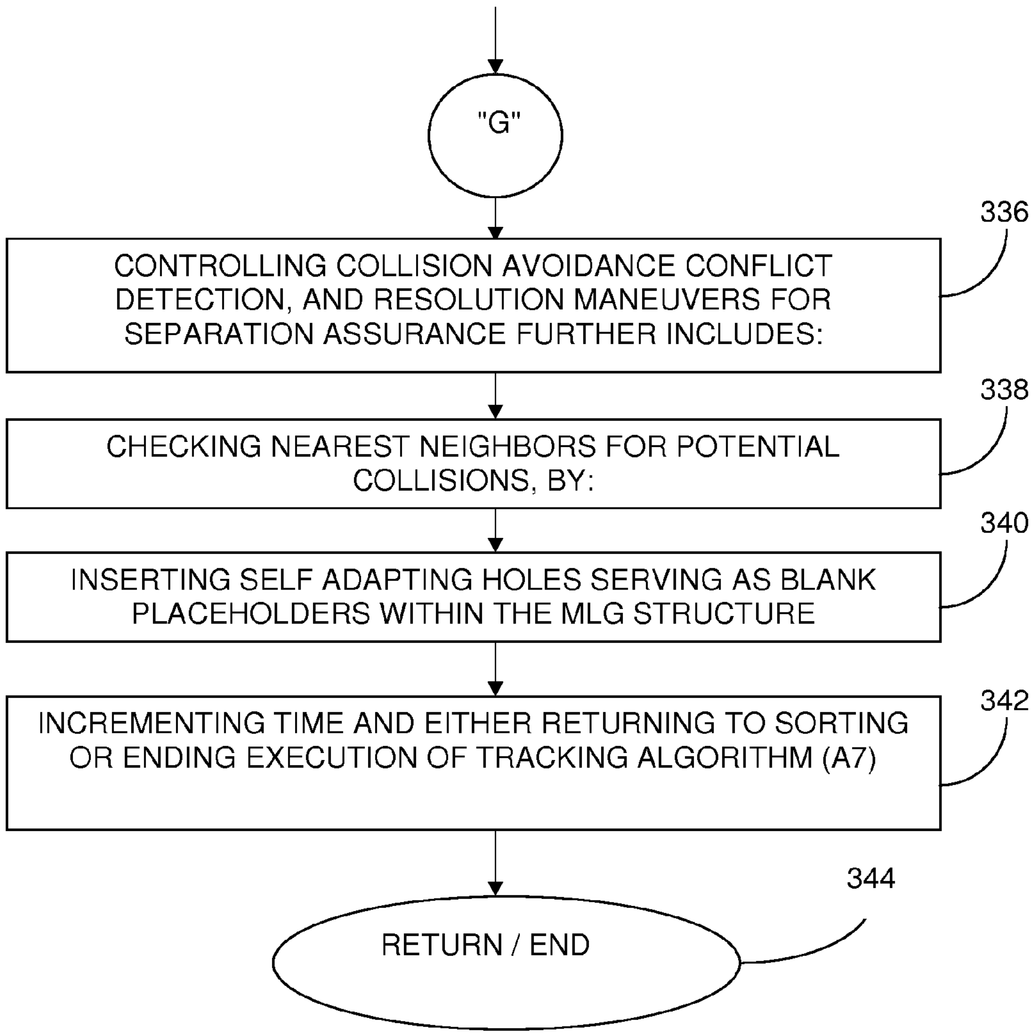
FIG. 14D illustrates the continuation of the method 300 of simulating, controlling and optimizing aircraft traffic systems.

In accordance with the second exemplary embodiment, the operations of the method 300 continue from FIG. 14C to FIG. 14D, as indicated by continuation symbol "G" circled at the bottom of FIG. 14C, representing the continuation of the operations at symbol "G" circled at the top of FIG. 14D.

Again referring to FIG. 13B, FIG. 14A, FIG. 14B, FIG. 14C, and FIG. 14D, and further, according to the second exemplary embodiment, referring to the operation 314, in regard to determining separation assurance, the determining operation (i.e., the operation 314) further includes controlling collision avoidance, performing conflict detection operations and deriving node resolution maneuvers (see the operation 336), and further includes the operation 338 of checking nearest neighbors for potential collisions.

Referring to FIG. 13B, FIG. 14A, FIG. 14B, FIG. 14C, and FIG. 14D, according to the second exemplary embodiment, at an operation "controlling collision avoidance, conflict detection, and resolution maneuvers for separation assurance . . . 336" (hereafter "the operation 336"), the program code of the method 300 when executed by the computer processor 206 of the system 200 causes the computer processor 206 to return to the operation 314 to further automatically and repeatedly control collision avoidance, conflict detection, and resolution of maneuvers for separation assurance of each traffic node 290 platform, as initiated in the operation 314, by checking nearest neighbors for potential collisions (see the operation 338).

Referring again to FIG. 13B, FIG. 14A, FIG. 14B, FIG. 14C, and FIG. 14D, according to the second exemplary embodiment, at an operation "checking nearest neighbors for potential collisions . . . 338" (hereafter "the operation 338"), the program code of the method 300 causes the computer processor 206 to check nearest neighbor traffic node 290 platforms of a given traffic node 290 platform for the potential of collisions with each other by either checking and determining a current distance between each traffic node 290 node platform in a neighborhood of a plurality of traffic node 290 platforms and/or inserting self adapting holes serving as blank placeholders within the multidimensional MLG algorithm A1 structure (see the operation 340), where the MLG structure is a embodied in the 3D MLG.

Referring to FIG. 13B, FIG. 14A, FIG. 14B, FIG. 14C, and FIG. 14D again, according to the second exemplary embodiment, at an operation "inserting self adapting holes serving as blank placeholders within the MLG structure 340" (hereafter "the operation 340"), the program code of the method 300 causes the computer processor 206 to call an algorithm, such as the insert self adapting holes algorithm A5, which automatically inserts self adapting holes serving as blank placeholders within the 3D MLG structure, to force the 3D MLG grid to be well structured everywhere, and will ensure that all near-neighbors are within the checked buffer zone.

Again referring to FIG. 13B, FIG. 14A, FIG. 14B, FIG. 14C, and FIG. 14D, according to the second exemplary embodiment, at an operation "incrementing time and either returning to sorting or ending execution of tracking algorithm (A7) 342" (hereafter "the operation 342"), the program code of the method 300 causes the computer processor 206 to automatically increment a segment of time; and cause the program code of the method 300 to either return to sorting each traffic node 290 platform in the plurality of moving traffic node 290 platforms using the 3D MLG, based on the x-, y-, z-locations or end execution of the tracking algorithm A7, where velocity vectors are calculated and recalculated at timed intervals for each node, and where the first velocity vector and the second velocity vector can be calculated and/or recalculated for collision avoidance, forming a straight line path to a final x-, y-, z-location of each node.

Referring to FIG. 13B, FIG. 14A, FIG. 14B, FIG. 14C, and FIG. 14D, in accordance with the second exemplary embodiment, at an operation "return/end 344", (hereafter "the operation 344"), the program code of the method 300 executed by the computer processor 206, causes the computer processor 206 to automatically either return to any of the above operations and/or sub operations and iteratively perform any one or more of the operations and/or sub operations until the appropriate operations are completed, resulting in rapid predictions and models which enable active design of air transportation systems, involving operations and sub operations of the method 300 of providing various solutions in regard to simulating, controlling, and optimizing dynamic global models of transport systems, by combining the multidimensional Monotonic Lagrangian Grid (MLG) algorithm with algorithms for separation assurance and updating trajectories of a plurality of moving nodes within transport systems, in accordance with the second exemplary embodiment. Or, the program code, such as program 300, of the method 300 executed by the computer processor 206, causes the computer processor 206 to end, when program code of the method 300 receives a signal to cease execution.

In exemplary embodiments, artificial intelligence and/or knowledge based tools can be used in the determining operations, where these tools include: rule based systems, model based reasoning, neural nets, fuzzy logic and decision trees; using learning algorithms, the computer processor 206 can determine training activity parameters describing activity of one or more of the corresponding traffic node 290 platforms by training a neural network as a statistical estimator or training a neuro-fuzzy model or using pruning methods for describing activity. The statistical estimator can be used in conjunction with pruning methods to describe activity of one or more of the traffic node 290 platforms.

The advantages and new features of the exemplary embodiments include using the MLG for air-traffic modeling, compared to other existing simulators (such as FACET) is computational speed. The test scenarios discussed above, involving nearly 5,000 aircraft, using the MLG nearest-neighbors interaction algorithm, require only 10 minutes of CPU time on a single processor workstation, to simulate 10 hours of physical time. In addition, it is easy to insert and test new algorithms (e.g., for collision avoidance, or circumventing restricted zones, or aircraft separation maintenance) into the MLG code.

In exemplary embodiments, the motivation and context of using the MLG model, is based on the major target of investigating systemic phenomena in complex air traffic systems, including the emergent (unpredicted) effects. Both the study of emergent effects and the active control and optimization of a complex system require the derivation of the functional dependences of the global characteristics of interest (e.g., throughput and capacity) on the local parameters of a complex transport network. Model derivation requires massive computational experiments. Thus, flexible and fast simulation, assisted by parallel and distributed computations, facilitate model building to a great extent. This is why, despite the availability of sophisticated air traffic simulators (e.g., FACET), the MLG is used because it has much faster computation capabilities than conventional air traffic simulators.

The focus of the multidimensional MLG disclosed herein is directed to negotiation of systemic phenomena in complex transport systems, including air transportation and multimodal transportation. Of particular interest is predictive modeling which enables active design of transport systems. Model development and assessment, especially in systems that include large numbers of interacting autonomous participants, require massive computational capabilities. Flexible, fast simulation, assisted by easy-to-use parallel and distributed computations, facilitate model building by the multidimensional MLG.

While the exemplary embodiments have been particularly shown and described with reference to preferred embodiments thereof, it will be understood by those skilled in the art that the preferred embodiments including the first exemplary embodiment, and the second exemplary embodiment have been presented by way of example only, and not limitation; furthermore, various changes in form and details can be made therein without departing from the spirit and scope of the invention. Thus, the breadth and scope of the present exemplary embodiments should not be limited by any of the above described preferred exemplary embodiments, but should be defined only in accordance with the following claims and their equivalents. All references cited herein, including issued U.S. patents, or any other references, are each entirely incorporated by reference herein, including all data, tables, figures, and text presented in the cited references. Also, it is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

The foregoing description of the specific embodiments will so fully reveal the general nature of the invention that others can, by applying knowledge within the ordinary skill of the art, readily modify and/or adapt for various applications such specific embodiments, without undue experimentation, and without departing from the general concept of the present invention. Therefore, such adaptations and modifications are intended to be within the meaning and range of equivalents of the disclosed embodiments claimed herein and below, based on the teaching and guidance presented herein and the claims which follow.

What is claimed is:

1. A method, implemented in a computer readable and executable program on a computer processor, simulating, controlling, and optimizing dynamic global models of transport systems, the method comprising:

combining a multidimensional Monotonic Lagrangian Grid (MLG) algorithm with algorithms for separation assurance and updating trajectories of a plurality of moving nodes within transport systems:

storing into a structure of the multidimensional MLG algorithm, by the computer processor, physical locations describing the plurality of moving nodes, sorting and ordering the plurality of moving nodes on a grid structure in real space and indexing space, causing a monotonic mapping between indices of the grid structure and locations describing the plurality of moving nodes, and repeating sorting until the grid structure is monotonic, updating trajectories of the plurality of moving nodes; and determining in real time, by the computer processor, separation assurance between each node of the plurality of moving nodes in dynamic global models of transport systems, resulting in avoidance of blockages in transport paths, and avoidance of collisions of each node of the plurality of moving nodes in transport systems, wherein determining separation assurance further includes automatically controlling collision avoidance, conflict detection and resolution maneuvers for separation assurance to maintain an adequate separation distance between each node of the plurality of moving nodes, by:

executing by the computer processor a fast nearest-neighbors search algorithm for each node, executing an interaction algorithm, and executing a tracking algorithm for a primary collision avoidance conflict resolution maneuver and, a group of subsequent collision avoidance conflict resolution maneuvers for each node of the plurality of moving nodes, and wherein executing the tracking algorithm includes simulator operations as follows:

reading by the computer processor, a travel path plan for each node of the plurality of moving nodes into computer memory;

assigning each node of the plurality of moving nodes an ID, an initial x-, y-, z-location, a final x-, y-, z-location, a set of waypoints between the initial x-, y-, z-location, the final x-, y-, z-location, and an average speed;

calculating a first velocity vector for each node of the plurality of moving nodes;

inputting a plurality of data in a data structure of the multidimensional MLG algorithm, wherein the plurality of data include a node ID and a current x-, y-, z-location for each node of the plurality of moving nodes characterized as:

$$\text{(multi-D) MLG}(i,N),\ \text{where } i=1, \ldots, 4 \quad (10),$$

$$i=1\text{: } x\text{-location} \quad (3),$$

$$i=2\text{: } y\text{-location} \quad (4),$$

$$i=3\text{: } z\text{-location} \quad (5), \text{ and}$$

$$i=4\text{: a node ID} \quad (8),$$

wherein the data structure of the multidimensional MLG algorithm in Cartesian coordinates is defined by a plurality of constraints:

$$x(i,j,k) \leqq x(i+1,j,k)\ i=1, \ldots, Nx-1;\ j=1, \ldots, Ny;\ k=1, \ldots, Nz,$$

$$y(i,j,k) \leqq y(i,j,+1,k)\ i=1, \ldots, Nx;\ j=1, \ldots, Ny-1;\ k=1, \ldots, Nz$$

$$z(i,j,k) \leqq z(i,j,k+1)\ i=1, \ldots, Nx;\ j=1, \ldots, Ny;\ k=1, \ldots, Nz-1, \quad (1),$$

wherein i, j, and k are grid indices (in i-j-k space) of each node of the plurality of moving nodes, wherein Nx, Ny, and Nz are a number of nodes of the plurality of moving nodes in each direction, wherein the plurality of constraints mean that each grid line in each spatial direction is forced to be a monotone index mapping, wherein, $$N=Nx \times Ny \times Nz \quad (9),$$

is a total number of nodes of the plurality of moving nodes, and wherein each node of the plurality of moving nodes can represent one of an individual vehicle, particle, object, node and platform in transport systems, performing qualitative diagnostics checking operations of the multidimensional MLG algorithm;

calling one or more algorithms to perform operations of conflict detection and resolution, and updating positions and trajectories of each node of the plurality of moving nodes;

calculating a second velocity vector for each node of the plurality of moving nodes;

incrementing time; and one of returning to sorting each node of the plurality of moving nodes using the multidimensional MLG algorithm, based on the x-, y-, z-locations and ending execution of the tracking algorithm.

2. The method, according to claim 1, wherein a number of dimensions of the multidimensional MLG range from 2 dimensions up to 10 dimensions, and wherein any one or more nodes of the plurality of moving nodes can become a stationary node.

3. The method according to claim 1, wherein a node of the plurality of moving nodes can be any one or more of objects in an atmosphere including: aircraft, and projectiles; objects in space, including: spacecraft, satellites, space debris, projectiles, and a plurality of mobile sensors; objects on land including: all terrain land vehicles; and objects on and in bodies of water, including: surface watercraft, below surface watercraft, mines, and projectiles, where all objects in the atmosphere, objects in space, objects on land, and objects on and in bodies of water can be moving in complex paths relative to each other.

4. The method of claim 1, wherein sorting includes a bubble sorting algorithm and a shell sorting algorithm executed on all axes, when nodes are not monotonic.

5. The method of claim 1, wherein determining separation assurance includes generating, by the computer processor, optimizing automated separation modeling predictions for each node in the plurality of moving nodes, and generating, by the computer processor, assuring automated separation modeling predictions for each node of the plurality of moving nodes.

6. The method according to claim 1, wherein controlling collision avoidance, conflict detection and resolution maneuvers for separation assurance further includes:

checking nearest neighbors for potential collisions by:

checking a current distance between each node of the plurality of moving nodes and an at least any nearest two adjacent nodes of the plurality of moving nodes in all three x-, y-, and z-directions; in the multidimensional MLG algorithm, determining if the current distance between each node of the plurality of moving nodes and the at least any nearest two adjacent nodes of the plurality of moving nodes in all three x-, y-, and z-directions equal to or less than X distance of each node, wherein X can be a value from 4 units of distance up to 10 units of distance, projecting forward in time an amount of time needed for a slower node of the plurality of moving nodes to advance X distance minus a shorter distance, advancing locations of the at least any nearest two adjacent nodes of the plurality of moving nodes by the amount of time needed for the slower node of the plurality of moving nodes to advance the shorter distance, and modifying a velocity vector of one of the at least any nearest two adjacent nodes of the plurality of moving nodes by 20 degrees in an x-y direction, if a projected distance between each node of the at least any nearest two adjacent nodes of the plurality of moving nodes in all three x-, y-, and z-directions is less than the shorter distance.

7. The method, according to claim 1, wherein the node ID is used in the data structure of the multidimensional MLG algorithm to cross-reference tracking of velocity, travel time, and final destination of each node of the plurality of moving nodes.

8. The method according to claim 1, wherein the second velocity vector calculated at timed intervals for each transport system is one of the first velocity vector and the second velocity vector calculated and recalculated for collision avoidance, forming a straight line path to the final x-, y-, z-location of each node of the plurality of moving nodes.

9. A system of traffic control management simulating, controlling, and optimizing dynamic global models of traffic for a plurality of traffic node platforms, the system comprising:

a plurality of instrument control and data management modules residing in one or more of the plurality of traffic node platforms and a plurality of traffic node platform control stations, wherein any one or more of a traffic node platform of the plurality of traffic node platforms can be any one or more of a plurality of moving objects and a plurality of stationary objects including aircraft, spacecraft, and watercraft;

a communications network communicatively coupling electronic communications between the plurality of instrument control and data management modules of the plurality of traffic node platforms and the plurality of traffic node platform control stations; and a computer processor having a non-transitory computer memory, wherein the non-transitory computer memory includes media for creating dynamic global models, wherein media for creating dynamic global models contain one of a computer readable, a computer writable, and a computer executable program code, wherein media for creating dynamic global models also reside in the plurality of instrument control and data management modules, and wherein when executed by the computer processor, the computer executable program code causes the computer processor to perform operations comprising:

combining a 3-Dimensional Monotonic Lagrangian Grid (3-D MLG) algorithm with algorithms for separation assurance and updating trajectories of the plurality of traffic node platforms in the system of traffic control management by performing additional operations of:

storing in a structure of the 3-D MLG algorithm, by the computer processor, physical locations describing the plurality of traffic node platforms, sorting and ordering the plurality of traffic node platforms on a grid structure in real space and indexing space, causing a monotonic mapping between indices of the grid structure and locations describing the plurality of traffic node platforms, repeating sorting until the grid structure is monotonic, and updating trajectories of the plurality of traffic node platforms; and determining, automatically, by the computer processor, separation assurance between all traffic node platforms of the plurality of traffic node platforms, resulting in one of circumventing a restricted area and avoiding blockages in transport paths, and avoiding collisions of traffic node platforms of the plurality of traffic node platforms in models of transport systems, wherein determining separation assurance includes generating, by the computer processor, optimizing automated separation modeling predictions for each traffic node platform in the plurality of traffic node platforms, and generating by the computer processor assuring automated separation modeling predictions for each traffic node platform in the plurality of traffic node platforms by controlling collision avoidance, conflict detection and resolution operations for separation assurance to maintain an adequate separation distance between each traffic node platform in the plurality of traffic node platforms, by:

executing, by the computer processor, one of a fast nearest-neighbors search algorithm for each traffic node platform and an inserting self adapting holes algorithm;

executing an interaction algorithm; and executing a tracking algorithm for a primary collision avoidance conflict resolution operation and, a group of subsequent collision avoidance conflict resolution operations for each traffic node platform of the plurality of traffic node platforms;

performing qualitative diagnostics checking operations of the 3-D MLG algorithm;

calling one or more algorithms to perform operations of conflict detection and resolution, and updating positions and trajectories of each traffic node platform;

calculating a second velocity vector for each traffic node platform in the plurality of traffic node platforms; and incrementing time, and one of returning to sorting each traffic node platform in the plurality of traffic node platforms using the 3-D MLG algorithm, based on the x-, y-, z-locations and ending execution of the tracking algorithm.

10. The system according to claim 9, wherein any one or more of the plurality of moving objects and the plurality of stationary objects further include objects in an atmosphere including projectiles, objects in space, further including satellites, space debris, projectiles and a plurality of mobile sensors, objects on land including all terrain land vehicles and objects on and in bodies of water, further including surface watercraft, below surface watercraft, mines, and projectiles.

11. The system according to claim 9, wherein sorting includes a bubble sorting algorithm and a shell sorting algorithm executed for all axes, when nodes are not monotonic.

12. The system, according to claim 9, wherein executing the tracking algorithm includes simulating operations as follows:

reading by the computer processor, a travel path plan for each traffic node platform in the plurality of traffic node platforms into non-transitory computer memory;

assigning each traffic node platform in the plurality of traffic node platforms a traffic node platform ID, an initial x-, y-, z-location, a final x-, y-, z-location, a set of waypoints between the initial x-, y-, z-location, the final x-, y-, z-location, and an average speed;

calculating a first velocity vector for each traffic node platform in the plurality of traffic node platforms;

one of inputting a plurality of data in a data structure of the 3-D MLG algorithm, wherein the plurality of data include the traffic node platform ID and a current x-, y-, z-location for each traffic node platform characterized as:

$$\text{(3D) MLG}(i,N),\ \text{where } i=1, \ldots, 4 \qquad (7),$$

$$i=1: x\text{-location} \qquad (3),$$

$$i=2: y\text{-location} \qquad (4),$$

$$i=3: z\text{-location} \qquad (5),$$

and $$i=4: \text{a node ID} \qquad (8),$$

wherein the data structure of the 3-D MLG in Cartesian coordinates is defined by a plurality of constraints:

$$x(i,j,k) \leqq x(i+1,j,k)\ i=1, \ldots, Nx-1;\ j=1, \ldots, Ny;\ k=1, \ldots, Nz,$$

$$y(i,j,k) \leqq y(i,j,+1,k)\ i=1, \ldots, Nx;\ j=1, \ldots, Ny-1;\ k=1, \ldots, Nz$$

$$z(i,j,k) \leqq z(i,j,k+1)\ i=1, \ldots, Nx;\ j=1, \ldots, Ny;\ k=1, \ldots, Nz-1, \qquad (1),$$

wherein i, j, and k are grid indices (in i-j-k space) of each traffic node platform, wherein Nx, Ny, and Nz are a number selected from the group consisting of particles and objects and traffic node platforms in each direction, wherein the plurality of constraints mean that each grid line in each spatial direction is forced to be a monotone index mapping, wherein, $$N=Nx \times Ny \times Nz \qquad (9),$$

is a total number of nodes, and wherein a node can represent one of an individual vehicle and a platform in transport systems, performing qualitative diagnostics checking operations of the 3-D MLG algorithm, using stochastic grid regularization techniques;

calling one or more algorithms to perform operations of conflict detection and resolution, and updating positions and trajectories of each traffic node platform;

calculating a second velocity vector for each traffic node platform in the plurality of traffic node platforms;

incrementing time; and one of returning to sorting each traffic node platform in the plurality of traffic node platforms using the 3-D MLG algorithm, based on the x-, y-, z-locations and ending execution of the tracking algorithm; and checking nearest neighbors for potential collisions by inserting self adapting holes serving as blank placeholders within the data structure of the 3-D MLG algorithm.

13. A plurality of computer readable media, a plurality of computer writable media, and a plurality of computer executable media having a plurality of computer executable instructions, operating in an instrument control and data management module having a plurality of computer processors communicatively coupled to a computer memory, executed by the plurality of computer processors causing the plurality of computer processors to perform a method of globally simulating, controlling, and optimizing models of a plurality of nodes in a plurality of transport systems, the plurality of computer executable instructions comprising:

instructions causing combining a 3-Dimensional Monotonic Lagrangian Grid (3-D MLG) algorithm with algorithms for separation assurance and updating trajectories of the plurality of nodes in the plurality of transport systems, including:

instructions causing storing in a structure of the 3-D MLG algorithm, by an at least one computer processor of the plurality of computer processors, physical locations describing the plurality of nodes;

instructions causing sorting and ordering the plurality of nodes on a grid structure in real space and indexing space, causing a monotonic mapping between indices of the grid structure and locations describing the plurality of nodes;

instructions causing repeated sorting operations until the grid structure is monotonic;

instructions causing updating trajectories of the plurality of nodes; and instructions causing determining, by the at least one computer processor of the plurality of computer processors, separation assurance between each node of the plurality of nodes, resulting in one of circumventing a restricted area, avoiding blockages in transport paths, and avoiding collisions of any nodes of the plurality of nodes in models of transport systems, wherein the plurality of computer readable media, the plurality of computer writable media, and the plurality of computer executable media are memory elements selected from the group consisting of RAM and DRAM and ROM and SRAM and SDRAM and EEPROM and PROM and compact disc read only memory and CDROM and FLASH memory and magnetic tape and diskettes and cartridge and cassette and optical memory, and wherein instructions causing determining separation assurance further include instructions causing generating, by the at least one computer processor of the plurality of computer processors, optimizing automated separation modeling predictions for each node of the plurality of nodes, and by the at least one computer processor of the plurality of computer processors, assuring automated separation modeling predictions for each node of the plurality of nodes by controlling collision avoidance, conflict detection and resolution operations for separation assurance to maintain an adequate separation distance between each node of the plurality of nodes, further include the plurality of computer executable instructions comprising:

instructions causing executing, by the at least one computer processor of the plurality of computer processors, a fast nearest-neighbors search algorithm for each node of the plurality of nodes;

instructions causing executing an interaction algorithm; and instructions causing executing a tracking algorithm for a primary collision avoidance conflict resolution operation and, a group of subsequent collision avoidance conflict resolution operations for each node in the plurality of nodes, and wherein further instructions for controlling collision avoidance conflict detection and resolution operations for separation assurance comprise checking nearest neighbors for potential collisions, include:

instructions causing one of inserting self adapting holes serving as blank placeholders within the structure of the 3-D MLG algorithm and checking a current distance between each node of the plurality of nodes and an at least any nearest two adjacent nodes adjacent to each node, of the plurality of nodes, in all three x-, y-, and z-directions; in the 3-D MLG algorithm;

instructions causing determining if the current distance between each node and the at least any nearest two adjacent nodes adjacent to each node of the plurality of nodes in all three x-, y-, and z-directions is equal to or less than 5 miles;

instructions causing projecting forward in time an amount of time needed for a slower node to advance a shorter distance of 2 miles; and instructions causing modifying a velocity vector of one of each node and the at least any nearest two adjacent nodes by 20 degrees in an x-y direction, if a projected distance between each node and the at least any nearest two adjacent nodes, in all three x-, y-, and z-directions is less than the shorter distance of 2 miles.

14. The plurality of computer readable media of claim 13, wherein instructions causing sorting include calling a bubble sorting algorithm and calling a shell sorting algorithm to be executed for all axes, when any nodes are not monotonic.

15. The plurality computer readable media of claim 13, wherein instructions causing executing the tracking algorithm include simulator operations, and wherein instructions for simulator operations further comprising:

instructions causing reading, by the at least one computer processor, a travel path plan for each node of the plurality of nodes into the computer memory;

instructions assigning each node of the plurality of nodes a node ID, an initial x-, y-, z-location, a final x-, y-, z-location, a set of waypoints between the initial x-, y-, z-location, the final x-, y-, z-location, and an average speed, wherein each node of the plurality of nodes can be an aircraft and the node ID can be an aircraft ID that is a different ID for each individual aircraft;

instructions calculating a first velocity vector for each node in the plurality of nodes;

instructions causing inputting a plurality of data in a data structure of the 3-D MLG, wherein the plurality of data include the node ID and a current x-, y-, z-location for each node of the plurality of nodes characterized as:

$$\text{(3D) MLG}(i,N)\text{, where } i=1, \ldots, 4 \quad (7),$$

$$i=1\text{: } x\text{-location} \quad (3),$$

$$i=2\text{: } y\text{-location} \quad (4),$$

$$i=3\text{: } z\text{-location} \quad (5),$$

and $$i=4\text{:a node ID} \quad (6),$$

wherein the data structure of the 3-D MLG algorithm in Cartesian coordinates is defined by a plurality of constraints:

$$x(i,j,k) \leqq x(i+1,j,k)\ i=1, \ldots, Nx-1;\ j=1, \ldots, Ny;\ k=1, \ldots, Nz,$$

$$y(i,j,k) \leqq y(i,j,+1,k)\ i=1, \ldots, Nx;\ j=1, \ldots, Ny-1;\ k=1, \ldots, Nz$$

$$z(i,j,k) \leqq z(i,j,k+1)\ i=1, \ldots, Nx;\ j=1, \ldots, Ny;\ k=1, \ldots, Nz-1, \quad (1),$$

wherein i, j, and k are grid indices (in i-j-k space) of each node of the plurality of nodes, wherein Nx, Ny, and Nz are a number selected from the group consisting of particles and object and nodes in each direction, wherein the plurality of constraints mean that each grid line in each spatial direction is forced to be a monotone index mapping, and wherein $$N=Nx\times Ny\times Nz \quad (9),$$

is a total number of nodes, and wherein any one node of the total number of nodes can represent one of a different individual vehicle and platform in transport systems, instructions causing performing qualitative diagnostics checking operations of the 3-D MLG algorithm, using one or more iterations of a simulated annealing process of randomly perturbing nodes, thereby creating unperturbed original nodes;

instructions causing calling one or more algorithms to perform operations of conflict detection and resolution, and updating positions and trajectories of each node of the plurality of nodes;

instructions calculating a second velocity vector for each node of the plurality of nodes; and instructions causing incrementing time; and causing one of returning to sorting each node of the plurality of nodes using the 3-D MLG algorithm, based on x-, y-, z-locations and ending execution of the tracking algorithm.

* * * * *